US012802370B2

(12) United States Patent
Lehrich et al.

(10) Patent No.: US 12,802,370 B2
(45) Date of Patent: Nov. 17, 2026

(54) SYSTEMS AND METHODS FOR AUGMENTED REALITY

(71) Applicant: Magic Leap, Inc., Plantation, FL (US)

(72) Inventors: Daniel LeWinn Lehrich, Miami, FL (US); David C. Lundmark, Los Altos, CA (US)

(73) Assignee: Magic Leap, Inc., Plantation, FL (US)

( * ) Notice: Subject to any disclaimer, the term of this patent is extended or adjusted under 35 U.S.C. 154(b) by 98 days.

(21) Appl. No.: 19/042,435

(22) Filed: Jan. 31, 2025

(65) Prior Publication Data

US 2025/0182413 A1 Jun. 5, 2025

Related U.S. Application Data

(62) Division of application No. 18/046,739, filed on Oct. 14, 2022, now Pat. No. 12,249,035, which is a division of application No. 16/938,782, filed on Jul. 24, 2020, now Pat. No. 11,514,673.

(60) Provisional application No. 62/899,678, filed on Sep. 12, 2019, provisional application No. 62/881,355, filed on Jul. 31, 2019, provisional application No. 62/879,408, filed on Jul. 26, 2019.

(51) Int. Cl.

| | |
|---|---|
| ***G06T 19/00*** | (2011.01) |
| ***G06F 3/01*** | (2006.01) |
| ***G06F 18/23*** | (2023.01) |
| ***G06V 20/20*** | (2022.01) |

(52) U.S. Cl.

CPC ............ *G06T 19/006* (2013.01); *G06F 3/013* (2013.01); *G06F 3/014* (2013.01); *G06F 18/23* (2023.01); *G06V 20/20* (2022.01)

(58) Field of Classification Search

CPC ... G06T 19/006; G06T 13/40; G06K 9/00671; G06K 9/6218; G06F 3/011; G06F 3/013; G06F 3/014; G06F 3/017; A63F 13/211; A63F 13/213; A63F 13/25; A63F 13/42; A63F 13/428; A63F 13/5255; A63F 13/655

See application file for complete search history.

(56) References Cited

U.S. PATENT DOCUMENTS

| | | | |
|---|---|---|---|
| 4,344,092 | A | 8/1982 | Miller |
| 4,652,930 | A | 3/1987 | Crawford |
| 4,810,080 | A | 3/1989 | Grendol et al. |
| 4,997,268 | A | 3/1991 | Dauvergne |
| 5,007,727 | A | 4/1991 | Kahaney et al. |

(Continued)

FOREIGN PATENT DOCUMENTS

| | | | |
|---|---|---|---|
| CN | 100416340 | C | 9/2008 |
| CN | 101449270 | A | 6/2009 |

(Continued)

OTHER PUBLICATIONS

"First Office Action mailed Apr. 22, 2025 with English translation", Chinese Patent Application No. 202211347201.X, (11 pages).

(Continued)

*Primary Examiner* — Jin Cheng Wang

(74) *Attorney, Agent, or Firm* — Stephen M. De Klerk

(57) ABSTRACT

An augmented reality viewer includes components, assemblies, and executable logic to provide a user with the perception of rich augmented reality experiences, including aspects of the aquatic world.

14 Claims, 44 Drawing Sheets

(56) References Cited

U.S. PATENT DOCUMENTS

| | | | | |
|---|---|---|---|---|
| 5,074,295 | A | 12/1991 | Willis | |
| 5,240,220 | A | 8/1993 | Elberbaum | |
| 5,251,635 | A | 10/1993 | Dumoulin et al. | |
| 5,410,763 | A | 5/1995 | Bolle | |
| 5,455,625 | A | 10/1995 | Englander | |
| 5,495,286 | A | 2/1996 | Adair | |
| 5,497,463 | A | 3/1996 | Stein et al. | |
| 5,659,701 | A | 8/1997 | Amit et al. | |
| 5,682,255 | A | 10/1997 | Friesem et al. | |
| 5,689,669 | A | 11/1997 | Lynch | |
| 5,689,835 | A | 11/1997 | Chao | |
| 5,826,092 | A | 10/1998 | Flannery | |
| 5,854,872 | A | 12/1998 | Tai | |
| 5,864,365 | A | 1/1999 | Sramek et al. | |
| 5,937,202 | A | 8/1999 | Crosetto | |
| 6,002,853 | A | 12/1999 | de Hond | |
| 6,012,811 | A | 1/2000 | Chao et al. | |
| 6,016,160 | A | 1/2000 | Coombs et al. | |
| 6,064,749 | A | 5/2000 | Hirota et al. | |
| 6,076,927 | A | 6/2000 | Owens | |
| 6,079,982 | A | 6/2000 | Meader | |
| 6,117,923 | A | 9/2000 | Amagai et al. | |
| 6,119,147 | A | 9/2000 | Toomey et al. | |
| 6,124,977 | A | 9/2000 | Takahashi | |
| 6,179,619 | B1 | 1/2001 | Tanaka | |
| 6,191,809 | B1 | 2/2001 | Hori et al. | |
| 6,219,045 | B1 | 4/2001 | Leahy et al. | |
| 6,243,091 | B1 | 6/2001 | Berstis | |
| 6,271,843 | B1 | 8/2001 | Lection et al. | |
| 6,362,817 | B1 | 3/2002 | Powers et al. | |
| 6,375,369 | B1 | 4/2002 | Schneider et al. | |
| 6,385,735 | B1 | 5/2002 | Wilson | |
| 6,396,522 | B1 | 5/2002 | Vu | |
| 6,414,679 | B1 | 7/2002 | Miodonski et al. | |
| 6,538,655 | B1 | 3/2003 | Kubota | |
| 6,541,736 | B1 | 4/2003 | Huang et al. | |
| 6,570,563 | B1 | 5/2003 | Honda | |
| 6,573,903 | B2 | 6/2003 | Gantt | |
| 6,590,593 | B1 | 7/2003 | Robertson et al. | |
| 6,621,508 | B1 | 9/2003 | Shiraishi et al. | |
| 6,690,393 | B2 | 2/2004 | Heron et al. | |
| 6,757,068 | B2 | 6/2004 | Foxlin | |
| 6,784,901 | B1 | 8/2004 | Harvey et al. | |
| 6,961,055 | B2 | 11/2005 | Doak | |
| 7,046,515 | B1 | 5/2006 | Wyatt | |
| 7,051,219 | B2 | 5/2006 | Hwang | |
| 7,076,674 | B2 | 7/2006 | Cervantes | |
| 7,111,290 | B1 | 9/2006 | Yates, Jr. | |
| 7,119,819 | B1 | 10/2006 | Robertson et al. | |
| 7,211,986 | B1 | 5/2007 | Flowerdew et al. | |
| 7,219,245 | B1 | 5/2007 | Raghuvanshi | |
| 7,382,288 | B1 | 6/2008 | Wilson | |
| 7,414,629 | B2 | 8/2008 | Santodomingo | |
| 7,431,453 | B2 | 10/2008 | Hogan | |
| 7,467,356 | B2 | 12/2008 | Gettman et al. | |
| 7,542,040 | B2 | 6/2009 | Templeman | |
| 7,573,640 | B2 | 8/2009 | Nivon et al. | |
| 7,653,877 | B2 | 1/2010 | Matsuda | |
| 7,663,625 | B2 | 2/2010 | Chartier et al. | |
| 7,724,980 | B1 | 5/2010 | Shenzhi | |
| 7,746,343 | B1 | 6/2010 | Charaniya et al. | |
| 7,751,662 | B2 | 7/2010 | Kleemann | |
| 7,758,185 | B2 | 7/2010 | Lewis | |
| 7,788,323 | B2 | 8/2010 | Greenstein et al. | |
| 7,804,507 | B2 | 9/2010 | Yang et al. | |
| 7,814,429 | B2 | 10/2010 | Buffet et al. | |
| 7,817,150 | B2 | 10/2010 | Reichard et al. | |
| 7,844,724 | B2 | 11/2010 | Van Wie et al. | |
| 8,060,759 | B1 | 11/2011 | Arnan et al. | |
| 8,120,851 | B2 | 2/2012 | Iwasa | |
| 8,214,660 | B2 | 7/2012 | Capps, Jr. | |
| 8,246,408 | B2 | 8/2012 | Elliot | |
| 8,353,594 | B2 | 1/2013 | Lewis | |
| 8,360,578 | B2 | 1/2013 | Nummela et al. | |
| 8,408,696 | B2 | 4/2013 | Hsieh | |
| 8,508,676 | B2 | 8/2013 | Silverstein et al. | |
| 8,547,638 | B2 | 10/2013 | Levola | |
| 8,605,764 | B1 | 12/2013 | Rothaar et al. | |
| 8,619,365 | B2 | 12/2013 | Harris et al. | |
| 8,696,113 | B2 | 4/2014 | Lewis | |
| 8,698,701 | B2 | 4/2014 | Margulis | |
| 8,733,927 | B1 | 5/2014 | Lewis | |
| 8,736,636 | B2 | 5/2014 | Kang | |
| 8,759,929 | B2 | 6/2014 | Shiozawa et al. | |
| 8,793,770 | B2 | 7/2014 | Lim | |
| 8,823,855 | B2 | 9/2014 | Hwang | |
| 8,847,988 | B2 | 9/2014 | Geisner et al. | |
| 8,874,673 | B2 | 10/2014 | Kim | |
| 9,010,929 | B2 | 4/2015 | Lewis | |
| 9,015,501 | B2 | 4/2015 | Gee | |
| 9,086,537 | B2 | 7/2015 | Iwasa et al. | |
| 9,095,437 | B2 | 8/2015 | Boyden et al. | |
| 9,239,473 | B2 | 1/2016 | Lewis | |
| 9,244,293 | B2 | 1/2016 | Lewis | |
| 9,244,533 | B2 | 1/2016 | Friend et al. | |
| 9,285,872 | B1 | 3/2016 | Raffle et al. | |
| 9,383,823 | B2 | 7/2016 | Geisner et al. | |
| 9,489,027 | B1 | 11/2016 | Ogletree | |
| 9,519,305 | B2 | 12/2016 | Wolfe | |
| 9,581,820 | B2 | 2/2017 | Robbins | |
| 9,582,060 | B2 | 2/2017 | Balatsos | |
| 9,658,473 | B2 | 5/2017 | Lewis | |
| 9,671,566 | B2 | 6/2017 | Abovitz et al. | |
| 9,671,615 | B1 | 6/2017 | Vallius et al. | |
| 9,696,795 | B2 | 7/2017 | Marcolina et al. | |
| 9,798,144 | B2 | 10/2017 | Sako et al. | |
| 9,874,664 | B2 | 1/2018 | Stevens et al. | |
| 9,880,441 | B1 | 1/2018 | Osterhout | |
| 9,918,058 | B2 | 3/2018 | Takahasi et al. | |
| 9,955,862 | B2 | 5/2018 | Freeman et al. | |
| 9,978,118 | B1 | 5/2018 | Ozgumer et al. | |
| 9,996,797 | B1 | 6/2018 | Holz et al. | |
| 10,018,844 | B2 | 7/2018 | Levola et al. | |
| 10,082,865 | B1 | 9/2018 | Raynal et al. | |
| 10,151,937 | B2 | 12/2018 | Lewis | |
| 10,185,147 | B2 | 1/2019 | Lewis | |
| 10,218,679 | B1 | 2/2019 | Jawahar | |
| 10,241,545 | B1 | 3/2019 | Richards et al. | |
| 10,317,680 | B1 | 6/2019 | Richards et al. | |
| 10,436,594 | B2 | 10/2019 | Belt et al. | |
| 10,516,853 | B1 | 12/2019 | Gibson et al. | |
| 10,527,853 | B2 | 1/2020 | Kimmel | |
| 10,551,879 | B1 | 2/2020 | Richards et al. | |
| 10,578,870 | B2 | 3/2020 | Kimmel | |
| 10,646,283 | B2 | 5/2020 | Johnson et al. | |
| 10,698,202 | B2 | 6/2020 | Kimmel et al. | |
| 10,825,424 | B2 | 11/2020 | Zhang | |
| 10,856,107 | B2 | 12/2020 | Mycek et al. | |
| 10,987,176 | B2 | 4/2021 | Poltaretskyi et al. | |
| 11,190,681 | B1 | 11/2021 | Brook et al. | |
| 11,199,713 | B2 | 12/2021 | Kimmel | |
| 11,209,656 | B1 | 12/2021 | Choi et al. | |
| 11,236,993 | B1 | 2/2022 | Hall et al. | |
| 11,262,585 | B2 | 3/2022 | Potnis et al. | |
| 11,710,430 | B1 * | 7/2023 | Wray | G02B 30/56 345/419 |
| 11,874,468 | B2 | 1/2024 | Kimmel | |
| 11,900,626 | B2 | 2/2024 | Tang | |
| 2001/0010598 | A1 | 8/2001 | Aritake et al. | |
| 2001/0018667 | A1 | 8/2001 | Kim | |
| 2002/0007463 | A1 | 1/2002 | Fung | |
| 2002/0063913 | A1 | 5/2002 | Nakamura et al. | |
| 2002/0071050 | A1 | 6/2002 | Homberg | |
| 2002/0095463 | A1 | 7/2002 | Matsuda | |
| 2002/0108064 | A1 | 8/2002 | Nunally | |
| 2002/0113820 | A1 | 8/2002 | Robinson et al. | |
| 2002/0122648 | A1 | 9/2002 | Mule' et al. | |
| 2002/0140848 | A1 | 10/2002 | Cooper et al. | |
| 2003/0028816 | A1 | 2/2003 | Bacon | |
| 2003/0048456 | A1 | 3/2003 | Hill | |
| 2003/0067685 | A1 | 4/2003 | Niv | |
| 2003/0077458 | A1 | 4/2003 | Korenaga et al. | |
| 2003/0080976 | A1 | 5/2003 | Satoh et al. | |
| 2003/0115494 | A1 | 6/2003 | Cervantes | |

(56) References Cited

U.S. PATENT DOCUMENTS

2003/0218614 A1 11/2003 Lavelle et al.
2003/0219992 A1 11/2003 Schaper
2003/0226047 A1 12/2003 Park
2004/0001533 A1 1/2004 Tran et al.
2004/0021600 A1 2/2004 Wittenberg
2004/0025069 A1 2/2004 Gary et al.
2004/0042377 A1 3/2004 Nikoloai et al.
2004/0073822 A1 4/2004 Greco
2004/0073825 A1 4/2004 Itoh
2004/0111248 A1 6/2004 Granny et al.
2004/0113887 A1 6/2004 Pair et al.
2004/0174496 A1 9/2004 Ji et al.
2004/0186902 A1 9/2004 Stewart
2004/0193441 A1 9/2004 Altieri
2004/0201857 A1 10/2004 Foxlin
2004/0238732 A1 12/2004 State et al.
2004/0240072 A1 12/2004 Schindler et al.
2004/0246391 A1 12/2004 Travis
2004/0268159 A1 12/2004 Aasheim et al.
2005/0001977 A1 1/2005 Zelman
2005/0034002 A1 2/2005 Flautner
2005/0052621 A1 3/2005 Allen et al.
2005/0093719 A1 5/2005 Okamoto et al.
2005/0128212 A1 6/2005 Edecker et al.
2005/0157159 A1 7/2005 Komiya et al.
2005/0177385 A1 8/2005 Hull
2005/0231599 A1 10/2005 Yamasaki
2005/0273792 A1 12/2005 Inohara et al.
2006/0013435 A1 1/2006 Rhoads
2006/0015821 A1 1/2006 Jacques Parker et al.
2006/0019723 A1 1/2006 Vorenkamp
2006/0038880 A1 2/2006 Starkweather et al.
2006/0050224 A1 3/2006 Smith
2006/0090092 A1 4/2006 Verhulst
2006/0126181 A1 6/2006 Levola
2006/0126182 A1 6/2006 Levola
2006/0129852 A1 6/2006 Bonola
2006/0132914 A1 6/2006 Weiss et al.
2006/0179329 A1 8/2006 Terechko
2006/0221448 A1 10/2006 Nivon et al.
2006/0228073 A1 10/2006 Mukawa et al.
2006/0250322 A1 11/2006 Hall et al.
2006/0259621 A1 11/2006 Ranganathan
2006/0268220 A1 11/2006 Hogan
2007/0058248 A1 3/2007 Nguyen et al.
2007/0103836 A1 5/2007 Oh
2007/0124730 A1 5/2007 Pytel
2007/0159673 A1 7/2007 Freeman et al.
2007/0185398 A1 8/2007 Kimura et al.
2007/0188837 A1 8/2007 Shimizu et al.
2007/0198886 A1 8/2007 Saito
2007/0204672 A1 9/2007 Huang et al.
2007/0213952 A1 9/2007 Cirelli
2007/0283247 A1 12/2007 Brenneman et al.
2008/0002259 A1 1/2008 Ishizawa et al.
2008/0002260 A1 1/2008 Arrouy et al.
2008/0030429 A1 2/2008 Hailpern
2008/0043334 A1 2/2008 Itzkovitch et al.
2008/0046773 A1 2/2008 Ham
2008/0050013 A1 2/2008 Munro
2008/0063802 A1 3/2008 Maula et al.
2008/0068557 A1 3/2008 Menduni et al.
2008/0082480 A1 4/2008 Gounares et al.
2008/0084533 A1 4/2008 Jannard et al.
2008/0125218 A1 5/2008 Collins
2008/0146942 A1 6/2008 Dala-Krishna
2008/0173036 A1 7/2008 Willaims
2008/0177506 A1 7/2008 Kim
2008/0183190 A1 7/2008 Adcox et al.
2008/0205838 A1 8/2008 Crippa et al.
2008/0215907 A1 9/2008 Wilson
2008/0225393 A1 9/2008 Rinko
2008/0235570 A1 9/2008 Sawada et al.
2008/0246693 A1 10/2008 Hailpern et al.
2008/0316768 A1 12/2008 Travis
2009/0076791 A1 3/2009 Rhoades et al.
2009/0091583 A1 4/2009 McCoy
2009/0153797 A1 6/2009 Allon et al.
2009/0177445 A1 7/2009 Capps, Jr. et al.
2009/0224416 A1 9/2009 Laakkonen et al.
2009/0245730 A1 10/2009 Kleemann
2009/0287728 A1 11/2009 Martine et al.
2009/0300528 A1 12/2009 Stambaugh
2009/0310633 A1 12/2009 Ikegami
2010/0005326 A1 1/2010 Archer
2010/0019962 A1 1/2010 Fujita
2010/0056274 A1 3/2010 Uusitalo et al.
2010/0060970 A1 3/2010 Harris et al.
2010/0060979 A1 3/2010 Harris et al.
2010/0063854 A1 3/2010 Purvis et al.
2010/0070378 A1 3/2010 Trotman et al.
2010/0079841 A1 4/2010 Levola
2010/0115428 A1 5/2010 Shuping et al.
2010/0153934 A1 6/2010 Lachner
2010/0194632 A1 8/2010 Raento et al.
2010/0205541 A1 8/2010 Rappaport et al.
2010/0214284 A1 8/2010 Rieffel et al.
2010/0232016 A1 9/2010 Landa et al.
2010/0232031 A1 9/2010 Batchko et al.
2010/0244168 A1 9/2010 Shiozawa et al.
2010/0274567 A1 10/2010 Carlson et al.
2010/0277803 A1 11/2010 Pockett et al.
2010/0284085 A1 11/2010 Laakkonen
2010/0287485 A1 11/2010 Bertolami et al.
2010/0296163 A1 11/2010 Sarikko
2010/0306715 A1 12/2010 Geisner et al.
2010/0309687 A1 12/2010 Sampsell et al.
2010/0321781 A1 12/2010 Levola
2011/0010636 A1 1/2011 Hamilton, II et al.
2011/0021263 A1 1/2011 Anderson et al.
2011/0022870 A1 1/2011 Mcgrane
2011/0041083 A1 2/2011 Gabai et al.
2011/0050640 A1 3/2011 Lundback et al.
2011/0050655 A1 3/2011 Mukawa
2011/0064268 A1 3/2011 Cobb et al.
2011/0122240 A1 5/2011 Becker
2011/0145617 A1 6/2011 Thomson et al.
2011/0170801 A1 7/2011 Lu et al.
2011/0182515 A1 7/2011 Iwai et al.
2011/0218733 A1 9/2011 Hamza et al.
2011/0286735 A1 11/2011 Temblay
2011/0291969 A1 12/2011 Rashid et al.
2011/0317233 A1 12/2011 Hayashibe et al.
2012/0011389 A1 1/2012 Driesen
2012/0050535 A1 3/2012 Densham et al.
2012/0075501 A1 3/2012 Oyagi et al.
2012/0079466 A1 3/2012 Gonion
2012/0081392 A1 4/2012 Arthur
2012/0089854 A1 4/2012 Breakstone
2012/0113235 A1 5/2012 Shintani
2012/0127062 A1 5/2012 Bar-Zeev et al.
2012/0154557 A1 6/2012 Perez et al.
2012/0215094 A1 8/2012 Rahimian et al.
2012/0218301 A1 8/2012 Miller
2012/0246506 A1 9/2012 Knight
2012/0249416 A1 10/2012 Maciocci et al.
2012/0249741 A1 10/2012 Maciocci et al.
2012/0260083 A1 10/2012 Andrews
2012/0280348 A1 11/2012 Chou et al.
2012/0307075 A1 12/2012 Margalitq
2012/0307362 A1 12/2012 Silverstein et al.
2012/0314959 A1 12/2012 White et al.
2012/0320460 A1 12/2012 Levola
2012/0326948 A1 12/2012 Crocco et al.
2013/0021486 A1 1/2013 Richardon
2013/0050258 A1 2/2013 Liu et al.
2013/0050642 A1 2/2013 Lewis et al.
2013/0050833 A1 2/2013 Lewis et al.
2013/0051730 A1 2/2013 Travers et al.
2013/0061240 A1 3/2013 Yan et al.
2013/0077049 A1 3/2013 Bohn
2013/0077170 A1 3/2013 Ukuda
2013/0094148 A1 4/2013 Sloane
2013/0129282 A1 5/2013 Li

(56) References Cited

U.S. PATENT DOCUMENTS

2013/0162940 A1 6/2013 Kurtin et al.
2013/0169923 A1 7/2013 Schnoll et al.
2013/0205126 A1 8/2013 Kruglick
2013/0222386 A1 8/2013 Tannhauser et al.
2013/0268257 A1 10/2013 Hu
2013/0278633 A1* 10/2013 Ahn ...................... G06T 19/006 345/633
2013/0308861 A1 11/2013 Cordara
2013/0314789 A1 11/2013 Saarikko et al.
2013/0318276 A1 11/2013 Dalal
2013/0336138 A1 12/2013 Venkatraman et al.
2013/0342564 A1 12/2013 Kinnebrew et al.
2013/0342570 A1 12/2013 Kinnebrew et al.
2013/0342571 A1* 12/2013 Kinnebrew ............. G06F 3/147 345/633
2013/0343408 A1 12/2013 Cook
2014/0002329 A1* 1/2014 Nishimaki .......... G06F 3/04815 345/8
2014/0013098 A1 1/2014 Yeung
2014/0016821 A1 1/2014 Arth et al.
2014/0022819 A1 1/2014 Oh et al.
2014/0078023 A1 3/2014 Ikeda et al.
2014/0082526 A1 3/2014 Park et al.
2014/0119598 A1 5/2014 Ramachandran et al.
2014/0123015 A1 5/2014 Sako et al.
2014/0126769 A1 5/2014 Reitmayr et al.
2014/0140653 A1 5/2014 Brown et al.
2014/0149573 A1 5/2014 Tofighbakhsh et al.
2014/0168260 A1 6/2014 O'Brien et al.
2014/0204438 A1 7/2014 Yamada et al.
2014/0244983 A1 8/2014 McDonald et al.
2014/0266987 A1 9/2014 Magyari
2014/0267419 A1 9/2014 Ballard et al.
2014/0274391 A1 9/2014 Stafford
2014/0282105 A1 9/2014 Nordstrom
2014/0292645 A1* 10/2014 Tsurumi .................. G06F 3/017 345/156
2014/0306866 A1 10/2014 Miller et al.
2014/0309031 A1* 10/2014 Suzuki ................ A63F 13/2145 463/31
2014/0313228 A1 10/2014 Kasahara
2014/0333612 A1* 11/2014 Itoh ......................... G06T 13/20 345/419
2014/0340498 A1 11/2014 Plagemann et al.
2014/0359589 A1 12/2014 Kodsky et al.
2014/0375680 A1 12/2014 Ackerman et al.
2015/0005785 A1 1/2015 Olson
2015/0009099 A1 1/2015 Queen
2015/0015842 A1 1/2015 Chen
2015/0077312 A1 3/2015 Wang
2015/0097719 A1 4/2015 Balachandreswaran et al.
2015/0123966 A1 5/2015 Newman
2015/0130790 A1* 5/2015 Vasquez, II ........... G06T 19/006 345/419
2015/0132003 A1 5/2015 Greiner et al.
2015/0132596 A1 5/2015 Yamada et al.
2015/0134995 A1 5/2015 Park et al.
2015/0138248 A1 5/2015 Schrader
2015/0155939 A1 6/2015 Oshima et al.
2015/0168221 A1 6/2015 Mao et al.
2015/0205126 A1 7/2015 Schowengerdt
2015/0235427 A1 8/2015 Nobori et al.
2015/0235431 A1 8/2015 Schowengerdt
2015/0253651 A1 9/2015 Russell et al.
2015/0256484 A1 9/2015 Cameron
2015/0269784 A1 9/2015 Miyawaki et al.
2015/0294483 A1 10/2015 Wells et al.
2015/0301955 A1 10/2015 Yakovenko et al.
2015/0310657 A1 10/2015 Eden
2015/0316982 A1 11/2015 Miller
2015/0338915 A1 11/2015 Publicover et al.
2015/0355481 A1 12/2015 Hilkes et al.
2016/0004102 A1 1/2016 Nisper et al.
2016/0015470 A1 1/2016 Border
2016/0027215 A1 1/2016 Burns et al.
2016/0033770 A1 2/2016 Fujimaki et al.
2016/0051217 A1 2/2016 Douglas et al.
2016/0073069 A1 3/2016 Xue
2016/0077338 A1 3/2016 Robbins et al.
2016/0085285 A1 3/2016 Mangione-Smith
2016/0085300 A1 3/2016 Robbins et al.
2016/0091720 A1 3/2016 Stafford et al.
2016/0093099 A1 3/2016 Bridges
2016/0093269 A1 3/2016 Buckley et al.
2016/0103326 A1 4/2016 Kimura et al.
2016/0123745 A1 5/2016 Cotier et al.
2016/0139402 A1 5/2016 Lapstun
2016/0139411 A1 5/2016 Kang et al.
2016/0155273 A1 6/2016 Lyren et al.
2016/0163063 A1 6/2016 Ashman
2016/0180596 A1 6/2016 Gonzalez del Rosario
2016/0187654 A1 6/2016 Border et al.
2016/0191887 A1 6/2016 Casas
2016/0202496 A1 7/2016 Billetz et al.
2016/0217624 A1 7/2016 Finn et al.
2016/0266412 A1 9/2016 Yoshida
2016/0267708 A1 9/2016 Nistico et al.
2016/0274733 A1 9/2016 Hasegawa et al.
2016/0277645 A1 9/2016 Bitouk
2016/0287337 A1 10/2016 Aram et al.
2016/0300388 A1 10/2016 Stafford et al.
2016/0321551 A1 11/2016 Priness et al.
2016/0327798 A1 11/2016 Xiao et al.
2016/0334279 A1 11/2016 Mittleman et al.
2016/0357255 A1 12/2016 Lindh et al.
2016/0370404 A1 12/2016 Quadrat et al.
2016/0370510 A1 12/2016 Thomas
2017/0038607 A1 2/2017 Camara
2017/0060225 A1 3/2017 Zha et al.
2017/0061696 A1 3/2017 Li et al.
2017/0064066 A1 3/2017 Das et al.
2017/0068020 A1 3/2017 Batchko et al.
2017/0100664 A1 4/2017 Osterhout et al.
2017/0102544 A1 4/2017 Vallius et al.
2017/0115487 A1 4/2017 Travis
2017/0118452 A1 4/2017 Ogi et al.
2017/0122725 A1 5/2017 Yeoh et al.
2017/0123526 A1 5/2017 Trail et al.
2017/0127295 A1 5/2017 Black et al.
2017/0131569 A1 5/2017 Aschwanden et al.
2017/0147066 A1 5/2017 Katz et al.
2017/0160518 A1 6/2017 Lanman et al.
2017/0161951 A1 6/2017 Fix et al.
2017/0172409 A1 6/2017 Cavin et al.
2017/0185261 A1 6/2017 Perez et al.
2017/0192239 A1 7/2017 Nakamura et al.
2017/0201709 A1 7/2017 Igarashi et al.
2017/0205903 A1 7/2017 Miller et al.
2017/0206668 A1 7/2017 Poulos et al.
2017/0213388 A1 7/2017 Margolis et al.
2017/0214893 A1 7/2017 Naftali et al.
2017/0214907 A1 7/2017 Lapstun
2017/0219841 A1 8/2017 Popovich et al.
2017/0220119 A1 8/2017 Potts et al.
2017/0221225 A1 8/2017 Peri
2017/0232345 A1 8/2017 Rofougaran et al.
2017/0235126 A1 8/2017 DiDomenico
2017/0235129 A1 8/2017 Kamakura
2017/0235142 A1 8/2017 Wall et al.
2017/0235144 A1 8/2017 Piskunov et al.
2017/0235147 A1 8/2017 Kamakura
2017/0243403 A1 8/2017 Daniels et al.
2017/0246070 A1 8/2017 Osterhout et al.
2017/0254832 A1 9/2017 Ho et al.
2017/0256096 A1 9/2017 Faaborg et al.
2017/0258526 A1 9/2017 Lang
2017/0266529 A1* 9/2017 Rekimoto ............ H04N 13/363
2017/0270712 A1* 9/2017 Tyson ................ H04N 1/00127
2017/0281054 A1 10/2017 Stever et al.
2017/0287376 A1 10/2017 Bakar et al.
2017/0293141 A1 10/2017 Schowengerdt et al.
2017/0307886 A1 10/2017 Stenberg et al.
2017/0307891 A1 10/2017 Bucknor et al.

(56) References Cited

U.S. PATENT DOCUMENTS

2017/0312032 A1 11/2017 Amanatullah et al.
2017/0322418 A1 11/2017 Lin et al.
2017/0322426 A1 11/2017 Tervo
2017/0329137 A1 11/2017 Tervo
2017/0332098 A1 11/2017 Rusanovskyy et al.
2017/0336636 A1 11/2017 Amitai et al.
2017/0336867 A1 11/2017 Wilairat et al.
2017/0357332 A1 12/2017 Balan et al.
2017/0363871 A1 12/2017 Vallius
2017/0371394 A1 12/2017 Chan
2017/0371661 A1 12/2017 Sparling
2018/0014266 A1 1/2018 Chen
2018/0024289 A1 1/2018 Fattal
2018/0039673 A1 2/2018 Chen et al.
2018/0044173 A1 2/2018 Netzer
2018/0052007 A1 2/2018 Teskey et al.
2018/0052501 A1 2/2018 Jones, Jr. et al.
2018/0056305 A1 3/2018 Sankey et al.
2018/0059305 A1 3/2018 Popovich et al.
2018/0067779 A1 3/2018 Pillalamarri et al.
2018/0070855 A1 3/2018 Eichler
2018/0082480 A1 3/2018 White et al.
2018/0084245 A1 3/2018 Lapstun
2018/0088185 A1 3/2018 Woods et al.
2018/0101214 A1 4/2018 Mahindru et al.
2018/0102981 A1 4/2018 Kurtzman et al.
2018/0108179 A1 4/2018 Tomlin et al.
2018/0114298 A1 4/2018 Malaika et al.
2018/0129112 A1 5/2018 Osterhout
2018/0131907 A1 5/2018 Schmirler et al.
2018/0136466 A1 5/2018 Ko
2018/0144691 A1 5/2018 Choi et al.
2018/0150971 A1 5/2018 Adachi et al.
2018/0151796 A1 5/2018 Akahane
2018/0172995 A1 6/2018 Lee et al.
2018/0188115 A1 7/2018 Hsu et al.
2018/0189568 A1 7/2018 Powderly et al.
2018/0190017 A1 7/2018 Mendez et al.
2018/0191990 A1 7/2018 Motoyama et al.
2018/0196084 A1 7/2018 Tustaniwskyj
2018/0217395 A1 8/2018 LIn et al.
2018/0218545 A1 8/2018 Garcia et al.
2018/0250589 A1 9/2018 Cossairt et al.
2018/0260218 A1 9/2018 Gopal
2018/0284877 A1 10/2018 Klein
2018/0292654 A1 10/2018 Wall et al.
2018/0299678 A1 10/2018 Singer et al.
2018/0357472 A1 12/2018 Dreessen
2019/0005069 A1 1/2019 Filgueiras de Araujo et al.
2019/0011691 A1 1/2019 Peyman
2019/0056591 A1 2/2019 Tervo et al.
2019/0087015 A1 3/2019 Lam et al.
2019/0101758 A1 4/2019 Zhu et al.
2019/0107723 A1 4/2019 Lee et al.
2019/0137788 A1 5/2019 Suen
2019/0155034 A1 5/2019 Singer et al.
2019/0155439 A1 5/2019 Mukherjee et al.
2019/0158926 A1 5/2019 Kang et al.
2019/0162950 A1 5/2019 Lapstun
2019/0167095 A1 6/2019 Krueger
2019/0171909 A1 6/2019 Mandal et al.
2019/0172216 A1 6/2019 Ninan et al.
2019/0178654 A1 6/2019 Hare
2019/0179654 A1 6/2019 Hare
2019/0182415 A1 6/2019 Sivan
2019/0196690 A1 6/2019 Chong et al.
2019/0206116 A1 7/2019 Xu et al.
2019/0219815 A1 7/2019 Price et al.
2019/0243123 A1 8/2019 Bohn
2019/0287270 A1* 9/2019 Nakamura ............... H04N 5/74
2019/0307510 A1 10/2019 Rotenberg et al.
2019/0318502 A1 10/2019 He et al.
2019/0318540 A1 10/2019 Piemonte et al.
2019/0321728 A1 10/2019 Imai et al.
2019/0347853 A1 11/2019 Chen et al.
2019/0380792 A1 12/2019 Poltaretskyi et al.
2019/0388182 A1 12/2019 Kumar et al.
2020/0066045 A1 2/2020 Stahl et al.
2020/0098188 A1 3/2020 Bar-Zeev et al.
2020/0100057 A1 3/2020 Galon et al.
2020/0110928 A1 4/2020 Al Jazaery et al.
2020/0117267 A1 4/2020 Gibson et al.
2020/0117270 A1 4/2020 Gibson et al.
2020/0184217 A1 6/2020 Faulkner
2020/0184219 A1* 6/2020 Mugura ................. B60K 35/10
2020/0184653 A1 6/2020 Faulker
2020/0202759 A1 6/2020 Ukai et al.
2020/0242848 A1 7/2020 Ambler et al.
2020/0309944 A1 10/2020 Thoresen et al.
2020/0342571 A1* 10/2020 Young ..................... G06F 1/163
2020/0356161 A1 11/2020 Wagner
2020/0368616 A1 11/2020 Delamont
2020/0391115 A1 12/2020 Leeper et al.
2020/0409528 A1 12/2020 Lee
2021/0008413 A1 1/2021 Asikainen et al.
2021/0033871 A1 2/2021 Jacoby et al.
2021/0041951 A1 2/2021 Gibson et al.
2021/0053820 A1 2/2021 Gurin et al.
2021/0093391 A1 4/2021 Poltaretskyi et al.
2021/0093410 A1 4/2021 Gaborit et al.
2021/0093414 A1 4/2021 Moore et al.
2021/0097886 A1 4/2021 Kuester et al.
2021/0124901 A1 4/2021 Liu et al.
2021/0132380 A1 5/2021 Wieczorek
2021/0141225 A1 5/2021 Meynen et al.
2021/0142582 A1 5/2021 Jones et al.
2021/0150264 A1 5/2021 Karanam
2021/0158023 A1 5/2021 Fu et al.
2021/0158627 A1 5/2021 Cossairt et al.
2021/0173480 A1 6/2021 Osterhout et al.
2021/0319236 A1 10/2021 Tang
2021/0333551 A1 10/2021 Schultz
2022/0366598 A1 11/2022 Azimi et al.
2023/0351808 A1 11/2023 Jarvenpaa
2023/0384593 A1 11/2023 Ofir
2024/0103212 A1 3/2024 Jarvenpaa
2025/0039342 A1 1/2025 Traczyk et al.
2025/0189802 A1 6/2025 Ofir

FOREIGN PATENT DOCUMENTS

CN 102448566 A 5/2012
CN 103460255 A 12/2013
CN 104040410 A 9/2014
CN 104603675 A 5/2015
CN 105938426 A 9/2016
CN 106662754 A 5/2017
CN 107004303 A 8/2017
CN 107683497 A1 2/2018
CN 109223121 A 1/2019
CN 105190427 B 11/2019
EP 0504930 A1 3/1992
EP 0535402 A1 4/1993
EP 0632360 A1 1/1995
EP 1249717 A2 4/2002
EP 1215522 A2 6/2002
EP 13451682 A2 2/2003
EP 1494110 A2 1/2005
EP 1938141 A1 7/2008
EP 1943556 A2 7/2008
EP 2290428 A2 3/2011
EP 2350774 A1 8/2011
EP 2818910 A1 12/2014
EP 1237067 B1 1/2016
EP 3139245 A1 3/2017
EP 3164776 B1 5/2017
EP 3236211 A1 10/2017
EP 2723240 B1 8/2018
EP 2896986 B1 2/2021
GB 2499635 A 8/2013
GB 2542853 A 4/2017
IN 938/DEL/2004 A 6/2006
JP H03-036974 U 4/1991
JP 07-072304 A 3/1995

(56) References Cited

FOREIGN PATENT DOCUMENTS

| | | | |
|---|---|---|---|
| JP | 09-121370 | A | 5/1997 |
| JP | 09-184904 | A | 7/1997 |
| JP | H10-333094 | A | 12/1998 |
| JP | 2002-015222 | A | 1/2002 |
| JP | 2002-529806 | | 9/2002 |
| JP | 2002-37602 | A | 12/2002 |
| JP | 2003-029198 | A | 1/2003 |
| JP | 2003-141574 | A | 5/2003 |
| JP | 2003-228027 | A | 8/2003 |
| JP | 2003-329873 | A | 11/2003 |
| JP | 2004-348169 | A | 12/2004 |
| JP | 2005-151224 | A | 6/2005 |
| JP | 2005-303843 | A | 10/2005 |
| JP | 2007-012530 | A | 1/2007 |
| JP | 2007-86696 | A | 4/2007 |
| JP | 2007-273733 | A | 10/2007 |
| JP | 2008-257127 | A | 10/2008 |
| JP | 2009-507366 | A | 2/2009 |
| JP | 2009-090689 | A | 4/2009 |
| JP | 2009-244869 | A | 10/2009 |
| JP | 2010-014443 | A | 1/2010 |
| JP | 2010-139575 | | 6/2010 |
| JP | 2010-146030 | A | 7/2010 |
| JP | 2010-526341 | A | 7/2010 |
| JP | 2010-271526 | A | 12/2010 |
| JP | 2011-033993 | A | 2/2011 |
| JP | 2011-504522 | A | 2/2011 |
| JP | 2011-257203 | A | 12/2011 |
| JP | 2011-530131 | A | 12/2011 |
| JP | 2012-8356 | A | 1/2012 |
| JP | 2012-015774 | A | 1/2012 |
| JP | 2012-15774 | A | 1/2012 |
| JP | 2012-088777 | A | 5/2012 |
| JP | 2012-235036 | A | 11/2012 |
| JP | 2013-525872 | A1 | 6/2013 |
| JP | 2013-206322 | A | 10/2013 |
| JP | 2013-250045 | A | 12/2013 |
| JP | 2014-500522 | A | 1/2014 |
| JP | 2014-068465 | A | 4/2014 |
| JP | 2014-90386 | A | 5/2014 |
| JP | 2014-174366 | A | 9/2014 |
| JP | 2014-524229 | A | 9/2014 |
| JP | 2014-192550 | A | 10/2014 |
| JP | 2015-156512 | A | 8/2015 |
| JP | 2015-191032 | A | 11/2015 |
| JP | 2015-535986 | A | 12/2015 |
| JP | 2016-502120 | A | 1/2016 |
| JP | 2016-85463 | A | 5/2016 |
| JP | 2016-516227 | A | 6/2016 |
| JP | 2016-126134 | A | 7/2016 |
| JP | 2017-015697 | A | 1/2017 |
| JP | 2017-108444 | A | 6/2017 |
| JP | 2017-153498 | | 9/2017 |
| JP | 2017-531840 | A | 10/2017 |
| JP | 2017-535825 | A | 11/2017 |
| JP | 6232763 | B2 | 11/2017 |
| JP | 2018-014579 | A | 1/2018 |
| JP | 2018-503165 | A | 2/2018 |
| JP | 6333965 | B2 | 5/2018 |
| JP | 2018-173739 | A | 11/2018 |
| JP | 2019-177134 | A | 10/2019 |
| JP | 7344896 | B2 | 9/2023 |
| KR | 2005-0010775 | A | 1/2005 |
| KR | 10-2006-0059992 | A | 6/2006 |
| KR | 10-2011-0006408 | | 1/2011 |
| KR | 10-1372623 | B1 | 3/2014 |
| KR | 10-2017-0017243 | | 2/2017 |
| TW | 201219829 | A | 5/2012 |
| TW | 201803289 | A | 1/2018 |
| WO | 1991/000565 | A2 | 1/1991 |
| WO | 2000/030368 | A1 | 6/2000 |
| WO | 2002/071315 | A2 | 9/2002 |
| WO | 2004095248 | A | 11/2004 |
| WO | 2006132614 | A1 | 12/2006 |
| WO | 2007037089 | A1 | 4/2007 |
| WO | 2007041678 | A2 | 4/2007 |
| WO | 2007/085682 | A1 | 8/2007 |
| WO | 2007/102144 | A1 | 9/2007 |
| WO | 2008137299 | A1 | 11/2008 |
| WO | 2008148927 | A1 | 12/2008 |
| WO | 2009060125 | A1 | 5/2009 |
| WO | 2009/101238 | A1 | 8/2009 |
| WO | 2010015807 | A1 | 2/2010 |
| WO | 2014203440 | A1 | 12/2010 |
| WO | 2012030787 | A2 | 3/2012 |
| WO | 2013/049012 | A1 | 4/2013 |
| WO | 2013062701 | A1 | 5/2013 |
| WO | 2013/145536 | A1 | 10/2013 |
| WO | 2014033306 | A1 | 3/2014 |
| WO | 2014047165 | A1 | 3/2014 |
| WO | 2015079610 | A1 | 6/2015 |
| WO | 2015/143641 | A1 | 10/2015 |
| WO | 2015194597 | A1 | 12/2015 |
| WO | 2016054092 | A1 | 4/2016 |
| WO | 2017004695 | A1 | 1/2017 |
| WO | 2017044761 | A1 | 3/2017 |
| WO | 2017049163 | A1 | 3/2017 |
| WO | 2017051595 | A1 | 3/2017 |
| WO | 2017120475 | A1 | 7/2017 |
| WO | 2017176861 | A1 | 10/2017 |
| WO | 2017/203201 | A1 | 11/2017 |
| WO | 2018008232 | A1 | 1/2018 |
| WO | 2018/031261 | A1 | 2/2018 |
| WO | 2018022523 | A1 | 2/2018 |
| WO | 2018/044537 | A1 | 3/2018 |
| WO | 2018039273 | A1 | 3/2018 |
| WO | 2018057564 | A1 | 3/2018 |
| WO | 2018085287 | A1 | 5/2018 |
| WO | 2018087408 | A1 | 5/2018 |
| WO | 2018097831 | A1 | 5/2018 |
| WO | 2018/166921 | A | 9/2018 |
| WO | 2018166921 | A1 | 9/2018 |
| WO | 2018236587 | A1 | 12/2018 |
| WO | 2019040493 | A1 | 2/2019 |
| WO | 2016075689 | A1 | 5/2019 |
| WO | 2019148154 | A1 | 8/2019 |
| WO | 2020010226 | A1 | 1/2020 |

OTHER PUBLICATIONS

"Non Final Office Action mailed on Jun. 17, 2025", U.S. Appl. No. 18/674,016, (7 pages).
"Non Final Office Action mailed on Jun. 26, 2025", U.S. Appl. No. 18/348,732, (17 pages).
"Office Action mailed on Jul. 17, 2025 with English translation", Chinese Patent Application No. 202080079136.X, (42 pages).
"Penultimate Office Action mailed on Aug. 13, 2025 with English translation", Japanese Patent Application No. 2024-139589, (5 pages).
"Non Final Office Action mailed on Dec. 2, 2025", U.S. Appl. No. 18/517,915, (18 pages).
"Final Office Action mailed on Dec. 17, 2025", U.S. Appl. No. 18/674,016, (8 pages).
"First Office Action mailed Dec. 20, 2025 with English translation", Chinese Patent Application No. 202080079114.3, (10 pages).
"Non Final Office Action mailed on Feb. 3, 2026", U.S. Appl. No. 18/643,757, (14 pages).
"Second Office Action with English translation mailed on Feb. 24, 2026", Chinese Patent Application No. 202080079136.X, (52 pages).
"First Office Action mailed Mar. 11, 2026 with English translation", Japanese Patent Application No. 2025-94021, (10 pages).
"Office Action mailed on Mar. 17, 2026 with English translation", Japanese Patent Application No. 2025-087496, (14 pages).
"Office Action mailed on Dec. 31, 2025 with English translation", Chinese Patent Application No. 202310982588.4, (5 pages).
"ARToolKit: Hardware", https://web.archive.org/web/20051013062315/http://www.hitl.washington.edu:80/artoolkit/documentation/hardware.htm (downloaded Oct. 26, 2020), Oct. 13, 2015, (3 pages).
"Communication according to Rule 164(1) EPC mailed on Feb. 23, 2022", European Patent Application No. 20753144.3, (11 pages).

(56) References Cited

OTHER PUBLICATIONS

"Communication Pursuant to Article 94(3) EPC mailed Nov. 28, 2024", European Patent Application No. 19885958.9, (5 pages).
"Communication Pursuant to Article 94(3) EPC mailed on Sep. 4, 2019", European Patent Application No. 10793707.0, (4 pages).
"Communication Pursuant to Article 94(3) EPC mailed on Apr. 25, 2022", European Patent Application No. 18885707.2, (5 pages).
"Communication Pursuant to Article 94(3) EPC mailed on Feb. 21, 2024", European Patent Application No. 20770244.0, (8 pages).
"Communication Pursuant to Article 94(3) EPC mailed on Feb. 28, 2023", European Patent Application No. 19845418.3, (6 Pages).
"Communication Pursuant to Article 94(3) EPC mailed on Feb. 7, 2025", European Patent Application No. 20154070.5, (7 pages).
"Communication Pursuant to Article 94(3) EPC mailed on Jan. 4, 2022", European Patent Application No. 20154070.5, (8 pages).
"Communication Pursuant to Article 94(3) EPC mailed on Jul. 28, 2023", European Patent Application No. 19843487.0, (15 pages).
"Communication Pursuant to Article 94(3) EPC mailed on Mar. 11, 2024", European Patent Application No. 20798769.4, (12 pages).
"Communication Pursuant to Article 94(3) EPC mailed on Mar. 18, 2025", European Patent Application No. 19810142.0, (8 pages).
"Communication Pursuant to Article 94(3) EPC mailed on May 23, 2023", European Patent Application No. 18890390.0, (5 pages).
"Communication Pursuant to Article 94(3) EPC mailed on May 30, 2022", European Patent Application No. 19768418.6, (6 pages).
"Communication Pursuant to Article 94(3) EPC mailed on Nov. 14, 2024", European Patent Application No. 19845418.3, (4 pages).
"Communication Pursuant to Article 94(3) EPC mailed on Nov. 21, 2024", European Patent Application No. 20846338.0, (11 pages).
"Communication Pursuant to Article 94(3) EPC mailed on Oct. 21, 2021", European Patent Application No. 16207441.3, (4 pages).
"Communication Pursuant to Article 94(3) EPC mailed on Oct. 6, 2023", European Patent Application No. 19851373.1, (6 pages).
"Communication Pursuant to Rule 164(1) EPC mailed on Jul. 27, 2021", European Patent Application No. 19833664.6, (11 pages).
"Decision of Rejection mailed on Jan. 5, 2023 with English translation", Chinese Patent Application No. 201880079474.6, (10 pages).
"European Search Report mailed on Oct. 15, 2020", European Patent Application No. 20180623.9, (10 pages).
"Extended European Search Report issued on Jan. 8, 2024", European Patent Application No. 23195266.4, (8 pages).
"Extended European Search Report issued on Apr. 5, 2023", European Patent Application No. 20888716.6, (11 pages).
"Extended European Search Report issued on Dec. 14, 2022", European Patent Application No. 20886547.7, (8 pages).
"Extended European Search Report issued on Jul. 20, 2022", European Patent Application No. 19885958.9, (9 pages).
"Extended European Search Report issued on May 20, 2020", European Patent Application No. 20154070.5, (7 pages).
"Extended European Search Report issued on Jan. 22, 2021", European Patent Application No. 18890390.0, (11 pages).
"Extended European Search Report issued on Apr. 25, 2024", European Patent Application No. 23208907.8, (9 pages).
"Extended European Search Report issued on Nov. 3, 2020", European Patent Application No. 18885707.2, (7 pages).
"Extended European Search Report issued on Jun. 30, 2021", European Patent Application No. 19811971.1, (9 pages).
"Extended European Search Report issued on Mar. 4, 2021", European Patent Application No. 19768418.6, (9 pages).
"Extended European Search Report issued on Nov. 4, 2020", European Patent Application No. 20190980.1, (14 pages).
"Extended European Search Report issued on Aug. 24, 2022", European Patent Application No. 20846338.0, (13 pages).
"Extended European Search Report issued on Aug. 6, 2024", European Patent Application No. 24184599.9, (14 pages).
"Extended European Search Report issued on Aug. 8, 2022", European Patent Application No. 19898874.3, (8 pages).
"Extended European Search Report issued on Dec. 2, 2024", European Patent Application No. 24167829.1, (7 pages).
"Extended European Search Report issued on Jul. 9, 2024", European Patent Application No. 24166847.4, (8 pages).
"Extended European Search Report issued on Sep. 8, 2022", European Patent Application No. 20798769.4, (13 pages).
"Extended European Search Report mailed on Nov. 3, 2022", European Patent Application No. 20770244.0, (23 pages).
"Extended European Search Report mailed on Jun. 12, 2017", European Patent Application No. 16207441.3, (8 pages).
"Extended European Search Report mailed on Jan. 28, 2022", European Patent Application No. 19815876.8, (9 pages).
"Extended European Search Report mailed on Jan. 4, 2022", European Patent Application No. 19815085.6, (9 pages).
"Extended European Search Report mailed on Jul. 16, 2021", European Patent Application No. 19810142.0, (14 pages).
"Extended European Search Report mailed on Jul. 30, 2021", European Patent Application No. 19839970.1, (7 pages).
"Extended European Search Report mailed on Jun. 19, 2020", European Patent Application No. 20154750.2, (10 pages).
"Extended European Search Report mailed on Mar. 22, 2022", European Patent Application No. 19843487.0, (14 pages).
"Extended European Search Report mailed on May 16, 2022", European Patent Application No. 19871001.4, (9 pages).
"Extended European Search Report mailed on May 30, 2022", European Patent Application No. 20753144.3, (10 pages).
"Extended European Search Report mailed on Oct. 27, 2021", European Patent Application No. 19833664.6, (10 pages).
"Extended European Search Report mailed on Sep. 20, 2021", European Patent Application No. 19851373.1, (8 pages).
"Extended European Search Report mailed on Sep. 28, 2021", European Patent Application No. 19845418.3, (13 pages).
"Final Office Action mailed Oct. 16, 2023", U.S. Appl. No. 17/098,043, (7 pages).
"Final Office Action mailed on Aug. 10, 2020", U.S. Appl. No. 16/225,961, (13 pages).
"Final Office Action mailed on Aug. 15, 2024 with English translation", Japanese Patent Application No. 2021-553297, (5 pages).
"Final Office Action mailed on Dec. 1, 2023", U.S. Appl. No. 17/357,795, (18 pages).
"Final Office Action mailed on Dec. 13, 2024 with English translation", Japanese Patent Application No. 2021-564496, (13 pages).
"Final Office Action mailed on Dec. 29, 2022", U.S. Appl. No. 17/098,059, (32 pages).
"Final Office Action mailed on Dec. 4, 2019", U.S. Appl. No. 15/564,517, (15 pages).
"Final Office Action mailed on Feb. 19, 2020", U.S. Appl. No. 15/552,897, (17 pages).
"Final Office Action mailed on Feb. 23, 2022", U.S. Appl. No. 16/748,193, (23 pages).
"Final Office Action mailed on Feb. 3, 2022", U.S. Appl. No. 16/864,721, (36 pages).
"Final Office Action mailed on Jul. 13, 2022", U.S. Appl. No. 17/262,991, (18 pages).
"Final Office Action mailed on Jun. 15, 2021", U.S. Appl. No. 16/928,313, (42 pages).
"Final Office Action mailed on Mar. 1, 2021", U.S. Appl. No. 16/214,575, (29 pages).
"Final Office Action mailed on Mar. 10, 2023", U.S. Appl. No. 17/357,795, (15 pages).
"Final Office Action mailed on Mar. 19, 2021", U.S. Appl. No. 16/530,776, (25 pages).
"Final Office Action mailed on May 24, 2024", U.S. Appl. No. 18/046,739, (52 pages).
"Final Office Action mailed on Nov. 24, 2020", U.S. Appl. No. 16/435,933, (44 pages).
"Final Office Action mailed on Sep. 17, 2021", U.S. Appl. No. 16/938,782, (44 pages).
"Final Office Action mailed on Sep. 8, 2023 with English translation", Japanese Patent Application No. 2020-566620, (18 pages).
"First Examination Report Mailed on Aug. 8, 2023", Australian Patent Application No. 2018379105, (3 pages).
"First Examination Report Mailed on Jul. 27, 2022", Chinese Patent Application No. 201980036675.2, (5 pages).

(56) References Cited

OTHER PUBLICATIONS

"First Examination Report Mailed on Jul. 28, 2022", Indian Patent Application No. 202047024232, (6 pages).
"First Examination Report Mailed on May 13, 2022", Indian Patent Application No. 202047026359, (8 pages).
"First Office Action mailed Apr. 21, 2023 with English translation", Japanese Patent Application No. 2021-509779, (26 pages).
"First Office Action mailed Dec. 12, 2023 with English translation", Japanese Patent Application No. 2021-545712, (8 pages).
"First Office Action mailed Dec. 20, 2023 with English translation", Chinese Patent Application No. 201980050600.X, (21 pages).
"First Office Action mailed Dec. 27, 2023 with English translation", Chinese Patent Application No. 201980075942.7, (7 pages).
"First Office Action mailed Jul. 4, 2023 with English translation", Japanese Patent Application No. 2021-505669, (6 pages).
"First Office Action mailed Jun. 20, 2024 with English translation", Japanese Patent Application No. 2021-564496, (14 pages).
"First Office Action mailed Jun. 24, 2024 with English translation", Japanese Patent Application No. 2022-504602, (7 pages).
"First Office Action mailed Mar. 1, 2024 with English translation", Japanese Patent Application No. 2021-553297, (5 pages).
"First Office Action mailed Mar. 20, 2024 with English translation", Chinese Patent Application No. 202080048293.4, (22 pages).
"First Office Action mailed Nov. 2, 2023 with English translation", Chinese Patent Application No. 201980090867.1, (16 pages).
"First Office Action mailed Oct. 17, 2024 with English translation", Japanese Patent Application No. 2022-527990, (24 pages).
"First Office Action mailed on Apr. 13, 2023 with English Translation", Japanese Patent Application No. 2020-567766, (7 pages).
"First Office Action mailed on Dec. 11, 2023 with translation", Chinese Patent Application No. 201980032005.3, (17 pages).
"First Office Action mailed on Dec. 22, 2022 with English translation", Chinese Patent Application No. 201980061450.2, (11 pages).
"First Office Action mailed on Dec. 25, 2023 with English translation", Chinese Patent Application No. 2019800046303.8, (13 pages).
"First Office Action mailed on Feb. 1, 2024 with English translation", Chinese Patent Application No. 202080018865.4, (9 pages).
"First Office Action mailed on Feb. 11, 2022 with English translation", Chinese Patent Application No. 201880089255.6, (17 pages).
"First Office Action mailed on Jan. 24, 2023 with English translation", Japanese Patent Application No. 2020-549034, (7 pages).
"First Office Action mailed on Jan. 30, 2023 with English translation", Chinese Patent Application No. 201980082951.9, (5 pages).
"First Office Action mailed on Jun. 13, 2023 with English translation", Japanese Patent Application No. 2020-567853, (7 pages).
"First Office Action mailed on Mar. 14, 2022 with English translation", Chinese Patent Application No. 201880079474.6, (11 pages).
"First Office Action mailed on Mar. 25, 2024 with English translation", Chinese Patent Application No. 202080018919.7, (31 pages).
"First Office Action mailed on Mar. 27, 2023 with English translation", Japanese Patent Application No. 2020-566617, (6 pages).
"First Office Action mailed on Mar. 6, 2023 with English translation", Korean Patent Application No. 10-2020-7019685, (7 pages).
"First Office Action mailed on May 26, 2023 with English translation", Japanese Patent Application No. 2021-500607, (6 pages).
"First Office Action mailed on May 30, 2023", Israeli Patent Application No. 275065, (4 pages).
"First Office Action mailed on May 30, 2023 with English translation", Japanese Patent Application No. 2021-519873, (8 pages).
"First Office Action mailed on Sep. 16, 2022 with English translation", Chinese Patent Application No. 201980063642.7, (7 pages).
"First Office Action mailed Sep. 29, 2023 with English translation", Japanese Patent Application No. 2023-10887, (5 pages).
"First Office Action with English translation dated Aug. 8, 2024", Chinese Patent Application No. 202080053774.4, (23 pages).
"FS_XR5G: Permanent document, v0.4.0", Qualcomm Incorporated, 3GPP TSG-SA 4 Meeting 103 retrieved from the Internet: URL:http://www.3gpp.org/ftp/Meetings%5F3GPP%5FSYNC/SA4/Docs/S4%2DI90526%2Ezip [retrieved on Apr. 12, 2019] , Apr. 12, 2019 , (98 pages).
"International Search Report and Written Opinion mailed on Feb. 12, 2021", International PCT Application No. PCT/US20/60555, (25 pages).
"International Search Report and Written Opinion mailed on Mar. 12, 2020", International PCT Patent Application No. PCT/US19/67919, (14 pages).
"International Search Report and Written Opinion mailed on Aug. 15, 2019", International PCT Patent Application No. PCT/US19/33987, (20 pages).
"International Search Report and Written Opinion mailed on Jun. 15, 2020", International PCT Patent Application No. PCT/US2020/017023, (13 pages).
"International Search Report and Written Opinion mailed on Oct. 16, 2019", International PCT Patent Application No. PCT/US19/43097, (10 pages).
"International Search Report and Written Opinion mailed on Oct. 16, 2019", International PCT Patent Application No. PCT/US19/36275, (10 pages).
"International Search Report and Written Opinion mailed on Oct. 16, 2019", International PCT Patent Application No. PCT/US19/43099, (9 pages).
"International Search Report and Written Opinion mailed on Jun. 17, 2016", International PCT Patent Application No. PCT/FI2016/050172, (9 pages).
"International Search Report and Written Opinion mailed on Feb. 2, 2021", International PCT Patent Application No. PCT/US20/60550, (9 pages).
"International Search Report and Written Opinion mailed on Oct. 22, 2019", International PCT Patent Application No. PCT/US19/43751, (9 pages).
"International Search Report and Written Opinion mailed on Dec. 23, 2019", International PCT Patent Application No. PCT/US19/44953, (11 pages).
"International Search Report and Written Opinion mailed on May 23, 2019", International PCT Patent Application No. PCT/US18/66514, (17 pages).
"International Search Report and Written Opinion mailed on Sep. 26, 2019", International PCT Patent Application No. PCT/US19/40544, (12 pages).
"International Search Report and Written Opinion mailed on Aug. 27, 2019", International PCT Application No. PCT/US2019/035245, (8 pages).
"International Search Report and Written Opinion mailed on Dec. 27, 2019", International PCT Application No. PCT/US19/47746, (16 pages).
"International Search Report and Written Opinion mailed on Dec. 3, 2020", International PCT Patent Application No. PCT/US20/43596, (25 pages).
"International Search Report and Written Opinion mailed on Sep. 30, 2019", International PCT Patent Application No. PCT/US19/40324, (7 pages).
"International Search Report and Written Opinion mailed on Sep. 4, 2020", International PCT Patent Application No. PCT/US20/31036, (13 pages).
"International Search Report and Written Opinion mailed on Jun. 5, 2020", International PCT Patent Application No. PCT/US20/19871, (9 pages).
"International Search Report and Written Opinion mailed on Aug. 8, 2019", International PCT Patent Application No. PCT/US2019/034763, (8 pages).
"International Search Report and Written Opinion mailed on Oct. 8, 2019", International PCT Patent Application No. PCT/US19/41151, (7 pages).
"International Search Report and Written Opinion mailed on Jan. 9, 2020", International PCT Application No. PCT/US19/55185, (10 pages).
"International Search Report and Written Opinion mailed on Feb. 28, 2019", International PCT Patent Application No. PCT/US18/64686, (8 pages).

(56) References Cited

OTHER PUBLICATIONS

"International Search Report and Written Opinion mailed on Feb. 7, 2020", International PCT Patent Application No. PCT/US2019/061265, (11 pages).
"International Search Report and Written Opinion mailed on Jun. 11, 2019", International PCT Application No. PCT/US19/22620, (7 pages).
"Invitation to Pay Additional Fees mailed Aug. 15, 2019", International PCT Patent Application No. PCT/US19/36275, (2 pages).
"Invitation to Pay Additional Fees mailed Sep. 24, 2020", International PCT Patent Application No. PCT/US2020/043596, (3 pages).
"Invitation to Pay Additional Fees mailed on Oct. 22, 2019", International PCT Patent Application No. PCT/US19/47746, (2 pages).
"Invitation to Pay Additional Fees mailed on Apr. 3, 2020", International PCT Patent Application No. PCT/US20/17023, (2 pages).
"Invitation to Pay Additional Fees mailed on Oct. 17, 2019", International PCT Patent Application No. PCT/US19/44953, (2 pages).
"Multi-core processor", TechTarget , 2013 , (1 page).
"Non Final Office Action mailed on Apr. 1, 2022", U.S. Appl. No. 17/256,961, (65 pages).
"Non Final Office Action mailed on Apr. 11, 2022", U.S. Appl. No. 16/938,782, (52 pages).
"Non Final Office Action mailed on Apr. 12, 2022", U.S. Appl. No. 17/262,991, (60 pages).
"Non Final Office Action mailed on Apr. 13, 2023", U.S. Appl. No. 17/098,043, (7 pages).
"Non Final Office Action mailed on Apr. 16, 2025", U.S. Appl. No. 18/679,328, (10 pages).
"Non Final Office Action mailed on Aug. 2, 2023", U.S. Appl. No. 17/807,600, (25 pages).
"Non Final Office Action mailed on Aug. 21, 2019", U.S. Appl. No. 15/564,517, (14 pages).
"Non Final Office Action mailed on Aug. 4, 2021", U.S. Appl. No. 16/864,721, (21 pages).
"Non Final Office Action mailed on Dec. 7, 2022", U.S. Appl. No. 17/357,795, (63 pages).
"Non Final Office Action mailed on Feb. 2, 2022", U.S. Appl. No. 16/783,866, (8 pages).
"Non Final Office Action mailed on Feb. 26, 2024", U.S. Appl. No. 18/046,739, (48 pages).
"Non Final Office Action mailed on Feb. 3, 2023", U.S. Appl. No. 17/429,100, (16 pages).
"Non Final Office Action mailed on Feb. 3, 2023", U.S. Appl. No. 17/497,965, (32 pages).
"Non Final Office Action mailed on Jan. 24, 2023", U.S. Appl. No. 17/497,940, (10 pages).
"Non Final Office Action mailed on Jan. 26, 2021", U.S. Appl. No. 16/928,313, (33 pages).
"Non Final Office Action mailed on Jan. 27, 2021", U.S. Appl. No. 16/225,961, (15 pages).
"Non Final Office Action mailed on Jan. 3, 2025", U.S. Appl. No. 18/746,709, (31 pages).
"Non Final Office Action mailed on Jul. 20, 2023", U.S. Appl. No. 17/650,188, (11 pages).
"Non Final Office Action mailed on Jul. 26, 2022", U.S. Appl. No. 17/098,059, (28 pages).
"Non Final Office Action mailed on Jul. 27, 2020", U.S. Appl. No. 16/435,933, (16 pages).
"Non Final Office Action mailed on Jul. 9, 2021", U.S. Appl. No. 17/002,663, (43 pages).
"Non Final Office Action mailed on Jul. 9, 2021", U.S. Appl. No. 16/833,093, (47 pages).
"Non Final Office Action mailed on Jun. 10, 2021", U.S. Appl. No. 16/938,782, (40 Pages).
"Non Final Office Action mailed on Jun. 14, 2023", U.S. Appl. No. 17/516,483, (10 pages).
"Non Final Office Action mailed on Jun. 17, 2020", U.S. Appl. No. 16/682,911, (22 pages).
"Non Final Office Action mailed on Jun. 17, 2024", U.S. Appl. No. 18/348,732, (19 pages).
"Non Final Office Action mailed on Jun. 19, 2020", U.S. Appl. No. 16/225,961, (35 pages).
"Non Final Office Action mailed on Jun. 29, 2021", U.S. Appl. No. 16/698,588, (58 pages).
"Non Final Office Action mailed on Mar. 1, 2023", U.S. Appl. No. 18/046,739, (34 pages).
"Non Final Office Action mailed on Mar. 3, 2021", U.S. Appl. No. 16/427,337, (41 pages).
"Non Final Office Action mailed on Mar. 31, 2022", U.S. Appl. No. 17/257,814, (60 pages).
"Non Final Office Action mailed on Mar. 9, 2022", U.S. Appl. No. 16/870,676, (57 pages).
"Non Final Office Action mailed on May 10, 2022", U.S. Appl. No. 17/140,921, (25 pages).
"Non Final Office Action mailed on May 11, 2023", U.S. Appl. No. 17/822,279, (24 pages).
"Non Final Office Action mailed on May 16, 2024", U.S. Appl. No. 18/361,546, (11 pages).
"Non Final Office Action mailed on May 17, 2022", U.S. Appl. No. 16/748,193, (11 pages).
"Non Final Office Action mailed on May 26, 2021", U.S. Appl. No. 16/214,575, (19 pages).
"Non Final Office Action mailed on Nov. 19, 2019", U.S. Appl. No. 16/355,611, (31 pages).
"Non Final Office Action mailed on Nov. 22, 2023", U.S. Appl. No. 17/268,376, (8 pages).
"Non Final Office Action mailed on Nov. 3, 2023", U.S. Appl. No. 17/416,248, (17 pages).
"Non Final Office Action mailed on Nov. 5, 2020", U.S. Appl. No. 16/530,776, (45 pages).
"Non Final Office Action mailed on Oct. 11, 2023", U.S. Appl. No. 18/151,763, (14 pages).
"Non Final Office Action mailed on Oct. 22, 2019", U.S. Appl. No. 15/859,277, (15 pages).
"Non Final Office Action mailed on Oct. 24, 2023", U.S. Appl. No. 17/259,020, (21 pages).
"Non Final Office Action mailed on Sep. 1, 2020", U.S. Appl. No. 16/214,575, (40 pages).
"Non Final Office Action mailed on Sep. 19, 2022", U.S. Appl. No. 17/263,001, (14 pages).
"Non Final Office Action mailed on Sep. 20, 2021", U.S. Appl. No. 17/105,848, (56 pages).
"Non Final Office Action mailed on Sep. 24, 2024", U.S. Appl. No. 18/597,716, (9 pages).
"Non Final Office Action mailed on Sep. 29, 2021", U.S. Appl. No. 16/748,193, (62 pages).
"Notice of Allowance mailed on Jul. 27, 2023 with English translation", Korean Patent Application No. 10-2020-7019685, (4 pages).
"Notice of Allowance mailed on Mar. 25, 2020", U.S. Appl. No. 15/564,517, (11 pages).
"Notice of Allowance mailed on Oct. 5, 2020", U.S. Appl. No. 16/682,911, (27 pages).
"Notice of Reason for Rejection mailed on Oct. 28, 2022 with English translation", Japanese Patent Application No. 2020-531452, (3 pages).
"Notice of Reason of Refusal mailed on Sep. 11, 2020 with English translation", Japanese Patent Application No. 2019-140435, (6 pages).
"Notice of Reasons for Rejection mailed on Dec. 4, 2024 with English tranlsation", Japanese Patent Application No. 2023-118968, (9 pages).
"Office Action mailed Feb. 20, 2025 with English translation", Japanese Patent Application No. 2024-135314, (6 pages).
"Office Action mailed May 31, 2023", Israeli Patent Application No. 275373, (5 pages).
"Office Action mailed Nov. 21, 2023 with English Translation", Japanese Patent Application No. 2021-535716, (15 pages).
"Office Action mailed on Apr. 13, 2023 with English translation", Japanese Patent Application No. 2020-533730, (13 pages).
"Office Action mailed on Apr. 16, 2025 with English Translation", Japanese Patent Application No. 2024-139589, (8 pages).

(56) References Cited

OTHER PUBLICATIONS

"Office Action mailed on Apr. 16, 2025 with English Translation", Japanese Patent Application No. 2022-527990, (9 pages).
"Office Action mailed on Dec. 14, 2023 with English translation", Japanese Patent Application No. 2021-526564, (13 pages).
"Office Action mailed on Feb. 19, 2024 with English translation", Korean Patent Application No. 10-2020-7020552, (18 pages).
"Office Action mailed on Feb. 26, 2024 with English translation", Chinese Patent Application No. 201980069194.1, (11 pages).
"Office Action mailed on Jan. 22, 2025 with English translation", Japanese Patent Application No. 2024-63271, (8 pages).
"Office Action mailed on Jul. 20, 2023 with English translation", Japanese Patent Application No. 2021-505884, (6 pages).
"Office Action mailed on Jun. 8, 2023 with English translation", Japanese Patent Application No. 2021-503762, (6 pages).
"Office Action mailed on Mar. 17, 2025 with English Translation", Japanese Patent Application No. 2023-221068, (9 pages).
"Office Action mailed on Mar. 30, 2023 with English translation", Japanese Patent Application No. 2020-566620, (10 pages).
"Office Action mailed on Mar. 6, 2024 with English translation", Chinese Patent Application No. 201980053016.X, (7 pages).
"Office Action mailed on Nov. 24, 2022 with English Translation", Japanese Patent Application No. 2020-533730, (11 pages).
"Office Action mailed on Nov. 7, 2023 with English translation", Korean Patent Application No. 10-2023-7036734, (5 pages).
"Office Action mailed on Nov. 7, 2024 with English translation", Korean Patent Application No. 10-2024-7032937, (7 pages).
"Office Action mailed on Nov. 8, 2023 with English translation", Chinese Patent Application No. 201980060018.1, (12 pages).
"Office Action mailed on Oct. 4, 2024 with English translation", Japanese Patent Application No. 2022-527710, (10 pages).
"Penultimate Office Action mailed on Apr. 9, 2024 - English translation", Japanese Patent Application No. 2021-535716, (3 pages).
"Penultimate Office Action mailed on Oct. 19, 2023 with English translation", Japanese Patent Application No. 2021-509779, (5 pages).
"Penultimate Office Action mailed on Sep. 17, 2024 with English translation", Japanese Patent Application No. 2023-115047, (7 pages).
"Phototourism Challenge", CVPR 2019 Image Matching Work-shop. https://image matching-workshop. github.io., (16 pages).
"Second Office Action mailed on Jul. 13, 2022 with English Translation", Chinese Patent Application No. 201880079474.6, (10 pages).
"Second Office Action mailed on Jun. 20, 2022 with English Translation", Chinese Patent Application No. 201880089255.6, (14 pages).
"Second Office Action mailed on May 2, 2023 with English Translation", Japanese Patent Application No. 2020-549034, (6 pages).
"Second Office Action mailed on Sep. 25, 2023 with English translation", Japanese Patent Application No. 2020-567853, (8 pages).
"Second Office Action with English translation mailed on Jul. 2, 2024", Chinese Patent Application No. 201980032005.3, (15 pages).
"Second Office Action with English translation mailed on Mar. 25, 2025", Chinese Patent Application No. 202080053774.4, (11 pages).
"Summons to attend oral proceedings pursuant to Rule 115(1) EPC mailed on Jul. 15, 2019", European Patent Application No. 15162521.7, (7 pages).
"Wikipedia Dioptre", Jun. 22, 2018 (Jun. 22, 2018), XP093066995, Retrieved from the Internet: URL:https://en.wikipedia.org/w/index.php? title=Dioptre&direction=next&oldid=846451540 [retrieved on Jul. 25, 2023], (3 pages).
Aarik, J. , et al. , "Effect of crystal structure on optical properties of TiO2 films grown by atomic layer deposition", Thin Solid Films; Publication [online). May 19, 1998 [retrieved Feb. 19, 2020]. Retrieved from the Internet: <URL: https://www.sciencedirect.com/science/article/pii/S0040609097001351 ?via%3Dihub>; DOI: 10.1016/S0040-6090(97)00135-1; see entire document, (2 pages).
Altwaijry , et al. , "Learning to Detect and Match Keypoints with Deep Architectures", Proceedings of the British Machine Vision Conference (BMVC), BMVA Press, Sep. 2016, [retrieved on Jan. 8, 2021 (Jan. 8, 2021 )] < URL: http://www.bmva.org/bmvc/2016/papers/paper049/index.html >, en lire document, especially Abstract.
Anonymous, "Koi Pond: Top iPhone App Store Paid App", https://web.archive.org/web/20080904061233/https://www.iphoneincanada.ca/reviews /koi-pond-top-iphone-app-store-paid-app/—[retrieved on Aug. 9, 2022].
Arandjelović, Relja , et al. , "Three things everyone should know to improve object retrieval", CVPR, 2012, (8 pages).
Azom, "Silica—Silicon Dioxide (SiO2)", AZO Materials; Publication [Online]. Dec. 13, 2001 [retrieved Feb. 19, 2020]. Retrieved from the Internet: <URL: https://www.azom.com/article.aspx?Article1D=1114>.
Azuma, Ronald T., "A Survey of Augmented Reality", Presence: Teleoperators and Virtual Environments 6, 4 (Aug. 1997), 355-385; https://web.archive.org/web/20010604100006/http://www.cs.unc.edu/~azuma/ARpresence.pdf (downloaded Oct. 26, 2020).
Azuma, Ronald T. , "Predictive Tracking for Augmented Reality", Department of Computer Science, Chapel Hill NC; TR95-007, Feb. 1995, 262 pages.
Battaglia, Peter W, et al. , "Relational inductive biases, deep learning, and graph networks", arXiv:1806.01261, Oct. 17, 2018, pp. 1-40.
Berg, Alexander C , et al. , "Shape matching and object recognition using low distortion correspondences", In CVPR, 2005, (8 pages).
Bian, Jiawang , et al. , "GMS: Grid-based motion statistics for fast, ultra-robust feature correspondence.", In CVPR (Conference on Computer Vision and Pattern Recognition), 2017, (10 pages).
Bimber, Oliver , et al. , "Spatial Augmented Reality: Merging Real and Virtual Worlds", https://web.media.mit.edu/~raskar/book/BimberRaskarAugmentedRealityBook.pdf; published by A K Peters/CRC Press (Jul. 31, 2005); eBook (3rd Edition, 2007), (393 pages).
Brachmann, Eric , et al. , "Neural-Guided Ransac: Learning Where to Sample Model Hypotheses", In ICCV (International Conference on Computer Vision ), arXiv:1905.04132v2 [cs.CV] Jul. 31, 2019, (17 pages).
Butail , et al. , "Putting the fish in the fish tank: Immersive VR for animal behavior experiments", In: 2012 IEEE International Conference on Robotics and Automation. May 18, 2012 (May 18, 2012) Retrieved on Nov. 14, 2020 (Nov. 14, 2020) from <http:/lcdcl.umd.edu/papers/icra2012.pdf> entire document.
Caetano, Tiberio S , et al. , "Learning graph matching", IEEE TPAMI, 31(6): 1048-1058, 2009.
Cech, Jan , et al. , "Efficient sequential correspondence selection by cosegmentation", IEEE TPAMI, 32(9):1568-1581, Sep. 2010.
Chittineni, C. , et al. , "Single filters for combined image geometric manipulation and enhancement", Proceedings of SPIE vol. 1903, Image and Video Processing, Apr. 8, 1993, San Jose, CA. (Year: 1993), pp. 111-121.
Cuturi, Marco, "Sinkhorn distances: Lightspeed computation of optimal transport", NIPS, 2013, (9 pages).
Dai, Angela , et al. , "ScanNet: Richly-annotated 3d reconstructions of indoor scenes", In CVPR, arXiv:1702.04405v2 [cs.CV] Apr. 11, 2017, (22 pages).
Deng, Haowen , et al. , "PPFnet: Global context aware local features for robust 3d point matching", In CVPR, arXiv:1802.02669v2 [cs.CV] Mar. 1, 2018, (12 pages).
Detone, Daniel , et al. , "Deep image homography estimation", In RSS Work-shop: Limits and Potentials of Deep Learning in Robotics, arXiv:1606.03798v1 [cs.CV] Jun. 13, 2016, (6 pages).
Detone, Daniel , et al. , "Self-improving visual odometry", arXiv:1812.03245, Dec. 8, 2018, (9 pages).
Detone, Daniel , et al. , "SuperPoint: Self-supervised interest point detection and description", In CVPR Workshop on Deep Learning for Visual SLAM, arXiv:1712.07629v4 [cs.CV] Apr. 19, 2018, (13 pages).
Dusmanu, Mihai , et al. , "D2-net: A trainable CNN for joint detection and description of local features", CVPR, arXiv:1905.03561v1 [cs.CV] May 9, 2019, (16 pages).

(56) References Cited

OTHER PUBLICATIONS

Ebel, Patrick , et al. , "Beyond cartesian representations for local descriptors", ICCV, arXiv:1908.05547v1 [cs.CV] Aug. 15, 2019, (11 pages).
Fischler, Martin A , et al. , "Random sample consensus: a paradigm for model fitting with applications to image analysis and automated cartography", Communications of the ACM, 24(6): 1981, pp. 381-395.
Gilmer, Justin , et al. , "Neural message passing for quantum chemistry", In ICML, arXiv:1704.01212v2 [cs.LG] Jun. 12, 2017, (14 pages).
Giuseppe, Donato , et al. , "Stereoscopic helmet mounted system for real time 3D environment reconstruction and indoor ego—motion estimation", Proc. SPIE 6955, Head- and Helmet-Mounted Displays XIII: Design and Applications, SPIE Defense and Security Symposium, 2008, Orlando, Florida, United States, 69550P.
Goodfellow, "Titanium Dioxide—Titania (TiO2)", AZO Materials; Publication [online]. Jan. 11, 2002 [retrieved Feb. 19, 2020]. Retrieved from the Internet: <URL: https://www.azom.com/article.aspx?Article1D=1179>.
Hartley, Richard , et al. , "Multiple View Geometry in Computer Vision", Cambridge University Press, 2003, pp. 1-673.
Jacob, Robert J.K. , "Eye Tracking in Advanced Interface Design", Human-Computer Interaction Lab, Naval Research Laboratory, Washington, D.C., date unknown. 2003, pp. 1-50.
Lee , et al. , "Self-Attention Graph Pooling", Cornell University Library/Computer Science/Machine Learning, Apr. 17, 2019 [retrieved on Jan. 8, 2021 from the Internet< URL: https://arxiv.org/abs/1904.08082 >, entire document.
Lee, Juho , et al. , "Set transformer: A frame-work for attention-based permutation-invariant neural networks", ICML, arXiv:1810.00825v3 [cs.LG] May 26, 2019, (17 pages).
Leordeanu, Marius , et al. , "A spectral technique for correspondence problems using pairwise constraints", Proceedings of (ICCV) International Conference on Computer Vision, vol. 2, pp. 1482-1489, Oct. 2005, (8 pages).
Levola, T., "Diffractive Optics for Virtual Reality Displays", Journal of the SID Eurodisplay 14/05, 2005, XP008093627, chapters 2-3, Figures 2 and 10, pp. 467-475.
Levola, Tapani, "Invited Paper: Novel Diffractive Optical Components for Near to Eye Displays—Nokia Research Center", SID 2006 Digest, 2006 SID International Symposium, Society for Information Display, vol. XXXVII, May 24, 2005, chapters 1-3, figures 1 and 3, pp. 64-67.
Li, Yujia , et al. , "Graph Matching Networks for Learning the Similarity of Graph Structured Objects", arxiv.org, Cornell University Library, 201 Olin Library Cornell University Ithaca, NY 14853, XP081268608.
Li, Yujia , et al. , "Graph matching networks for learning the similarity of graph structured objects", ICML, arXiv:1904.12787v2 [cs.LG] May 12, 2019, (18 pages).
Li, Zhengqi , et al. , "Megadepth: Learning single-view depth prediction from internet photos", In CVPR, fromarXiv: 1804.00607v4 [cs.CV] Nov. 28, 2018, (10 pages).
Libovicky , et al. , "Input Combination Strategies for Multi-Source Transformer Decoder", Proceedings of the Third Conference on Machine Translation (WMT). vol. 1: Research Papers, Belgium, Brussels, Oct. 31-Nov. 1, 2018; retrieved on Jan. 8, 2021 (Jan. 8, 2021 ) from < URL: https://doi.org/10.18653/v1/W18-64026 >, entire document.
Loiola, Eliane Maria, et al. , "A survey for the quadratic assignment problem", European journal of operational research, 176(2): 2007, pp. 657-690.
Lowe, David G , "Distinctive image features from scale-invariant keypoints", International Journal of Computer Vision, 60(2): 91-110, 2004, (28 pages).
Luo, Zixin , et al. , "ContextDesc: Local descriptor augmentation with cross-modality context", CVPR, arXiv:1904.04084v1 [cs.CV] Apr. 8, 2019, (14 pages).
Luo, Zixin , et al. , "ContextDesc: Local Descriptor Augmentation With Cross-Modality Context", 2019 IEEE/CVF Conference on Computer Vision and Pattern Recognition (CVPR), IEEE, XP033686823, DOI: 10.1109/CVPR.2019.00263 [retrieved on Jan. 8, 2020], pp. 2522-2531.
Memon, F. , et al. , "Synthesis, Characterization and Optical Constants of Silicon Oxycarbide", EPJ Web of Conferences; Publication [online). Mar. 23, 2017 [retrieved Feb. 19, 2020) .<URL: https://www.epj-conferences.org/articles/epjconf/pdf/2017/08/epjconf_nanop2017 _00002.pdf>; DOI: 10.1051/epjconf/201713900002, (8 pages).
Molchanov, Pavlo , et al. , "Short-range FMCW monopulse radar for hand-gesture sensing", 2015 IEEE Radar Conference (RadarCon) (2015), pp. 1491-1496.
Mrad , et al. , "A framework for System Level Low Power Design Space Exploration", 1991.
Munkres, James, "Algorithms for the assignment and transportation problems", Journal of the Society for Industrial and Applied Mathematics, 5(1): 1957, pp. 32-38.
Ono, Yuki , et al. , "LF-Net: Learning local features from images", 32nd Conference on Neural Information Processing Systems (NIPS 2018), arXiv:1805.09662v2 [cs.CV] Nov. 22, 2018, (13 pages).
Paszke, Adam , et al. , "Automatic differentiation in Pytorch", 31st Conference on Neural Information Processing Systems (NIPS 2017), Long Beach, CA, USA, (4 pages).
Peyré, Gabriel , et al. , "Computational Optimal Transport", Foundations and Trends in Machine Learning, 11(5-6):355-607, 2019; arXiv:1803.00567v4 [stat.ML] Mar. 18, 2020, (209 pages).
Qi, Charles Ruizhongtai, et al. , "Pointnet++: Deep hierarchical feature learning on point sets in a metric space.", 31st Conference on Neural Information Processing Systems (NIPS 2017), Long Beach, CA, USA., Jun. 7, 2017, (10 pages).
Qi, Charles R , et al. , "Pointnet: Deep Learning on Point Sets for 3D Classification and Segmentation", CVPR, arXiv:1612.00593v2 [cs.CV] Apr. 10, 2017, (19 pages).
Radenović, Filip , et al. , "Revisiting Oxford and Paris: Large-Scale Image Retrieval Benchmarking", CVPR, arXiv:1803.11285v1 [cs.CV] Mar. 29, 2018, (10 pages).
Raguram, Rahul , et al. , "A comparative analysis of ransac techniques leading to adaptive real-time random sample consensus", Computer Vision—ECCV 2008, 10th European Conference on Computer Vision, Marseille, France, Oct. 12-18, 2008, Proceedings, Part I, (15 pages).
Ranftl, René , et al. , "Deep fundamental matrix estimation", European Conference on Computer Vision (ECCV), 2018, (17 pages).
Revaud, Jerome , et al. , "R2D2: Repeatable and Reliable Detector and Descriptor", In NeurIPS, arXiv:1906.06195v2 [cs.CV] Jun. 17, 2019, (12 pages).
Rocco, Ignacio , et al. , "Neighbourhood Consensus Networks", 32nd Conference on Neural Information Processing Systems (NeurIPS 2018), Montréal, Canada, arXiv:1810.10510v2 [cs.CV] Nov. 29, 2018, (20 pages).
Rublee, Ethan , et al. , "ORB: An efficient alternative to SIFT or SURF", Proceedings of the IEEE International Conference on Computer Vision. 2564-2571. 2011; 10.1109/ICCV.2011.612654, (9 pages).
Sarlin , et al. , "SuperGlue: Learning Feature Matching with Graph Neural Networks", Cornell University Library/Computer Science/Computer Vision and Pattern Recognition, Nov. 26, 2019 [retrieved on Jan. 8, 2021 from the Internet< URL: https://arxiv.org/abs/1911.11763 >, entire document.
Sattler, Torsten , et al. , "Scramsac: Improving Ransac's efficiency with a spatial consistency filter", ICCV, 2009: 2090-2097., (8 pages).
Schonberger, Johannes Lutz, et al. , "Pixelwise view selection for un-structured multi-view stereo", Computer Vision—ECCV 2016: 14th European Conference, Amsterdam, The Netherlands, Oct. 11-14, 2016, Proceedings, Part III, pp. 501-518, 2016.
Schonberger, Johannes Lutz, et al. , "Structure-from-motion revisited", Proceedings of the IEEE Conference on Computer Vision and Pattern Recognition (CVPR), 2016, pp. 4104-4113, (11 pages).

(56) References Cited

OTHER PUBLICATIONS

Sheng, Liu , et al. , "Time-multiplexed dual-focal plane head-mounted display with a liquid lens", Optics Letters, Optical Society of Amer i ca, US, vol. 34, No. 11, Jun. 1, 2009 (Jun. 1, 2009), XP001524475, ISSN: 0146-9592, pp. 1642-1644.
Sinkhorn, Richard , et al. , "Concerning nonnegative matrices and doubly stochastic matrices.", Pacific Journal of Mathematics, 1967, pp. 343-348.
Spencer, T. , et al. , "Decomposition of poly(propylene carbonate) with UV sensitive iodonium 11 salts", Polymer Degradation and Stability; (online]. Dec. 24, 2010 (retrieved Feb. 19, 2020]., (17 pages).
Tanriverdi, Vildan , et al. , "Interacting With Eye Movements in Virtual Environments", Department of Electrical Engineering and Computer Science, Tufts University; Proceedings of the SIGCHI conference on Human Factors in Computing Systems, Apr. 2000, pp. 1-8.
Thomee, Bart , et al. , "YFCC100m: The new data in multimedia research", Communications of the ACM, 59(2):64-73, 2016; arXiv:1503.01817v2 [cs.MM] Apr. 25, 2016, (8 pages).
Torresani, Lorenzo , et al. , "Feature correspondence via graph matching: Models and global optimization", Computer Vision—ECCV 2008, 10th European Conference on Computer Vision, Marseille, France, Oct. 12-18, 2008, Proceedings, Part II, (15 pages).
Tuytelaars, Tinne , et al. , "Wide baseline stereo matching based on local, affinely invariant regions", BMVC, 2000, pp. 1-14.
Ulyanov, Dmitry , et al. , "Instance normalization: The missing ingredient for fast stylization", arXiv:1607.08022v3 [cs.CV] Nov. 6, 2017, (6 pages).
Vaswani, Ashish , et al. , "Attention is all you need", 31st Conference on Neural Information Processing Systems (NIPS 2017), Long Beach, CA, USA; arXiv:1706.03762v5 [cs.CL] Dec. 6, 2017, (15 pages).
Veličkovič, Petar , et al. , "Graph attention networks", ICLR, arXiv:1710.10903v3 [stat.ML] Feb. 4, 2018, (12 pages).
Villani, Cédric, "Optimal transport: old and new", vol. 338. Springer Science & Business Media, Jun. 2008, pp. 1-998.
Wang, Xiaolong , et al. , "Non-local neural networks", CVPR, arXiv:1711.07971v3 [cs.CV] Apr. 13, 2018, (10 pages).
Wang, Yue , et al. , "Deep Closest Point: Learning representations for point cloud registration", ICCV, arXiv:1905.03304v1 [cs.CV] May 8, 2019, (10 pages).
Wang, Yue , et al. , "Dynamic Graph CNN for learning on point clouds", ACM Transactions on Graphics, arXiv:1801.07829v2 [cs.CV] Jun. 11, 2019, (13 pages).
Weissel , et al. , "Process cruise control: event-driven clock scaling for dynamic power management", Proceedings of the 2002 international conference on Compilers, architecture, and synthesis for embedded systems. Oct. 11, 2002 (Oct. 11, 2002) Retrieved on May 16, 2020 (May 16, 2020) from <URL: https://dl.acm.org/doi/pdf/10.1145/581630.581668>.
Yi, Kwang Moo, et al. , "Learning to find good correspondences", CVPR, arXiv:1711.05971v2 [cs.CV] May 21, 2018, (13 pages).
Yi, Kwang Moo , et al. , "Lift: Learned invariant feature transform", ECCV, arXiv:1603.09114v2 [cs.CV] Jul. 29, 2016, (16 pages).
Zaheer, Manzil , et al. , "Deep Sets", 31st Conference on Neural Information Processing Systems (NIPS 2017), Long Beach, CA, USA; arXiv:1703.06114v3 [cs.LG] Apr. 14, 2018, (29 pages).
Zhang, Jiahui , et al. , "Learning two-view correspondences and geometry using order-aware network", ICCV; aarXiv:1908.04964v1 [cs.CV] Aug. 14, 2019, (11 pages).
Zhang, Li , et al. , "Dual graph convolutional net-work for semantic segmentation", BMVC, 2019; arXiv:1909.06121v3 [cs.CV] Aug. 26, 2020, (18 pages).
Zhang, Zen , et al. , "Deep Graphical Feature Learning for the Feature Matching Problem", 2019 IEEE/CVF International Conference on Computer Vision (ICCV), IEEE, XP033723985, DOI: 10.1109/ICCV.2019.00519 [retrieved on Feb. 24, 2020], pp. 5086-5095.
"Notice of Allowance mailed on Jul. 8, 2026", Japanese Patent Application No. 2024-233241, (2 pages).
"Office Action mailed on Aug. 26, 2026 with English translation", Japanese Patent Application No. 2025-135738, (13 pages).
Wang, et al., "Learning Combinatorial Embedding Networks for Deep Graph Matching", Proceedings of the IEEE/CVF International Conference on Computer Vision (ICCV), 2019, pp. 3056-3065.
"Office Action mailed on Apr. 13, 2026", Korean Patent Application No. 10-2025-7029784, 11 pages).
"Office Action mailed on Apr. 20, 2026 with English translation", Japanese Patent Application No. 2025-84148, (4 pages).
"Second Office Action mailed on May 22, 2026 with English translation", Chinese Patent Application No. 202310982588.4, (10 pages).
"Office Action mailed on Apr. 20, 2026 with English translaiton", Chinese patent application No. 202310782989.5, (10 pages).
"Second Office Action with English translation mailed on May 29, 2026", Chinese Patent Application No. 202080079114.3, (5 pages).
"Notice of Allowance and Examiner-Initiated Interview Summary mailed on Jun. 23, 2026", U.S. Appl. No. 18/830,108, (12 pages).
"Office Action mailed on Jun. 9, 2026 with English translation", Japanese Patent Application No. 2025-64906, (10 pages).
Leydon, Krispin, "Sensing the Position & Orientation of Hand-Held Objects: An Overview of Techniques", UL-CSIS-03-02 IDC Dec 3, 2001 (Year: 2001), (15 pages).
Yin, et al., "Design of Six Degrees of Freedom Electromagnetic Tracker for Virtual Reality System", 2012 IEEE 9 International Conference on Virtual Environments Human-Computer Interfaces and Measurement Systems (VECIMS) Proceedings (Year: 2012), (4 pages).

* cited by examiner

138

Procedural Placement of Virtual Content in the Real World

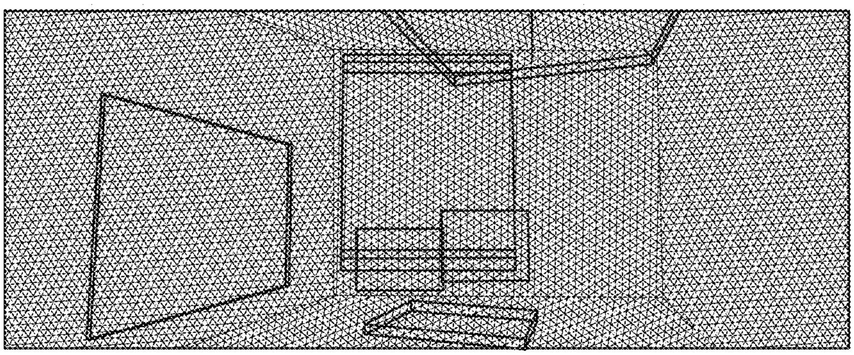

- Randomized, Procedural, placement of content in the players world was one of the primary design directives for Undersea
- Make content of different sizes fit properly so they look like they belong in the room
- Aesthetically pleasing arrangement of content
- We wanted the potential for the room layout to be different every time the application is played

*FIG. 19*

Procedural Placement of Virtual Content in the Real World

Finding Best Location for a Vista

- Use the Magic Leap Meshing and Planes APIs to capture the players space as a static mesh and collection of vertical and horizontal planes
- Find suitable plane to place to put a Vista
  - Filter all planes by height from floor, dimensions, orientation, and location relative to the room mesh
  - Spawn the Vista Blueprint which includes the portal frame and all the content in the vista at the selection location.
  - "Cut" hole in the World Mesh occlusion material so player can see thru the Portal into the Vista

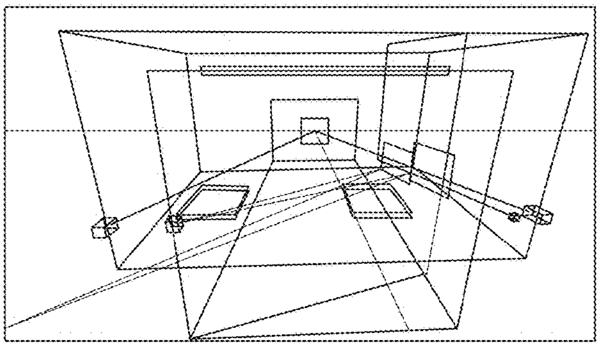

Debug Visualization of Vista Placement Tests

FIG. 20

Procedural Placement of Virtual Content in the Real World

Find Best Location to put Coral Clusters

- Determine a bounding volume aligned to the placed Vista that fits within the dimensions of meshed space
- Do LineTrace at random points within the volume from max height to the floor.
- If hit valid location on mesh:
  - Do BoxTrace to test if a random cluster will fit without overlapping world mesh. Try different scales, and rotation then score placement
  - Repeat until find enough suitable locations
  - Spawn Coral Cluster in highest scoring locations

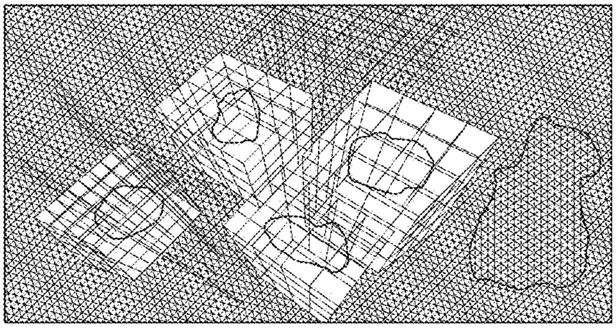

Debug Visualization of Cluster Placement Tests

*FIG. 21*

Custom AI System

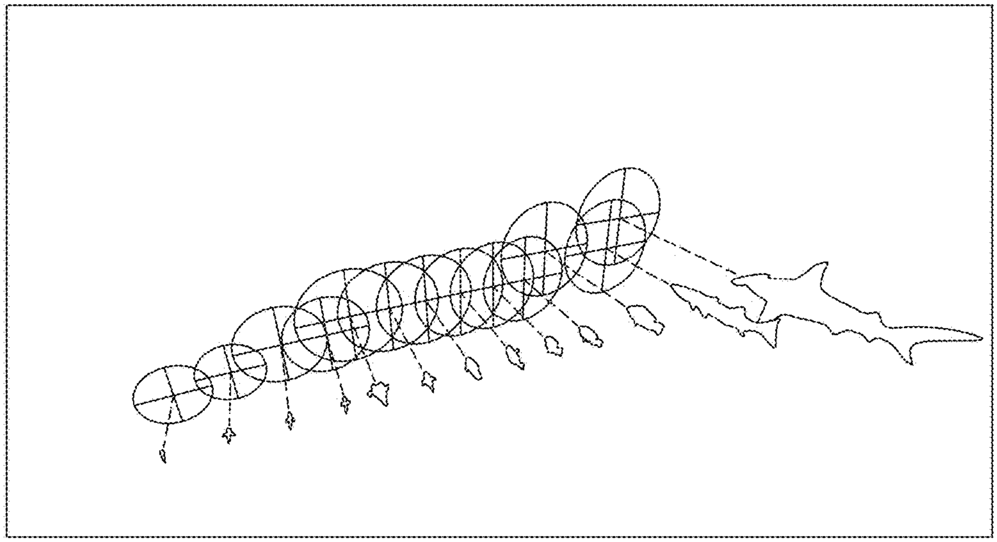

- How to make AI creatures that can navigate around the meshed space, as well as exhibit interesting and believable behaviors with the virtual content, each other, and the user

*FIG. 22A*

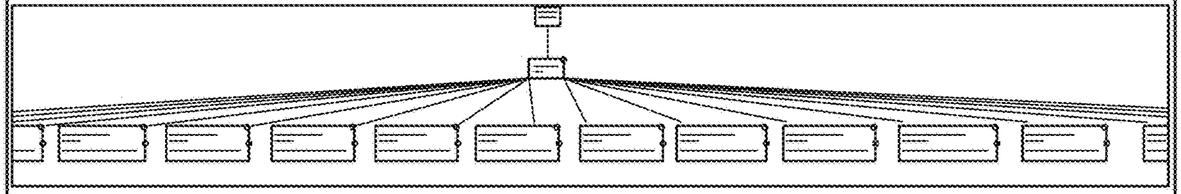

AI Root Behavior Tree

- Use Unreal Engine Behavior Trees
  - Controls our Decision Making layer
  - We tried to minimize adding complex flows to behavior tree and are handling complex execution flows within custom c++ tasks. This allowed us to keep simple, easily maintainable, and debuggable behavior trees.
  - Behavior trees are dynamically constructed through dynamic injection based on the creature type so each creature will only use a behavior tree if it supports a specific behavior
  - Has useful flow visualization which helps us to lock on to an agent and debug the behavior tree flow isolating to a single agent.

*FIG. 22B*

Custom AI System

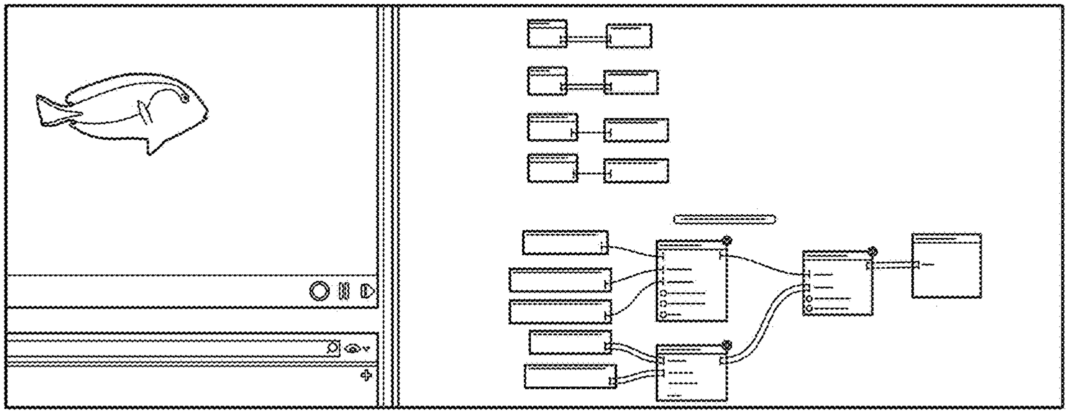

- Animation Graph
  - Helped us abstract animation system from the decision making flow.
- Perception System
  - We are using Unreal's perception system to perform detection based Sight sense.
- Native C++. Our entire A.I. system was written in native C++ for performance reasons.

FIG. 23A

- Pawn & Controller
  - We had to write custom C++ pawn as our agents needed a pawn that supports capsule and mesh component but not the character movement component.
- Unreal's component system
  - Allowed us to modularize game system logic into individual chunks and attach them to actors.
- Unreal's Gameplay Tags
  - Allowed us to separate data from our game system and represent them in a more meaningful form through tag.

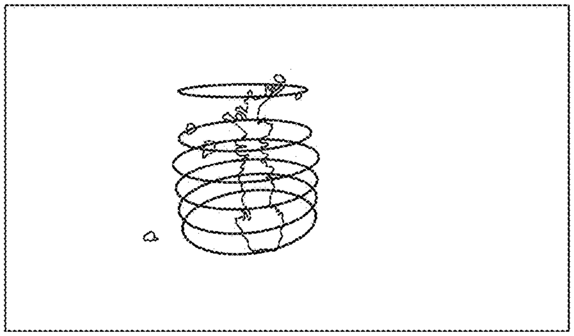

Observe Behavior Dynamic Route Generation

FIG. 23B

Custom AI System

- Navigation and Pathfinding
  - Selected a 3rd party 3D Navigation and Pathfinding plugin for Unreal so we could focus on developing higher order behavior like Feeding, Exploring, and Interacting with player.
  - Control over resolution of Navigation to speed up Nav space build times.
  - Multistage Nav space build process allowed some AI to start navigating before the entire room Nav Volume was built at its final resolution.
  - Navigation and Pathfinding library was optimized for the ML platform.

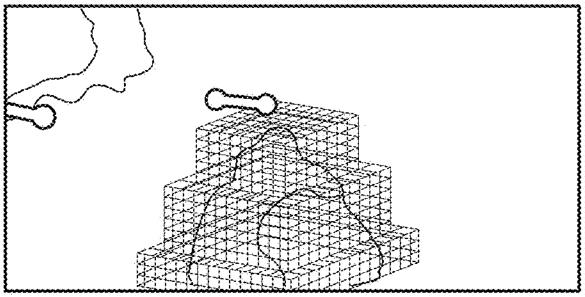

Debug Visualization of Navigation Space Cells

*FIG. 24*

140

Achieving High Quality While Staying in Budget

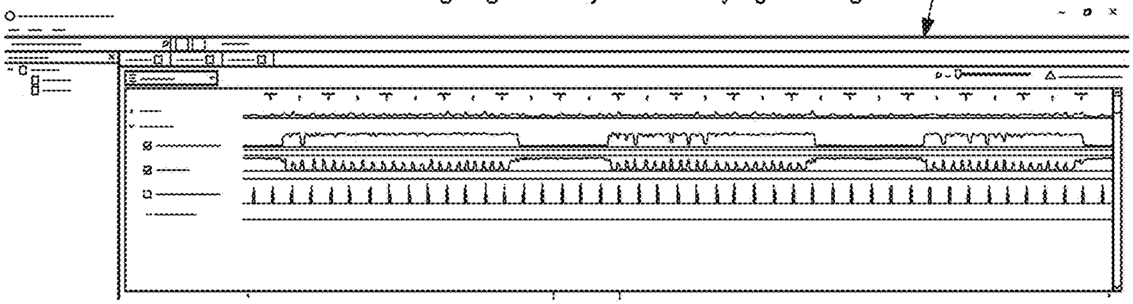

- In Spatial Computing, achieving minimum 60 FPS is critical to make content seem bound to the real world.
- Profiled build regularity to identify hotspots using UE4 profiler and NVidia NSight tools.
- Using Native C++ where possible for max performance.
- Avoid Actor creation and destruction -- use Actor pools.
- Don't Tick() where you don't need to.
- Nativize slow Blueprints after profiling.
- Using lowest resolution world mesh from meshing tracker reduced poly counts -- adequate since only used for pathing and occlusion.
- Used Unreal's Hierarchical Instanced Static Mesh to reduce draw calls of corals by over 80%.
- Artists Made extensive use of UE4's automatic mesh reduction tools for both static mesh and skeletal mesh actors. In some cases reduction was as high as 90% with minimal loss to visual fidelity.
- Lighting used runtime cached shadows for procedurally placed static objects. Dynamic objects would receive that shadow but not cast.

*FIG. 25*

How to complete all the tech work with a very small
(2 person engineering team)

- Art Team members had expert knowledge of UE4 and were self sufficient regarding most tooling and workflows. Engineering team did not have to make any significant Art or Design tools.
- Tech Artists were able to leverage Blueprints to implement the UI, VFX, Lighting system, and to assemble content, allowing engineers to focus on areas that needed to be very performant like AI, world reconstruction, and content placement.
- Created gameplay and AI base classes in C++ that were overridden in Blueprints to ensure consistent interfaces and interchangeable functionality.
- Leverage access to a Build Engineer to develop automated build system, source control automation, automated device software update.
- Implemented naming and coding standards for C++ and Blueprints to enforce consistency and allow the entire team to know what, where, and why of an asset by just looking and the name -- saved a lot of time
  - Developing coding standards for Blueprints are hard :-( Everyone has their style, but I suggest coming up with a shared style and sticking with it. It will make understanding other developers work Soooo much easier and will also help when you maintain or go back to your own old work.

FIG. 26

| | |
|---|---|
| 200 | SET OF DATA INCLUDING VIRTUAL OBJECTS |
| 202 | DISPLAY MODULE |
| 204 | DATA STREAM GENERATOR |
| 206 | LIGHT GENERATOR |
| 208 | A POSITION ADJUSTMENT MODULE |
| 210 | NOMADIC SUBROUTINE |
| 212 | WAVE MOVEMENT ROUTINE |
| 214 | RETRIEVAL AGENT |
| 216 | TRANSMISSION AGENT |
| 218 | ARTIFICIAL INTELLIGENCE SYSTEM |
| 220 | GAZE DIRECTION MOVEMENT ROUTINE |
| 222 | PERSONAL ASSISTANT MODULE |
| 224 | MOVEMENT MODULE |
| 226 | SURFACE EXTRACTION ROUTINE |
| 228 | DEPTH CREATION MODULE |
| 230 | VISTA PLACEMENT ROUTINE |
| 232 | VERTEX ANIMATION ROUTINE |
| 234 | CORAL CLUSTER SPAWNER |

FIG. 32

SYSTEMS AND METHODS FOR AUGMENTED REALITY

CROSS-REFERENCE TO RELATED APPLICATIONS

This application is a divisional of U.S. patent application Ser. No. 18/046,739, filed on Oct. 14, 2022, which is a divisional of U.S. patent application Ser. No. 16/938,782, filed on Jul. 24, 2020 now U.S. Pat. No. 11,514,673, which claims priority from U.S. Provisional Patent Application No. 62/879,408, filed on Jul. 26, 2019, U.S. Provisional Patent Application No. 62/881,355, filed on Jul. 31, 2019 and U.S. Provisional Patent Application No. 62/899,678, filed on Sep. 12, 2019, all of which are incorporated herein by reference in their entirety.

BACKGROUND OF THE INVENTION

1). Field of the Invention

This invention relates to an augmented reality viewer and an augmented reality visualization method.

2). Discussion of Related Art

Modern computing technology has advanced to the level of compact and persistently connected wearable computing systems and assemblies that may be utilized to provide a user with the perception of rich augmented reality experiences.

An augmented reality viewer usually has multiple sensors, including cameras positioned to sense a location real-world objects. A storage device holds a set of data including a virtual object. A display module on the storage device is executable by a processor to determine a desired display of the virtual object relative to the location the real-world objects. A data stream generator on the storage device is executable by the processor to generate a data stream based on the data and the desired display. A light generator, such as a laser light generator, is connected to the processor to receive the data stream and generate light based on the data stream. A display device is positioned to receive the light that is generated and to display the light to a user. The light creates a rendering of the virtual object visible to the user and rendered in accordance with the desired display.

SUMMARY OF THE INVENTION

The invention provides an augmented reality viewer including at least one sensor positioned to sense a location of at least one of a plurality of real-world objects, a storage device, a set of data on the storage device including a virtual object, a processor connected to the storage device, a display module on the storage device and executable by the processor to determine a desired display of the virtual object relative to the location of at least one of the real-world objects, a data stream generator on the storage device and executable by the processor to generate a data stream based on the data and the desired display, a light generator connected to the processor to receive the data stream and generate light based on the data stream, and a display device positioned to receive the light that is generated and to display the light to a user, wherein the light creates a rendering of the virtual object visible to the user and rendered in accordance with the desired display.

The augmented reality viewer may further include that the virtual object is a nomadic life object, further include a nomadic subroutine on the storage device and executable by the processor to move the nomadic life object relative to the real-world objects.

The augmented reality viewer may further include that the data includes a plurality of nomadic life objects, wherein the nomadic subroutine is executable by the processor to move the plurality of nomadic life objects relative to the real-world objects and relative to one another.

The augmented reality viewer may further include that the at least one sensor senses a wave movement initiated by the user, further including a wave movement routine on the storage device and executable by the processor to move the nomadic life object in response to the wave movement that is sensed by the at least one sensor.

The augmented reality viewer may further include that the wave movement is initiated in a target zone and the nomadic object is moved out of the target zone.

The augmented reality viewer may further include that the at least one sensor sensing the wave movement is a camera that detects an image of a hand of the user.

The augmented reality viewer may further include a handheld controller, wherein the sensor is mounted to a handheld controller that is held in a hand of the user.

The augmented reality viewer may further include a retrieval agent on the storage device and executable with the processor to retrieve incoming information from a resource, associate the incoming information with a location of the nomadic life object relative to the real-world objects, and communicate the incoming information to the user from the location of the nomadic life object.

The augmented reality viewer may further include that the retrieval agent activates the light source to display the incoming information through the display.

The augmented reality viewer may further include a speaker, wherein the retrieval agent activates the speaker so that the user hears the incoming information.

The augmented reality viewer may further include a transmission agent on the storage device and executable with the processor to sense, with the at least one sensor, an instruction by the user, sense, with the at least one sensor, that the instruction is directed by the user to the nomadic life object at a location of the nomadic life object relative to the real-world objects, determine, based on the instruction, an outgoing communication and a resource, and communicate the outgoing communication to the resource.

The augmented reality viewer may further include that the at least one sensor that senses the communication is a microphone suitable to receive a voice instruction from the user.

The augmented reality viewer may further include a transmission agent on the storage device and executable with the processor to sense, with the at least one sensor, an instruction by the user, sense, with the at least one sensor, that the instruction is directed by the user to the nomadic life object at a location of the nomadic life object relative to the real-world objects, determine, based on the instruction, an outgoing communication and an IOT device, and communicate the outgoing communication to the IOT device to operate the IOT device.

The augmented reality viewer may further include that the at least one sensor that senses the communication is a microphone suitable to receive a voice instruction from the user.

The augmented reality viewer may further include an artificial intelligence system on the storage device and executable with the processor to sense an action by the user using the at least one sensor, perform a routine involving the virtual object that is responsive to the action of the user, associate the routine with the action as an artificial intelligence cluster, determine a parameter that exists at a first time when the action is sensed, associate the parameter that exists at the first time with the artificial intelligence cluster, sense a parameter at a second time, determine whether the parameter at the second time is the same as the parameter at the first time, and if the determination is made that the parameter at the second time is the same as the parameter at the first time then executing the routine.

The augmented reality viewer may further include that the at least one sensor includes an eye tracking camera, wherein the action is a wave motion initiated by the user and the parameters are a gaze direction as determined by eye tracking of the user using the eye tracking camera.

The augmented reality viewer may further include that the action is a wave movement initiated in a target zone and the nomadic object is moved out of the target zone.

The augmented reality viewer may further include that the at least one sensor includes an eye tracking camera positioned to sense a gaze direction of the user, further including a gaze direction movement routine on the storage device and executable by the processor to move the nomadic life object in response to the gaze direction that is sensed by the eye tracking camera.

The augmented reality viewer may further include that there are a plurality of nomadic life objects and the nomadic subroutine is executable by the processor to move the plurality of nomadic life object relative to the real-world objects, further including a personal assistant module on the storage device and executable with the processor to select a personal assistant nomadic life object among the plurality of nomadic life objects, and move at least one of the nomadic life objects other than the personal assistant nomadic life objects with the personal assistant nomadic life object.

The augmented reality viewer may further include that the nomadic life object is a fish of a first type, further including a movement module on the storage device and executable with the processor to articulate a body of the fish in a first back-and-forth manner.

The augmented reality viewer may further include that the movement module is executable with the processor to articulate a body of a fish of a second type in a second back-and-forth manner that is different from the first back-and-forth manner.

The augmented reality viewer may further include that the movement module is executable with the processor to sense, with the at least one sensor, a slow hand movement of a hand of the user, articulate the body of the fish in the first back-and-forth manner at a low speed in response to the slow speed of the hand movement, sense, with the at least one sensor, a fast hand movement of the hand of the user, and articulate the body of the fish in the first back-and-forth manner at a high speed in response to the fast speed of the hand movement.

The augmented reality viewer may further include that the movement module is executable with the processor to move the first fish to stay close to the hand when the hand moves at the slow speed, and move the first fish to flee the hand when the hand moves at the fast speed.

The augmented reality viewer may further include a surface extraction routine on the storage device and executable with the processor to identify a surface among the real-world objects.

The augmented reality viewer may further include that the surface is a two-dimensional surface of a wall or a ceiling.

The augmented reality viewer may further include a depth creation module on the storage device and executable with the processor according to the desired display, display, in three-dimensional space, the virtual object to the user on a side of the opposing the user and with the surface between the user and the virtual object.

The augmented reality viewer may further include that the depth creation module is executable with the processor to display a porthole in the surface to the user through which the virtual object is visible to the user.

The augmented reality viewer may further include that the virtual object is a three-dimensional virtual object.

The augmented reality viewer of may further include a vista placement routine on the storage device and executable with the processor to capture a space that includes the real-world objects, represent the space as a real-world mesh, collect vertical and horizontal planes from the real-world mesh, filter the planes by height from a floor, dimensions, orientation, and location relative to the real-world mesh, spawn a blueprint which includes a portal frame and all the content in the vista at the selection location, and cut a hole in an occlusion material of the real-world mesh material so the user can see through the portal into the vista.

The augmented reality viewer may further include a vertex animation routine on the storage device and executable with the processor to store a virtual object mesh representing the virtual object, associate a texture with the virtual object mesh, and manipulate the virtual object mesh to cause movement of the texture and the virtual object in a view of the user.

The augmented reality viewer may further include that the virtual object mesh is manipulated to articulate the virtual object.

The augmented reality viewer may further include that the same virtual object mesh is used multiple times to cause movement of the texture and the virtual object.

The augmented reality viewer may further include that the virtual object is a coral cluster.

The augmented reality viewer may further include a coral cluster spawner on the storage device and executable with the processor to determine a volume, perform a line trace at random points within the volume from a maximum height of the volume to a floor of the volume, determine whether a valid location is identified by the line trace, if a valid location is identified then, in response to the identification, perform a box trace to test if a random cluster will fit without overlapping a world mesh while attempting different scales and rotations and generating a score for each placement, determine a select placement with a highest score among scores, and spawn the coral cluster to the placement with the highest score.

The augmented reality viewer may further include a vista placement routine on the storage device and executable with the processor to place a vista, wherein the volume is bound by the vista.

The augmented reality viewer may further include a coral spawner system on the storage device and executable with the processor to store at least a first coral element of a first type on the storage device, and construct the coral cluster from a plurality of coral elements including the first coral element.

The augmented reality viewer may further include that the coral spawner system is executable with the processor to construct the coral cluster from a plurality of first coral elements.

The augmented reality viewer may further include that the coral spawner system is executable with the processor to store at least a second coral element of a second type on the storage device, wherein the plurality of coral elements includes the second coral element.

The augmented reality viewer may further include that the coral spawner system is executable with the processor to determining a coral cluster setting, wherein the processor constructs the coral cluster according to the setting.

The augmented reality viewer may further include that the setting is available space that is detected, and a number of the coral elements is selected based on the available space.

The augmented reality viewer may further include that the coral spawner system is executable with the processor to simulate ambient light, wherein the setting is the ambient light, wherein a number of coral elements is selected based on the ambient light, wherein orientations of the coral elements are selected based on the ambient light.

The augmented reality viewer may further include that the coral spawner system includes a data table on the storage device with a plurality of coral cluster settings, wherein the coral spawner system constructs the coral cluster according to the plurality of coral cluster settings.

The augmented reality viewer may further include that the coral cluster settings include at least one of population, species max counts, spawn type, and height-based percentages.

The augmented reality viewer may further include that the coral spawner system includes a vertex crawling and raycast algorithm to check for placement viability, growth, and caching of valid points to file.

The augmented reality viewer may further include that the coral spawner system includes a run-time coral static mesh loop that first calculates a shadow pass and then creates instanced static meshes of all corals clusters.

The augmented reality viewer may further include that the coral spawner system includes collision-based exclusion configuration to place box colliders where certain species should not grow.

The augmented reality viewer may further include that the display device displays the light that is generated to a user while the views at least one of the real-world objects.

The augmented reality viewer may further include that the display device is a see-through display device that allows light from the at least one real-world objects to reach an eye of the user.

The augmented reality viewer may further include a head-worn structure shaped to be worn on a head of the user, wherein the display device is mounted to the head-worn structure and the at least one sensor is of a kind that is suitable to sense movement of the display device due to movement of a head of the user, and a position adjustment module, executable by the processor, to adjust a location of the virtual object so that, within a view of the user, the virtual object remains stationary relative to the at least one real-world object.

The invention also provides an augmented reality visualization method including sensing, with at least one sensor, a location of at least one of a plurality of real-world objects, storing, on a storage device, data including a virtual object, determining, with a processor, a desired display of the virtual object relative to the location of at least one of the real-world objects, generating, by the processor, a data stream based on the data and the desired display, generating, with a light generator, light based on the data stream, and displaying, with a display device, the light that is generated to a user, wherein the light creates a rendering of the virtual object visible to the user and rendered in accordance with the desired display.

The method may further include that the virtual object is a nomadic life object, further including moving, with the processor, the nomadic life object relative to the real-world objects.

The method may further include that the data includes a plurality of nomadic life objects, further including moving, with the processor, the plurality of nomadic life objects relative to the real-world objects and relative to one another.

The method may further include sensing, by the at least one sensor, a wave movement initiated by the user, and moving, by the processor, the nomadic life object in response to the wave movement that is sensed by the at least one sensor.

The method may further include that the wave movement is initiated in a target zone and the nomadic object is moved out of the target zone.

The method may further include that the at least one sensor sensing the wave movement is a camera that detects an image of a hand of the user.

The method may further include that the sensor is mounted to a handheld controller that is held in a hand of the user.

The method may further include retrieving, with the processor, incoming information from a resource, associating, with the processor, the incoming information with a location of the nomadic life object relative to the real-world objects, and communicating, with the processor, the incoming information to the user from the location of the nomadic life object.

The method may further include that the incoming information is displayed to the user.

The method may further include that the user hears the incoming information.

The method may further include sensing, with the at least one sensor, an instruction by the user, sensing, with the at least one sensor, that the instruction is directed by the user to the nomadic life object at a location of the nomadic life object relative to the real-world objects, determining, with the processor, based on the instruction, an outgoing communication and a resource, and communicating, with the processor, the outgoing communication to the resource.

The method may further include that the user speaks the instruction.

The method of may further include sensing, with the at least one sensor, an instruction by the user, sensing, with the at least one sensor, that the instruction is directed by the user to the nomadic life object at a location of the nomadic life object relative to the real-world objects, determining, with the processor, based on the instruction, an outgoing communication and an IOT device, and communicating, with the processor, the outgoing communication to the IOT device to operate the IOT device.

The method may further include that the user speaks the instruction.

The method may further include sensing, with the at least one sensor, an action by the user, performing, with the processor, a routine involving the virtual object that is responsive to the action of the user, associating, with the processor, the routine with the action as an artificial intelligence cluster, determining, with the at least one processor, a parameter that exists at a first time when the action is sensed, associating, with the processor, the parameter that exists at the first time with the artificial intelligence cluster, sensing, with the at least one sensor, a parameter at a second time, determining, with the processor, whether the parameter at the second time is the same as the parameter at the first time, and if the determination is made that the parameter at the second time is the same as the parameter at the first time then executing the routine.

The method may further include that the action is a wave motion initiated by the user and the parameters are a gaze direction of the user.

The method may further include that the action is a wave movement initiated in a target zone and the nomadic object is moved out of the target zone.

The method may further include sensing, by the at least one sensor, a gaze direction of the user, and moving, by the processor, the nomadic life object in response to the gaze direction.

The method of may further include moving, with the processor, a plurality of nomadic life object relative to the real-world objects, selecting, with the processor, a personal assistant nomadic life object among the plurality of nomadic life objects, and moving, with the processor, at least one of the nomadic life objects other than the personal assistant nomadic life objects with the personal assistant nomadic life object.

The method may further include that the nomadic life object is a fish of a first type, further including articulating, with the processor, a body of the fish in a first back-and-forth manner.

The method may further include articulating, with the processor, a body of a fish of a second type in a second back-and-forth manner that is different from the first back-and-forth manner.

The method may further include sensing, with the at least one sensor, a slow hand movement of a hand of the user, and articulating, with the processor, the body of the fish in the first back-and-forth manner at a low speed in response to the slow speed of the hand movement, sensing, with the at least one sensor, a fast hand movement of the hand of the user, and articulating, with the processor, the body of the fish in the first back-and-forth manner at a high speed in response to the fast speed of the hand movement.

The method may further include moving, with the processor, the first fish to stay close to the hand when the hand moves at the slow speed, and moving, with the processor, the first fish to flee the hand when the hand moves at the fast speed.

The method may further include identifying, with the processor, a surface among the real-world objects.

The method may further include that the surface is a two-dimensional surface of a wall or a ceiling.

The method may further include that the processor, according to the desired display, displays, in three-dimensional space, the virtual object to the user on a side of the surface opposing the user and with the surface between the user and the virtual object.

The method may further include that the processor displays a porthole in the surface to the user through which the virtual object is visible to the user.

The method may further include that the virtual object is a three-dimensional virtual object.

The method may further include capturing, with the processor, a space that includes the real-world objects, representing, with the processor, the space as a real-world mesh, collecting, with the processor, vertical and horizontal planes from the real-world mesh, filtering, with the processor, the planes by height from a floor, dimensions, orientation, and location relative to the real-world mesh, spawning, with the processor, a blueprint which includes a portal frame and all the content in the vista at the selection location, and cutting, with the processor, a hole in an occlusion material of the real-world mesh material so the user can see through the portal into the vista.

The method may further include storing, with the processor, a virtual object mesh representing the virtual object, associating, with the processor, a texture with the virtual object mesh, and manipulating, with the processor, the virtual object mesh to cause movement of the texture and the virtual object in a view of the user.

The method may further include that the virtual object mesh is manipulated to articulate the virtual object.

The method may further include that the same virtual object mesh is used multiple times to cause movement of the texture and the virtual object.

The method may further include that the virtual object is a coral cluster.

The method may further include placing, with the processor, the coral cluster including determining a volume, performing a line trace at random points within the volume from a maximum height of the volume to a floor of the volume, determining whether a valid location is identified by the line trace, if a valid location is identified then, in response to the identification, performing a box trace to test if a random cluster will fit without overlapping a world mesh while attempting different scales and rotations and generating a score for each placement, determining a select placement with a highest score among scores, and spawning the coral cluster to the placement with the highest score.

The method may further include placing a vista, wherein the volume is bound by the vista.

The method may further include storing at least a first coral element of a first type on the storage device, and constructing, with the processor, the coral cluster from a plurality of coral elements including the first coral element.

The method may further include that the processor constructs the coral cluster from a plurality of first coral elements.

The method may further include storing at least a second coral element of a second type on the storage device, wherein the plurality of coral elements include the second coral element.

The method may further include determining, with the processor, a coral cluster setting, wherein the processor constructs the coral cluster according to the setting.

The method of may further include that the setting is available space that is detected, and a number of the coral elements is selected based on the available space.

The method may further include simulating, with the processor, ambient light, wherein the setting is the ambient light, wherein a number of coral elements is selected based on the ambient light, and wherein orientations of the coral elements are selected based on the ambient light.

The method may further include storing a data table on the storage device with a plurality of coral cluster settings, wherein the processor constructs the coral cluster according to the plurality of coral cluster settings.

The method of may further include that the coral cluster settings include at least one of population, species max counts, spawn type, and height-based percentages.

The method may further include executing, with the processor, a vertex crawling and raycast algorithm to check for placement viability, growth, and caching of valid points to file.

The method may further include executing, with the processor, a run-time coral static mesh loop that first calculates a shadow pass and then creates instanced static meshes of all corals clusters.

The method may further include executing, with the processor, collision-based exclusion configuration to place box colliders where certain species should not grow.

The method the display device displays the light that is generated to a user while the views at least one of the real-world objects.

The method the display device is a see-through display device that allows light from the at least one real-world objects to reach an eye of the user.

The method may further include sensing, with the at least one sensor, movement of the display device due to movement of a head of the user, and adjusting a location of the virtual object so that, within a view of the user, the virtual object remains stationary relative to the at least one real-world object.

BRIEF DESCRIPTION OF THE DRAWINGS

The invention is further described by way of examples in the following drawings wherein:

FIGS. 19 and 20 are depth views illustrating that the system may be configured to utilize the geometry of the room or environment;

FIG. 21 is a depth view illustrating the location of positions within the mesh of the room that may be suitable anchors for elements such as coral clusters;

FIG. 22A-24 are screen shots illustrating the creation of interesting, believable interactions between the user and augmented reality elements;

FIG. 25 is a screen shot of tools to visualize the utilization of various computing threads versus time;

FIG. 26 is a slide of various aspects of learnings;

FIG. 32 is a block diagram of various instructional routines and modules.

DETAILED DESCRIPTION OF THE INVENTION

Figure 1:
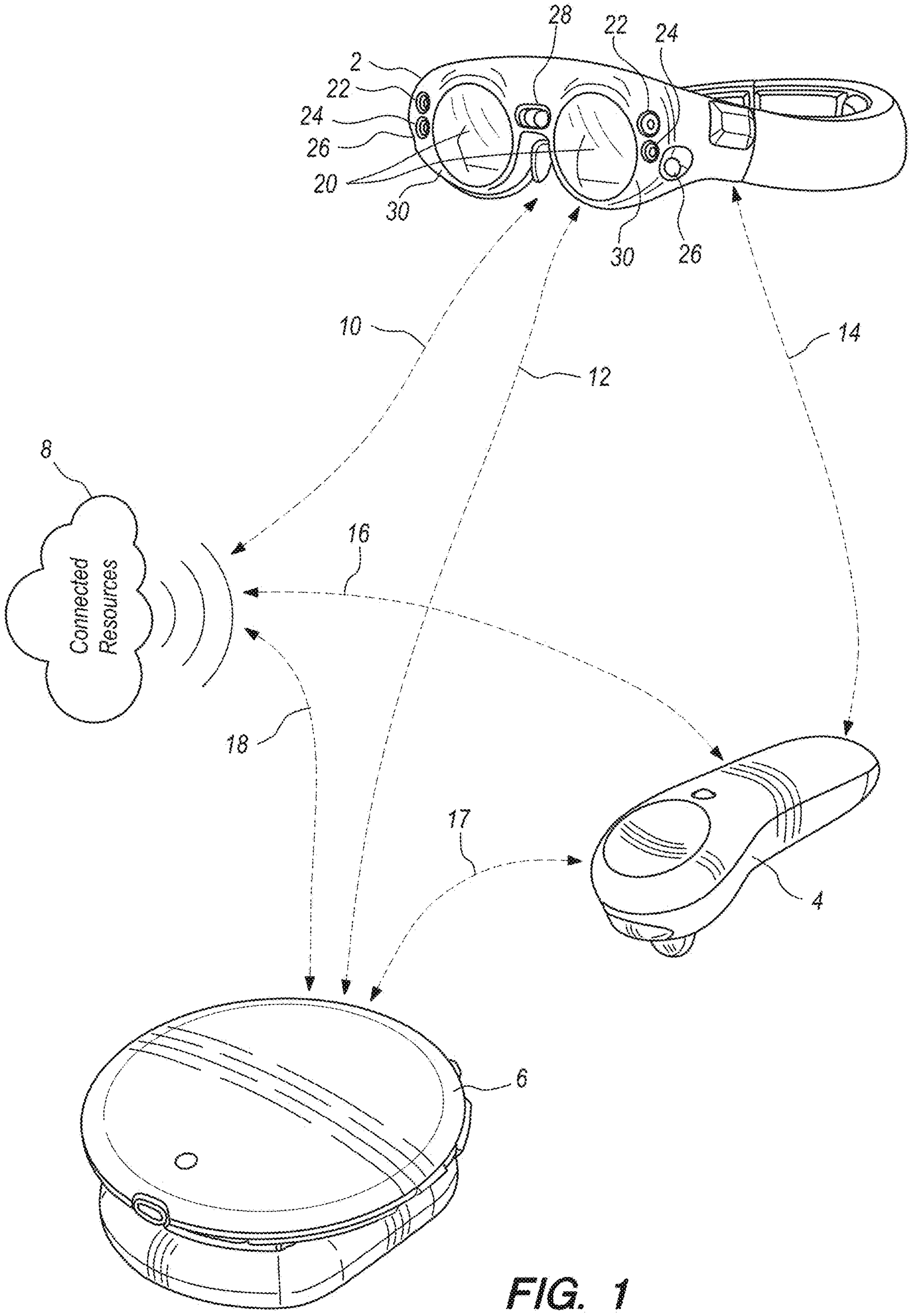
FIG. 1 is a perspective view of an augmented reality system according to an embodiment of the invention.

FIG. 1 illustrates an augmented reality system that includes augmented reality viewer 2, a handheld controller 4, and an interconnected auxiliary computing or controller component 6 that may be configured to be worn as a belt pack or the like on the user. Each of these components may be operatively coupled 10, 12, 14, 16, 17, 18 to each other and to other connected resources 8 such as cloud computing or cloud storage resources via wired or wireless communication configurations. The connected resources 8 may be those specified by IEEE 802.11, Bluetooth R™, and other connectivity standards and configurations. As described, for example, in U.S. patent application Ser. No. 14/555,585, Ser. No. 14/690,401, Ser. No. 14/331,218, Ser. No. 15/481,255, 62/627,155, 62/518,539, Ser. No. 16/229,532, Ser. No. 16/155,564, Ser. No. 15/413,284, Ser. No. 16/020,541, 62,702,322, 62/206,765, Ser. No. 15,597,694, Ser. No. 16/221,065, Ser. No. 15/968,673, and 62/682,788, each of which is incorporated by reference herein in its entirety, various aspects of such components are described, such as various embodiments of two depicted optical elements 20 through which the user may see the world around them along with visual components which may be produced by the associated system components, for an augmented reality experience. The system may also comprise various sensors configured to provide information pertaining to the environment around the user, including camera type sensors such as monochrome, color/RGB, and/or thermal imaging components 22, 24, 26, depth camera sensors 28, and sound sensors 30 such as microphones.

The augmented reality viewer 2 includes a head-worn structure 25 that can be worn on a head of a user. The augmented reality viewer 2 and the controller component 6 each have a processor and a storage device connected to the processor. Data and executable code are stored on the storage devices and are executable with the processors. The augmented reality viewer 2 includes a projector that serves as a light generator. The processor of the augmented reality viewer 2 sends instructions to the projector and the projector generates light, typically laser light, that is transmitted through the display to eyes of the user.

FIG. 1 thus describes an augmented reality viewer that includes at least one sensor positioned to sense a location of at least one of a plurality of real-world objects, a storage device, a set of data on the storage device including a virtual object, a processor connected to the storage device, a display module on the storage device and executable by the processor to determine a desired display of the virtual object relative to the location of at least one of the real-world objects, a data stream generator on the storage device and executable by the processor to generate a data stream based on the data and the desired display, a light generator connected to the processor to receive the data stream and generate light based on the data stream, and a display device positioned to receive the light that is generated and to display the light to a user, wherein the light creates a rendering of the virtual object visible to the user and rendered in accordance with the desired display.

The display device may display the light that is generated to a user while the user views at least one of the real-world objects. The display device may be a see-through display device that allows light from the at least one real-world objects to reach an eye of the user.

The augmented reality viewer may include a head-worn structure shaped to be worn on a head of the user, wherein the display device is mounted to the head-worn structure and the at least one sensor is of a kind that is suitable to sense movement of the display device due to movement of a head of the user, and a position adjustment module, executable by the processor, to adjust a location of the virtual object so that, within a view of the user, the virtual object remains stationary relative to the at least one real-world object.

Figure 2:
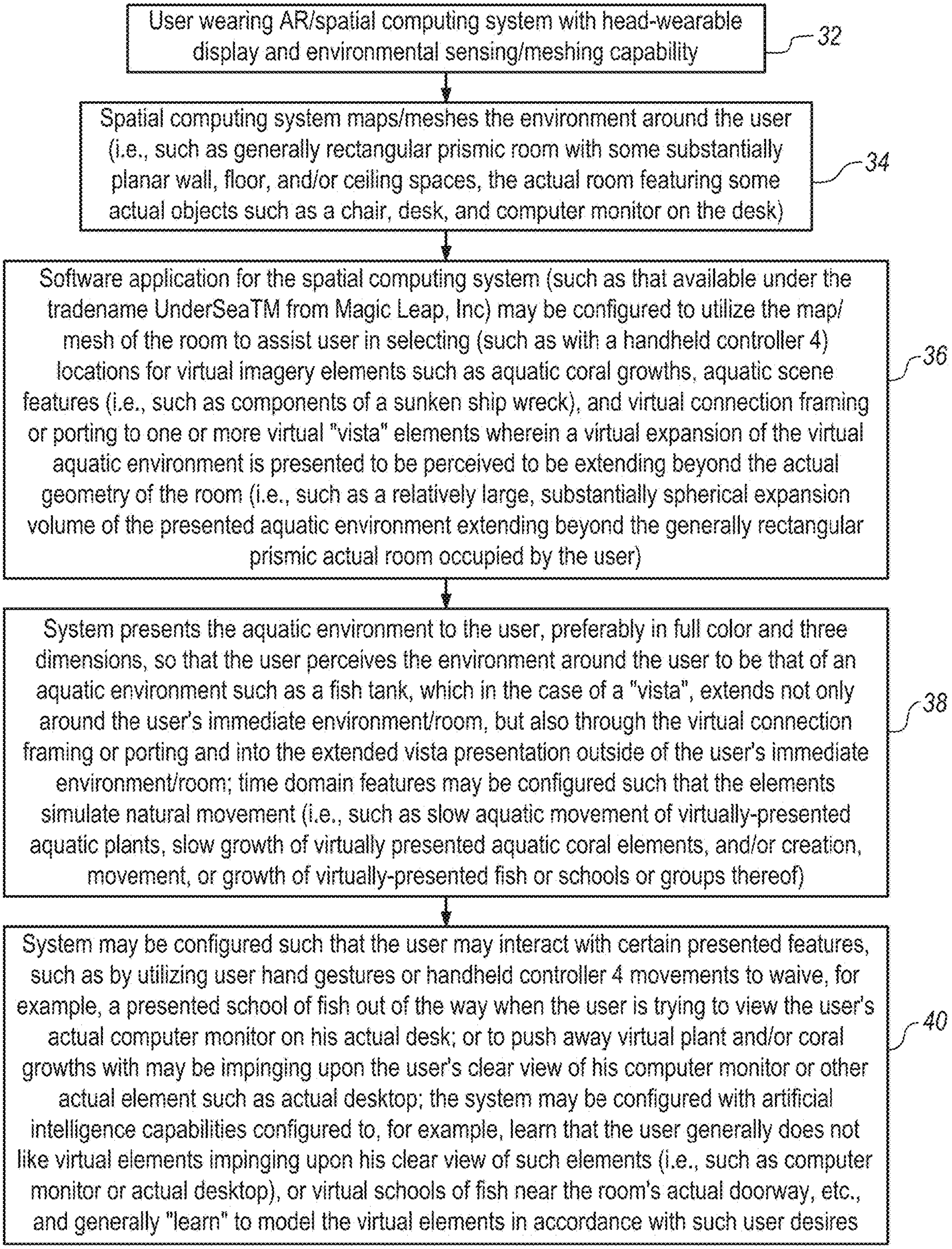
FIG. 2 is a flowchart showing basic operation of the augmented reality system.
Figure 3:
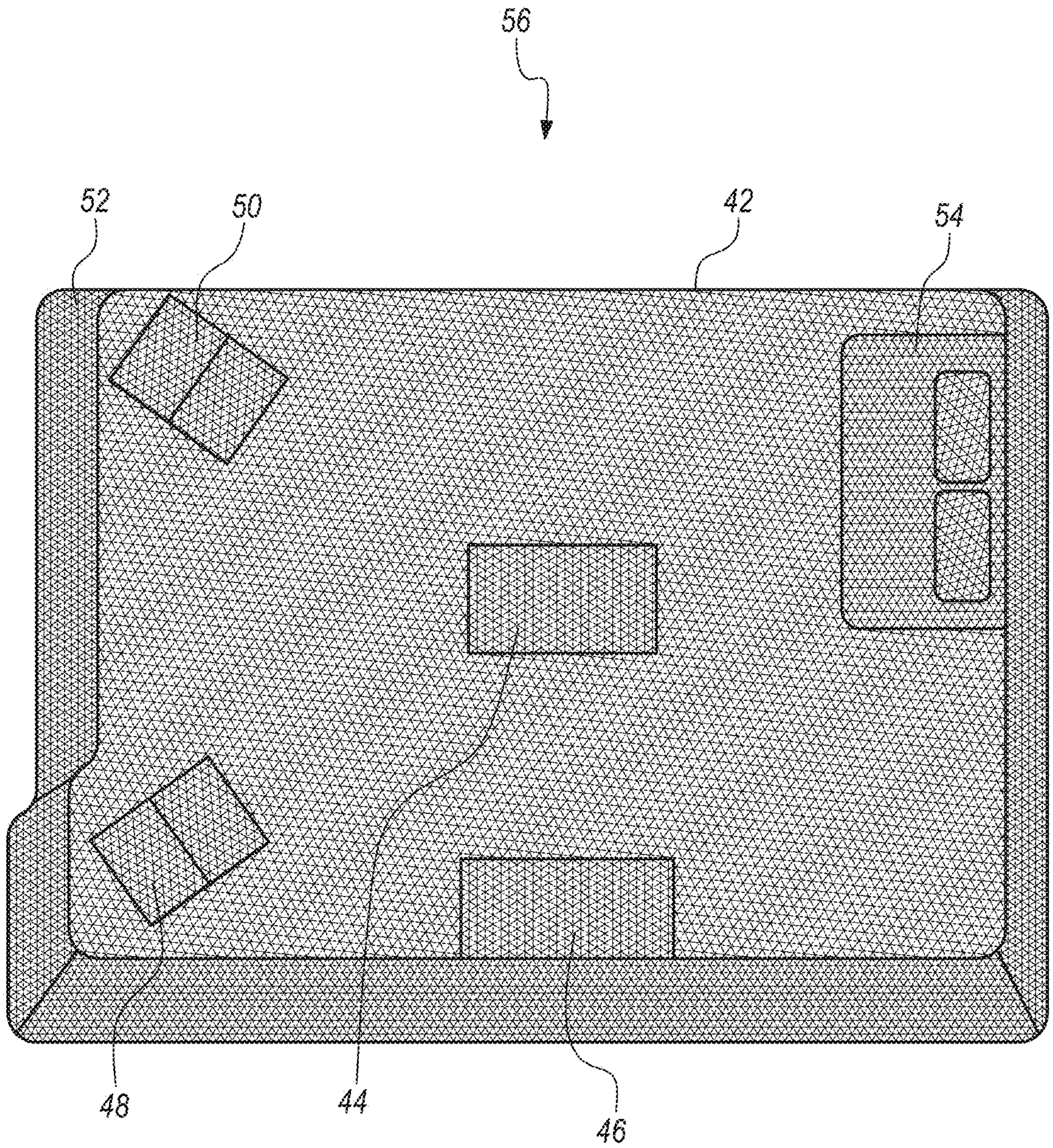
FIG. 3 is a depth view that shows the creation of such a mesh.

The following definitions will assist in an understanding or the various terms used herein:

1. virtual objects
   1.1. life-like objects (objects that migrate nomadically, that display articulating features, or have surface textures that move)
      1.1.1. nomadic classification (objects that move from one location to another location)
         1.1.1.1. nomadic life
            1.1.1.1.1. sea otters
            1.1.1.1.2. fish
            1.1.1.1.3. sea turtles
         1.1.1.2. non-nomadic life
            1.1.1.2.1. sea anemones
            1.1.1.2.2. coral
      1.1.2. articulating classification
         1.1.2.1. articulating life (objects that have bodies that bend)
            1.1.2.1.1. sea otters
            1.1.2.1.2. fish
            1.1.2.1.3. sea turtles
            1.1.2.1.4. sea anemones
         1.1.2.2. non-articulating life (objects that have bodies that do not bend)
            1.1.2.2.1. coral
      1.1.3. texture classification (surface features)
         1.1.3.1. fluid-texture life (objects with surfaces that move)
            1.1.3.1.1. fish
            1.1.3.1.2. sea otters
            1.1.3.1.3. sea anemones
         1.1.3.2. fixed-texture life (objects with surfaces that are static)
            1.1.3.2.1. sea turtles
            1.1.3.2.2. coral
   1.2. inanimate objects (objects that do not migrate nomadically, that do not display articulating features, and do not have surface textures that move)
      1.2.1. rocks
      1.2.2. sand
2. real-life objects
   2.1. walls
   2.2. ceilings
   2.3. furniture Referring to FIG. 2, in various embodiments a user may be wearing an augmented reality system such as that depicted in FIG. 1, which may also be termed a "spatial computing" system in relation to such system's interaction with the three dimensional world around the user when operated at 32. Such a system may comprise, for example, a head wearable display component 2, and may feature environmental sensing capabilities as described above and in the aforementioned incorporated by reference materials, such as cameras of various types which may be configured to map the environment around the user, or to create a "mesh" 56 of such environment. FIG. 3 shows the creation of such a mesh. A point cloud is depicted which forms a mesh of a given room wherein walls or perimeters 42, 52 are shown as well as chairs 46, 48, 50, 54 and a centrally located desk 44. As further shown in FIG. 2, at 34 the spatial computing system may be configured to map or mesh the environment around the user as described above with reference to FIG. 3.

At 36, the spatial computing system may be configured to run or operate software, such as that available from Magic Leap, Inc., of Plantation, Florida, under the tradename Undersea™. The software may be configured to utilize the map or mesh of the room to assist the user in selecting (such as with a handheld controller 4 of FIG. 1, or via gestures or other available control options available with the system and software) locations for virtual imagery elements such as aquatic coral growths, aquatic scene features (i.e., such as components of a sunken ship wreck), and virtual connection framing or porting to one or more virtual "vista" elements wherein a virtual expansion of the virtual aquatic environment is presented to be perceived to be extending beyond the actual geometry of the room (i.e., such as a relatively large, substantially spherical expansion volume of the presented aquatic environment extending beyond the generally rectangular prismic actual room occupied by the user). In various embodiments, the system may be configured to automatically locate possible locations, such as vertical or horizontal planar locations within the user's actual room, for possible placement of corals, kelp forests, and the like, subject to selection or placement confirmation by the user. In various embodiments the system may be configured to create (or "spawn") groups, or schools, or fish which may be configured to swim about through the virtual aquatic environment. In various embodiments such fish may be configured to be attracted to certain gestures or inputs of the user, while in other embodiments they may be configured to flee away from user movements as though they are scared of the user movements. The fish may be configured to grow and/or multiply over time, and may be configured to spontaneously or at a given time interval change to different species, so that the aquatic environment remains changing in time for the user.

Figure 4:
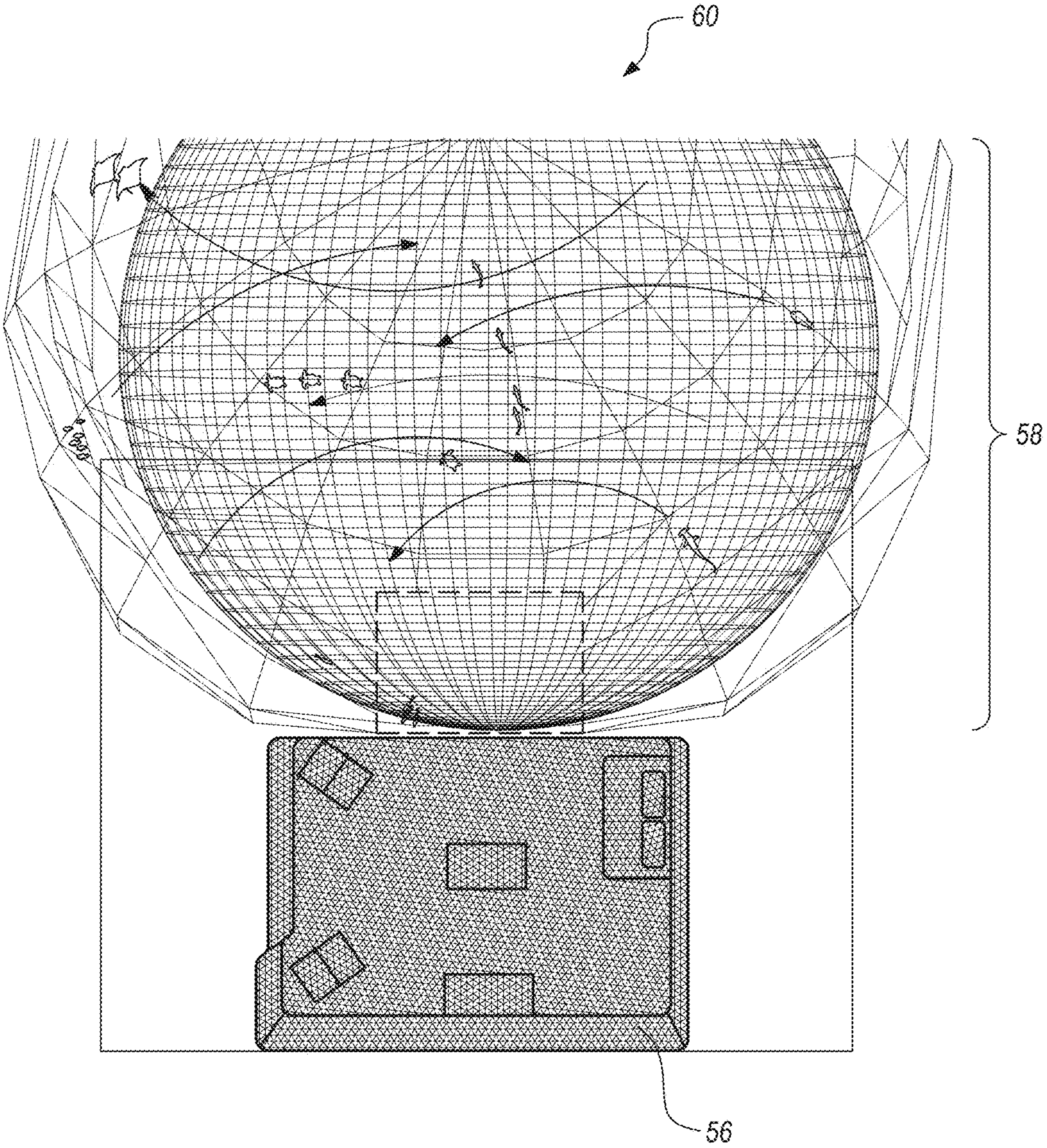
FIG. 4 is a depth view that show a mapping for a "vista" volume.

At 38, the system may be configured to operate the software to present the aquatic environment to the user. The aquatic environment is preferably presented to the user in full color and three dimensions, so that the user perceives the environment around the user to be that of an aquatic environment such as a fish tank, which in the case of a "vista", extends not only around the user's immediate environment/room, but also through the virtual connection framing or porting and into the extended vista presentation outside of the user's immediate environment/room. Time domain features (i.e., features that change position and/or geometry with time) may be configured such that the elements simulate natural movement (i.e., such as slow aquatic movement of virtually-presented aquatic plants, slow growth of virtually-presented aquatic coral elements, and/or creation, movement, or growth of virtually-presented fish or schools or groups thereof). The system may be configured to propose suitable locations and sizes for a possible portal or a framing location for a "vista", such as locations and sizes at the center of a vertical wall within the actual room occupied by the user that would give the user a broad view into the virtual "vista" extension of the virtual aquatic environment. In FIG. 4, a mesh 56 of a user's room is illustrated with a mapping for a somewhat spherical "vista" volume 58 which is operatively and virtually-fluidly coupled to the actual room as presented to the user. Also shown are predetermined pathways 60 for various fish to be presented in the "vista" presentation to the user.

In FIG. 2, at 40, the spatial computing system may be configured such that the user may interact with certain presented features. The user may for example use user hand gestures or the handheld controller 4 to wave a presented school of fish out of the way when the user is trying to view the an actual real-world computer monitor on an actual desk, push away virtual plant and/or coral growths that may be impinging upon the clear view of the computer monitor or other actual element such as actual desktop. The system may be configured with artificial intelligence capabilities configured to, for example, learn that by use of such a gesture or controller instruction, the user generally does not like a virtual elements impinging upon his clear view of such elements (i.e., such as computer monitor or actual desktop), or, for example, virtual schools of fish near the room's actual doorway, etc., and generally "learn" to model the virtual elements in accordance with such particular desires of a particular user. In other words, the system may be configured to keep the fish, plants, coral, and other presented virtual features out of the places where the user seems to not want them. Further, the system preferably is configured to not have virtual elements collide with actual elements of the room, by taking into the account the mesh 56 geometry.

FIG. 2 thus describes that the virtual object may be a nomadic life object, and that the augmented reality viewer may further include a nomadic subroutine on the storage device and executable by the processor to move the nomadic life object relative to the real-world objects. The data may include a plurality of nomadic life objects, wherein the nomadic subroutine is executable by the processor to move the plurality of nomadic life objects relative to the real-world objects and relative to one another.

The at least one sensor may sense a wave movement initiated by the user, and the augmented reality viewer may further include a wave movement routine on the storage device and executable by the processor to move the nomadic life object in response to the wave movement that is sensed by the at least one sensor. The wave movement may be initiated in a target zone and the nomadic object may be moved out of the target zone. The at least one sensor sensing the wave movement may be a camera that detects an image of a hand of the user.

The augmented reality viewer may further include a handheld controller, wherein the sensor is mounted to a handheld controller that is held in a hand of the user.

Figure 5A:
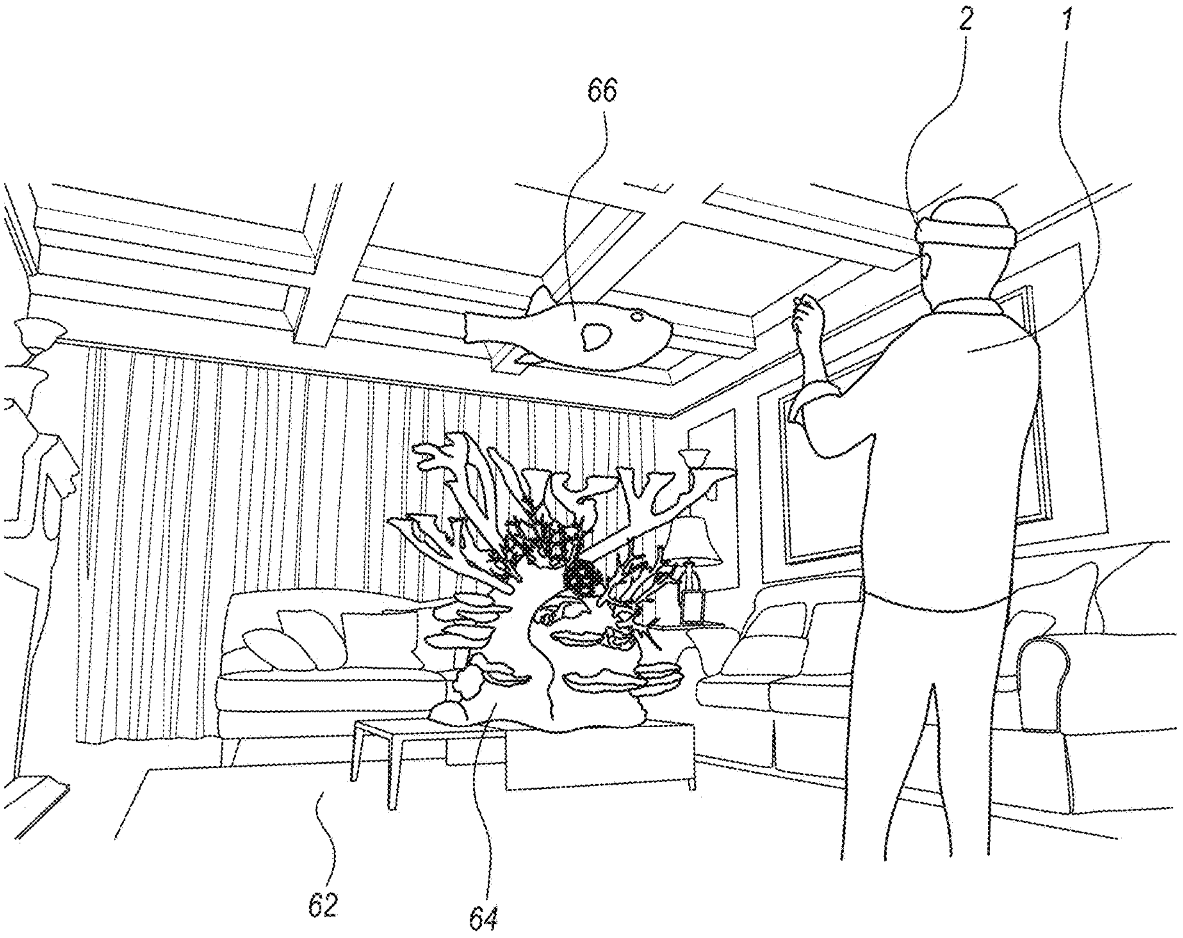
FIG. 5A to 5E are depth views that show a living room scene wherein a user can experience a dynamic virtual aquatic environment.
Figure 5B:
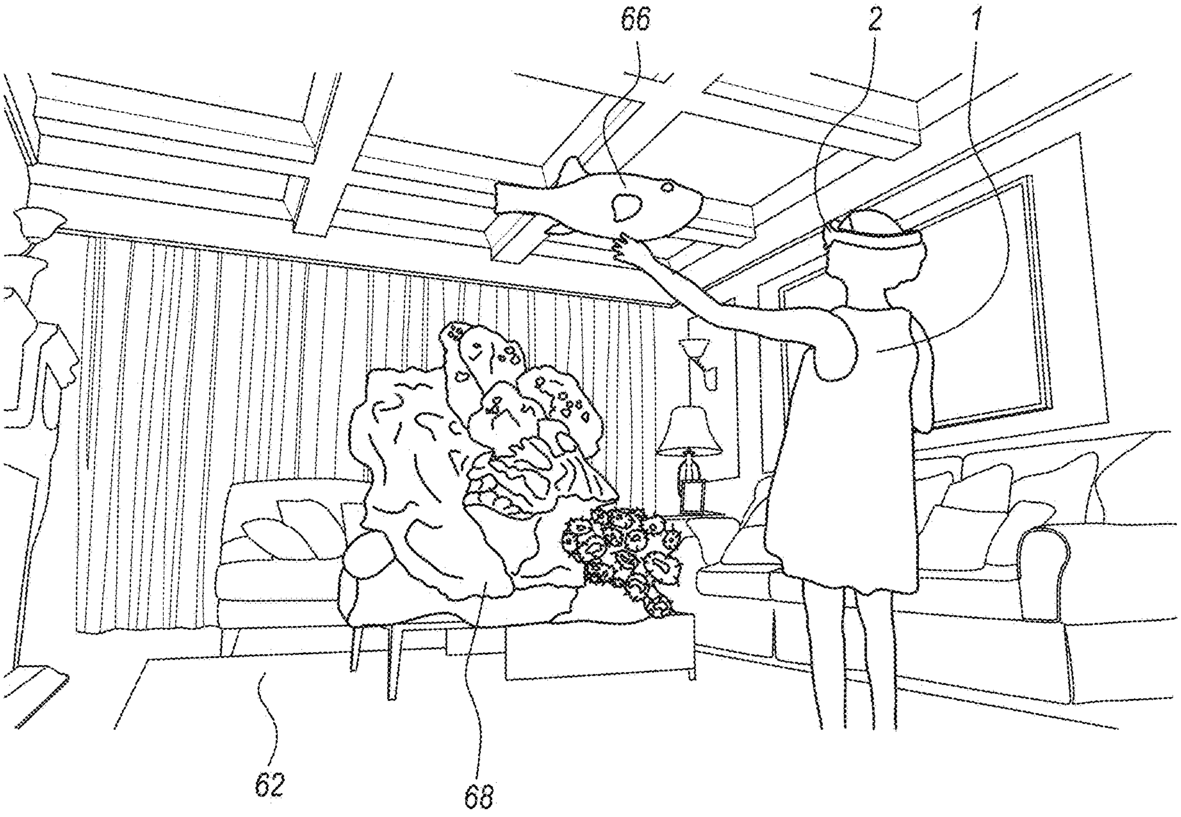
Figure 5C:
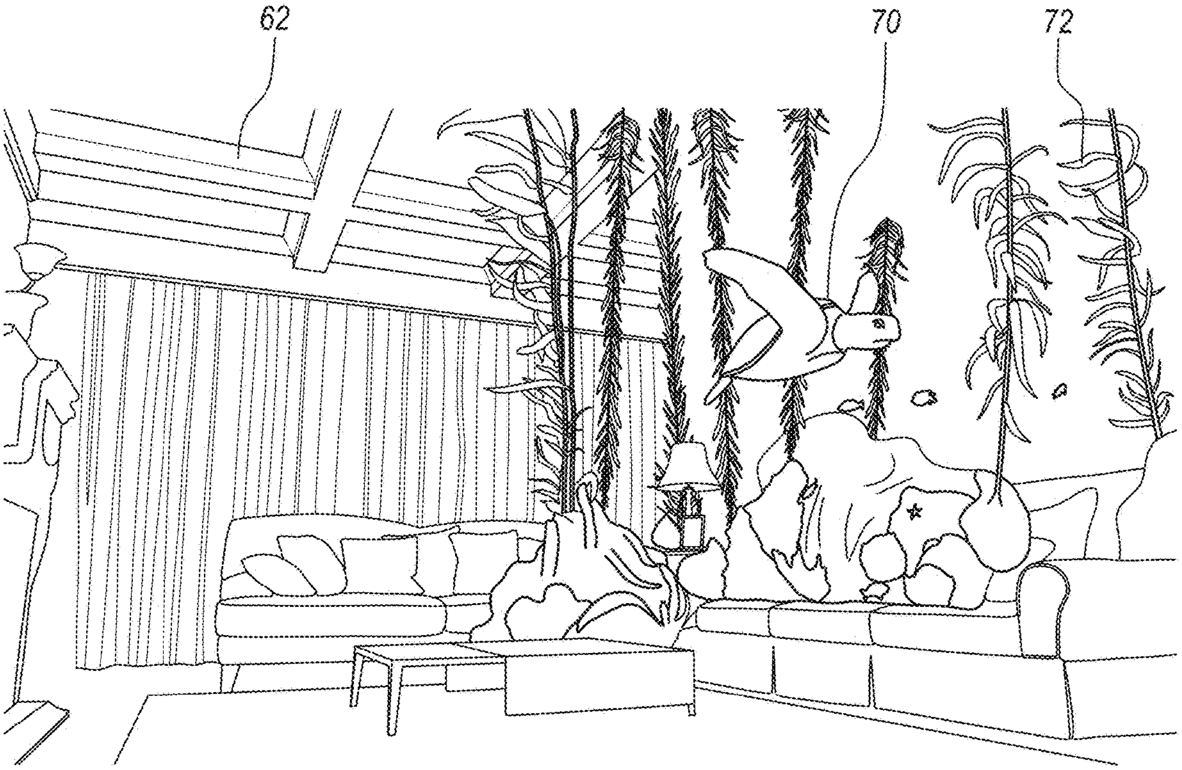
Figure 5D:
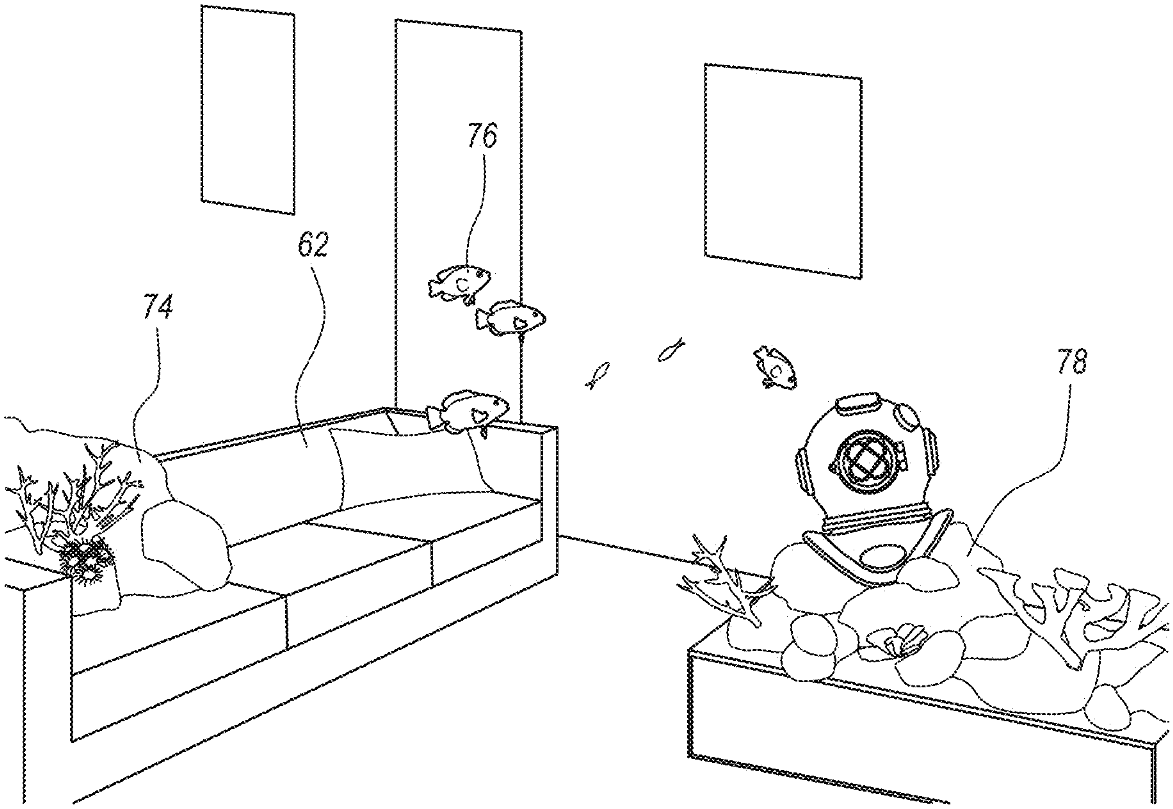
Figure 5E:
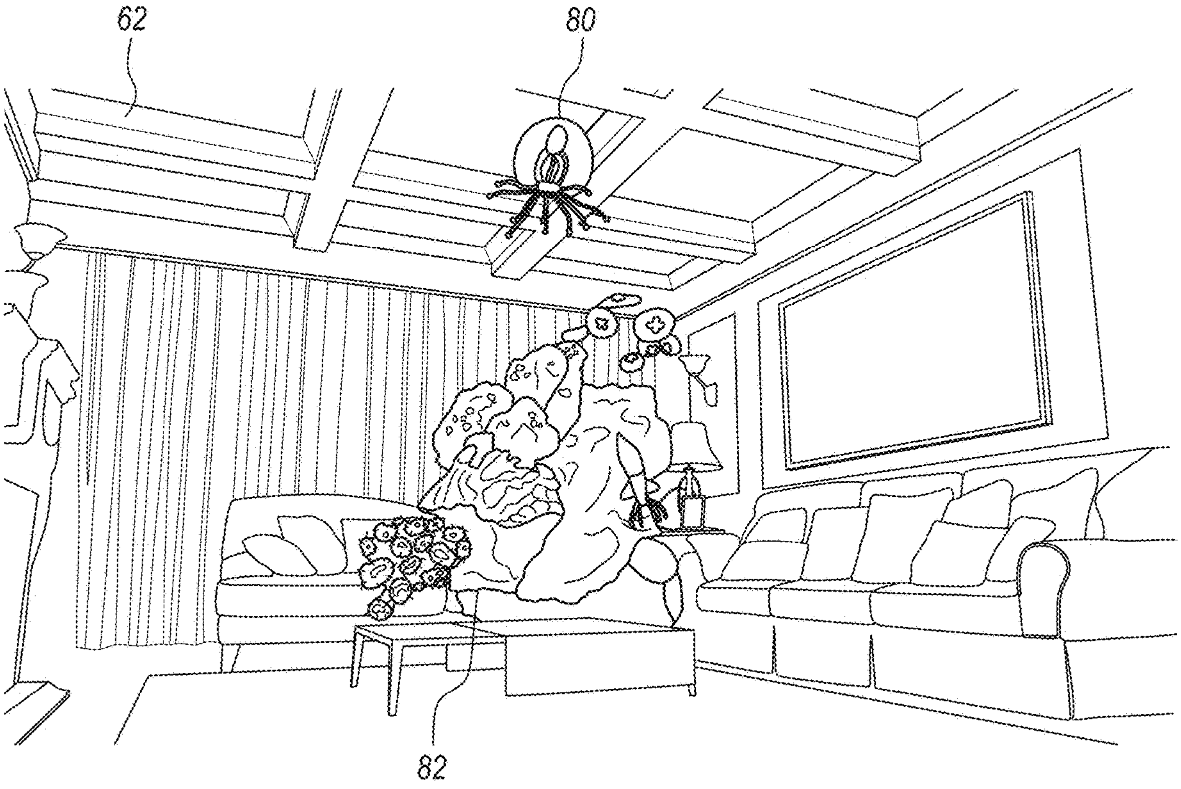

Referring to FIGS. 5A-5E, various embodiments of user viewable scenarios featuring actual room elements 62 as well as various virtual elements such as coral groupings or clusters 64, 68, 74, 78, 82, 83, kelp plants or forests 72, fish or other animals or schools or groups thereof 66, 70, 76, 77, 80, and the like, are illustrated. Referring to FIG. 5A, a living room scene is illustrated wherein a user 1 wearing a spatial computing system 2 is able to experience a dynamic virtual aquatic environment featuring a centrally located virtual coral cluster 64 as well as a relatively large and dynamic virtual fish 66. Referring to FIG. 5B, a living room scene is illustrated wherein another user 1 wearing a spatial computing system 2 is able to experience a dynamic virtual aquatic environment featuring a different centrally located virtual coral cluster 64 as well as a relatively large and dynamic virtual fish 66. Referring to FIG. 5C, a user may be able to view a living room scene with virtual aquatic elements such as a dynamic sea turtle 70 and a dynamic kelp forest 72. Referring to FIG. 5D, a user may be able to view a living room scene with virtual aquatic elements such as a dynamic school of fish 76, a coral cluster 74, and a central feature 78 comprising a sunken diver helmet, coral cluster, and dynamic aquatic plants. Referring to FIG. 5E, a user may be able to view a living room scene with virtual aquatic elements such as a dynamic jellyfish 80 and a central feature 82 comprising a coral cluster and dynamic aquatic plants. With each of the viewable configurations, the system may be configured to allow the user to adjust not only coloration themes, lighting, and shading, but also lighting placement.

Figure 6:
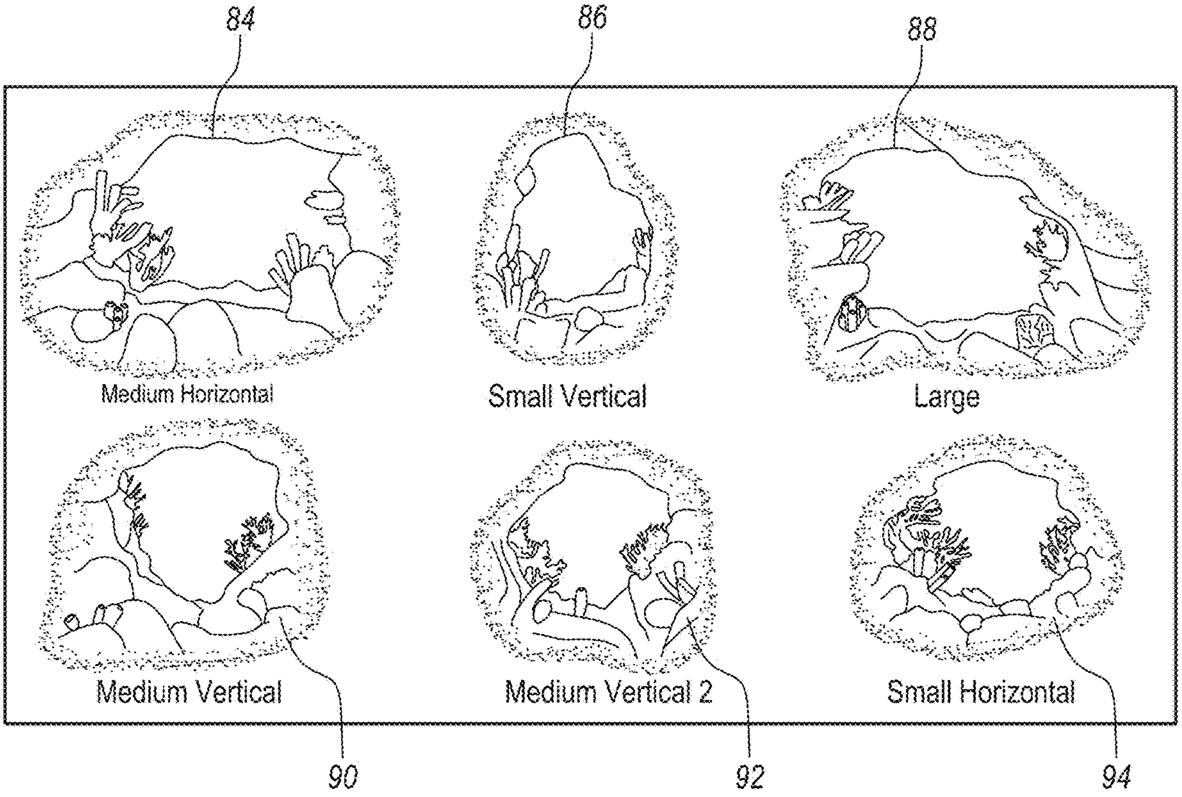
FIG. 6 are views configured to assist the user in selecting a size and location for framing/portal viewing access into a "vista"

Referring to FIG. 6, as noted above in reference to FIG. 2, the system may be configured to assist the user in selecting a size and location for framing/portal viewing access into a "vista". The user is presented with sample framing/portal configurations 84, 86, 88, 90, 92, 94 which may be selected by the user, depending upon the size and geometry of the actual environmental feature with which the frame or portal is to be virtually "coupled". For example, if a blank space of a vertical wall in a user's actual office is available but is relatively small, the system may be configured to suggest placing a frame or portal which is relatively small and relatively geometrically efficient.

Figure 7:
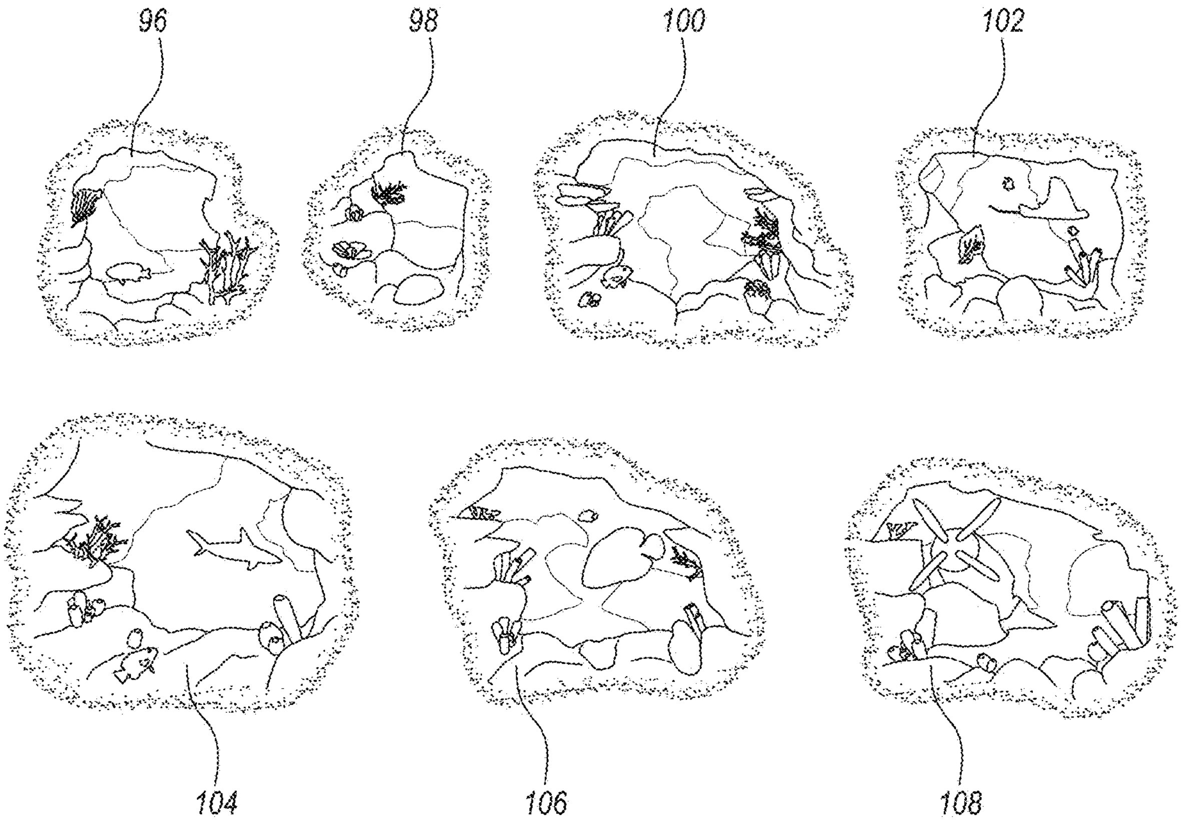
FIG. 7 are views showing that various aspects of a "vista" may be selected.

Referring to FIG. 7, with a frame or portal configuration selected, as described in reference to FIG. 6, various aspects of a "vista" may be selected, such as coloration, lighting, volume, virtual features such as rocks and fish, etc., resulting in many customizable choices, such as the seven samples 96, 98, 100, 102, 104, 106, 108.

Figure 8A:
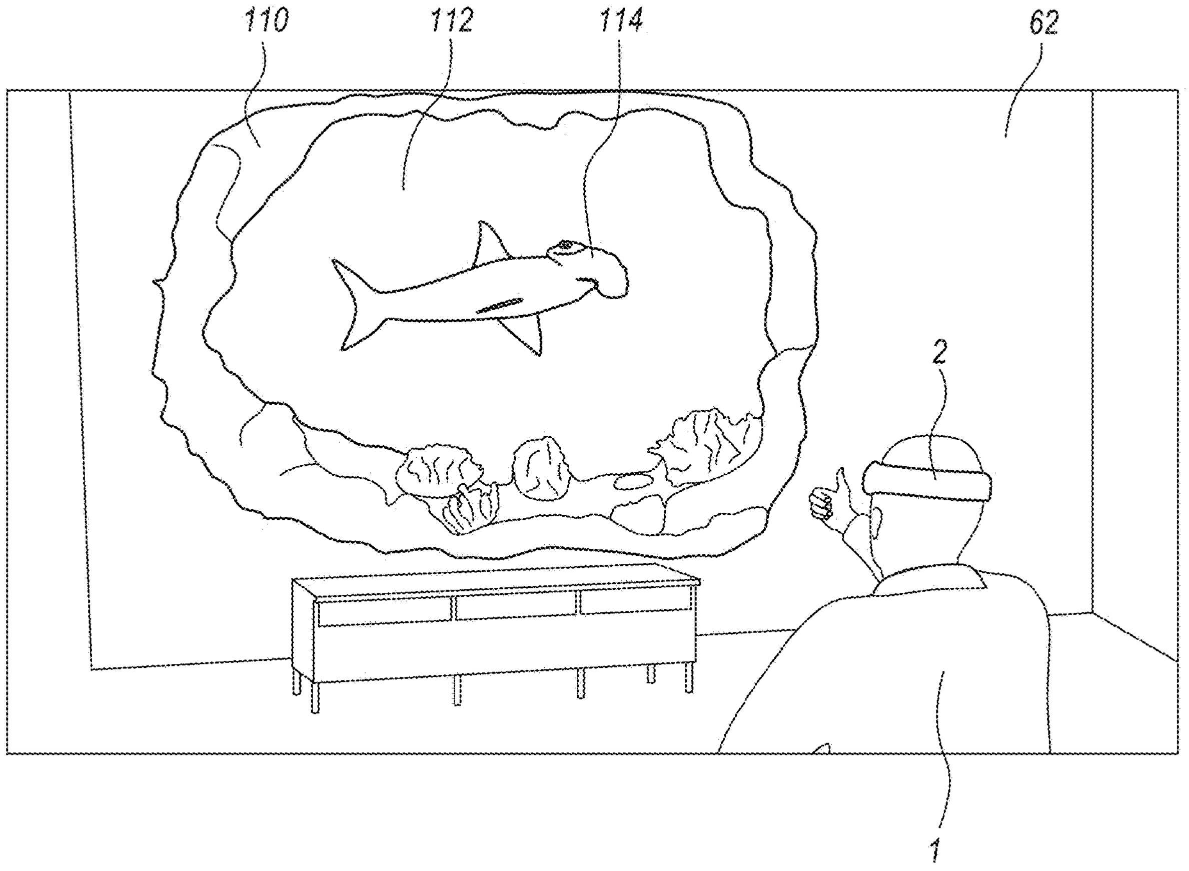
FIGS. 8A to 8C are depth views with a virtual frame or portal created so that he can virtually "see" out into an oceanic "vista" volume.
Figure 8B:
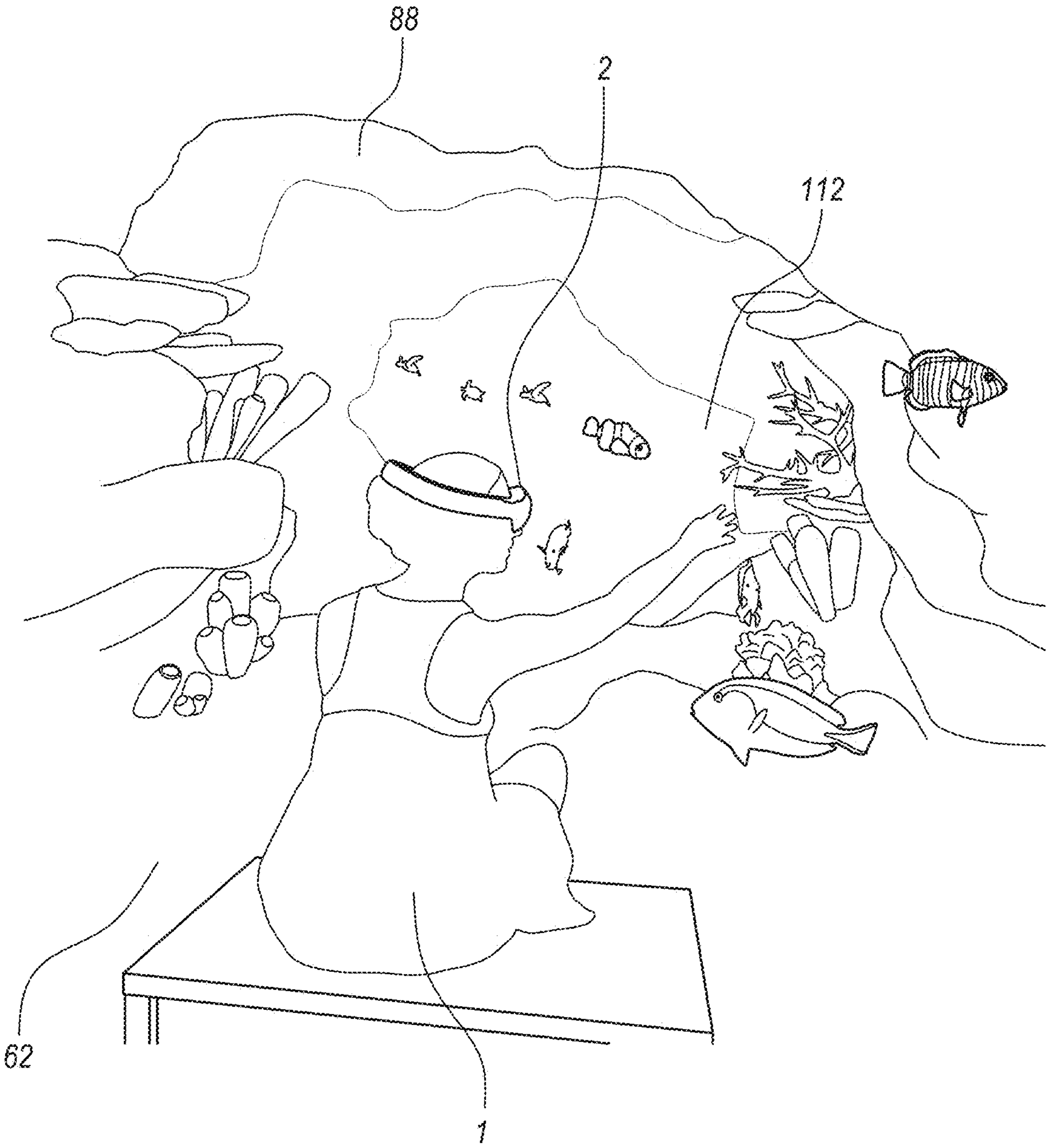
Figure 8C:
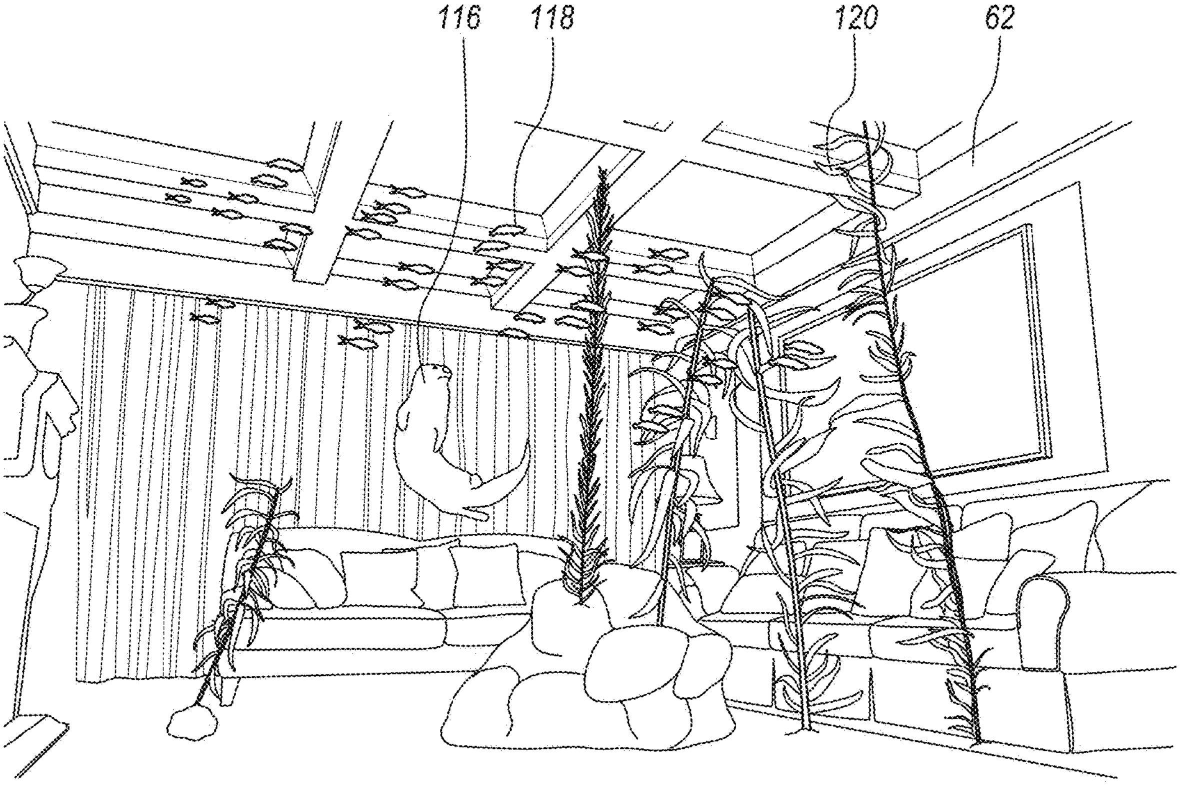

Referring to FIGS. 8A-8C, various views of "vista" room expansion configurations are illustrated. Referring to FIG. 8A, a user 1 wearing a head mounted component 2 of a spatial computing system such as that shown in FIG. 1 is shown in his living room 62 with a virtual frame or portal 110 created so that he can virtually "see" out into a oceanic "vista" volume 112 which features a virtual dynamic shark 114 in the depicted illustrative example. Referring to FIG. 8B, a user 1 wearing a head mounted component 2 of a spatial computing system such as that shown in FIG. 1 is shown in her living room 62 with a virtual frame or portal 88 created so that he can virtually "see" out into a oceanic "vista" volume 112 which features virtual elements of many kinds such as rocks, fish, plants, and coral, in the depicted illustrative example. Referring to FIG. 8C, an illustrative example of a living room 62 scene featuring dynamic virtual elements such as a sea otter 116, school of fish 118, and kelp forest 120 are shown with a "vista" that in this case extends upward through the ceiling of the actual room, providing the perception for the user that his living room is relatively deep in the virtual aquatic environment.

The augmented reality viewer may include a depth creation module on the storage device and executable with the processor to display, according to the desired display, in three-dimensional space, the virtual object to the user on a side of the opposing the user and with the surface between the user and the virtual object. The depth creation module may be executable with the processor to display a porthole in the surface to the user through which the virtual object is visible to the user. The virtual object may be a three-dimensional virtual object.

Figure 9A:
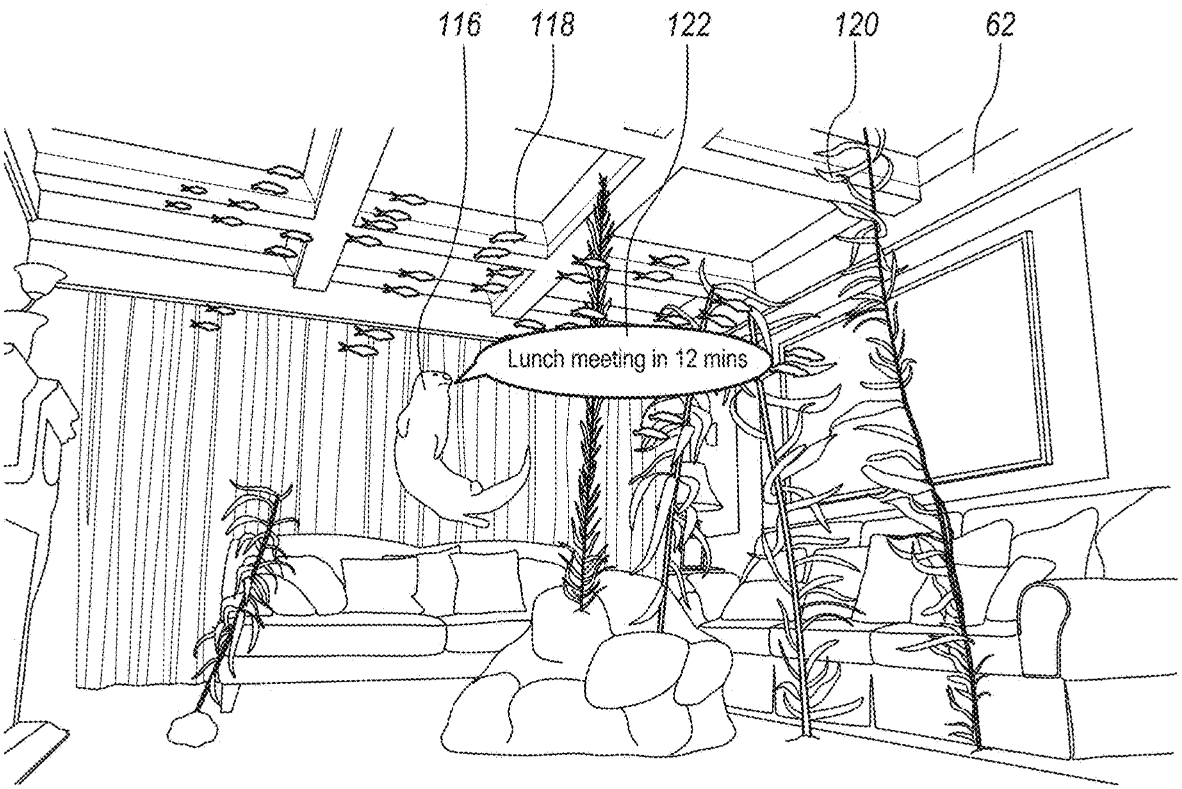
FIGS. 9A to 9D are depth views showing interaction between the user and various nomadic objects.
Figure 9B:
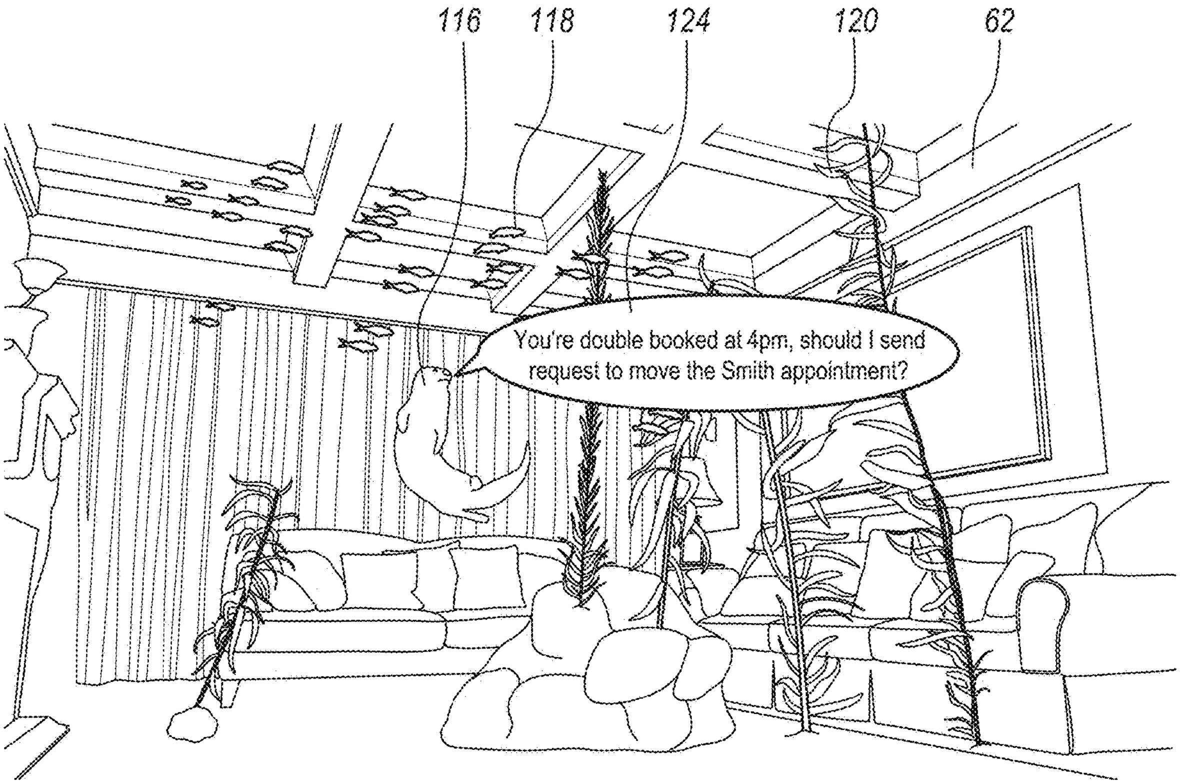
Figure 9C:
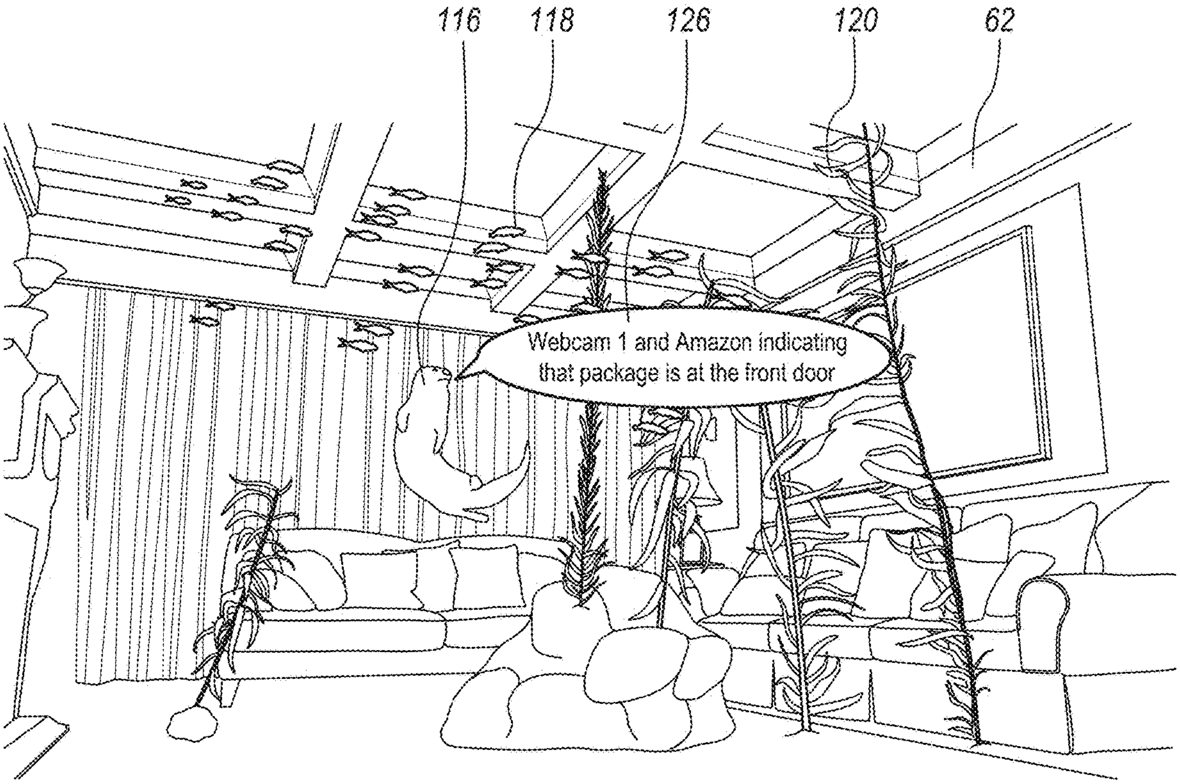

Referring to FIGS. 9A-9C, as noted in reference to FIG. 2, the system may be configured so that the user may interact with various virtual features, and so that the system may "learn" to configure the virtual presentation as desired by the user. For example, in various embodiments, if a user is seated in a relatively empty room with one door and one centrally located desk upon which there is a computer monitor, the user's spatial computing system may assist the user in locating corals, aquatic plants, and other features within the room, and the system may be configured to "spawn" or generate fish to dynamically swim about within the room. As the user sits at his or her desk and tries to use the computer monitor located a few feet in front of the user's head, if a too many fish start to swim between the user's head and the user's computer monitor, the user may waive them away (or use another system-recognizable gesture) with his hands, or use other controls (such as a handheld controller 4, to indicate to the system that the user doesn't want the fish right there between his head and the monitor. In various embodiments, the system may be configured to use artificial intelligence or learning features to learn that the user seems to not want too many fish swimming about in that volume between the user's head and the computer monitor—and the system may be configured to generally keep virtual objects such as fish, plants, or coral out of that volume. Similarly, the system may learn that the user generally doesn't like too many virtual plants or corals growing on his favorite window or door and may respond accordingly by learning to not place them there virtually.

Referring back to FIG. 1, the system may be operatively coupled to additional resources, such as other computing systems, by cloud or other connectivity configurations. For example, the spatial computing system may be operatively and securely coupled with a cellphone or laptop computer with privileges to access the user's calendar, texting, or internet-of-things ("IOT") connected resources, such as webcams, door locks, lights, or garage doors. Now referring again to FIGS. 9A-9D, such resource connectivity may be utilized in various embodiments such that one of more virtual features of the virtual presentation may be utilized to assist the user; in other words, in the illustrated configurations, the virtual sea otter 116 may be configured to generally swim around dynamically like a wild sea otter until some interaction is needed or desired by the user, in which case the sea otter may function akin to a personal assistant with connectivity to pertinent resources. For example, in the embodiment of FIG. 9A, the sea otter 116 is telling the user with a displayed bubble message 122 that the user's lunch meeting is in 12 minutes. The system may be configured such that the user can utilize a simple gesture, such as flicking away with the index finger, to clear the message and return the otter 116 back to natural dynamics. Referring to FIG. 9B, the system may be configured such that the otter character 116 provides a message bubble notification 124 that connected calendaring resources are indicating that the user is double booked; if the user desires, the otter can utilize the connected resources to send a message automatically to request a rescheduling of one of the appointments.

The augmented reality viewer may thus include a transmission agent on the storage device and executable with the processor to sense, with the at least one sensor, an instruction by the user, sense, with the at least one sensor, that the instruction is directed by the user to the nomadic life object at a location of the nomadic life object relative to the real-world objects, determine, based on the instruction, an outgoing communication and a resource, and communicate the outgoing communication to the resource.

The at least one sensor that senses the communication may be a microphone suitable to receive a voice instruction from the user.

Referring to FIG. 9C, the system may be configured such that the otter character 116 provides a message bubble notification 126 that connected webcam and messaging (and or Amazon network/web) resources are indicating that the user has received a package; such system may be further configured to allow the user to open the IOT garage door or other IOT-enabled access point to facilitate delivery by requesting this of the otter character 116, such as by voice recognition tools of the spatial computing system which utilize intercoupled microphone sensors 30.

The augmented reality viewer may thus include a transmission agent on the storage device and executable with the processor to sense, with the at least one sensor, an instruction by the user, sense, with the at least one sensor, that the instruction is directed by the user to the nomadic life object at a location of the nomadic life object relative to the real-world objects, determine, based on the instruction, an outgoing communication and an IOT device, and communicate the outgoing communication to the IOT device to operate the IOT device.

The at least one sensor that senses the communication may be a microphone suitable to receive a voice instruction from the user.

Figure 9D:
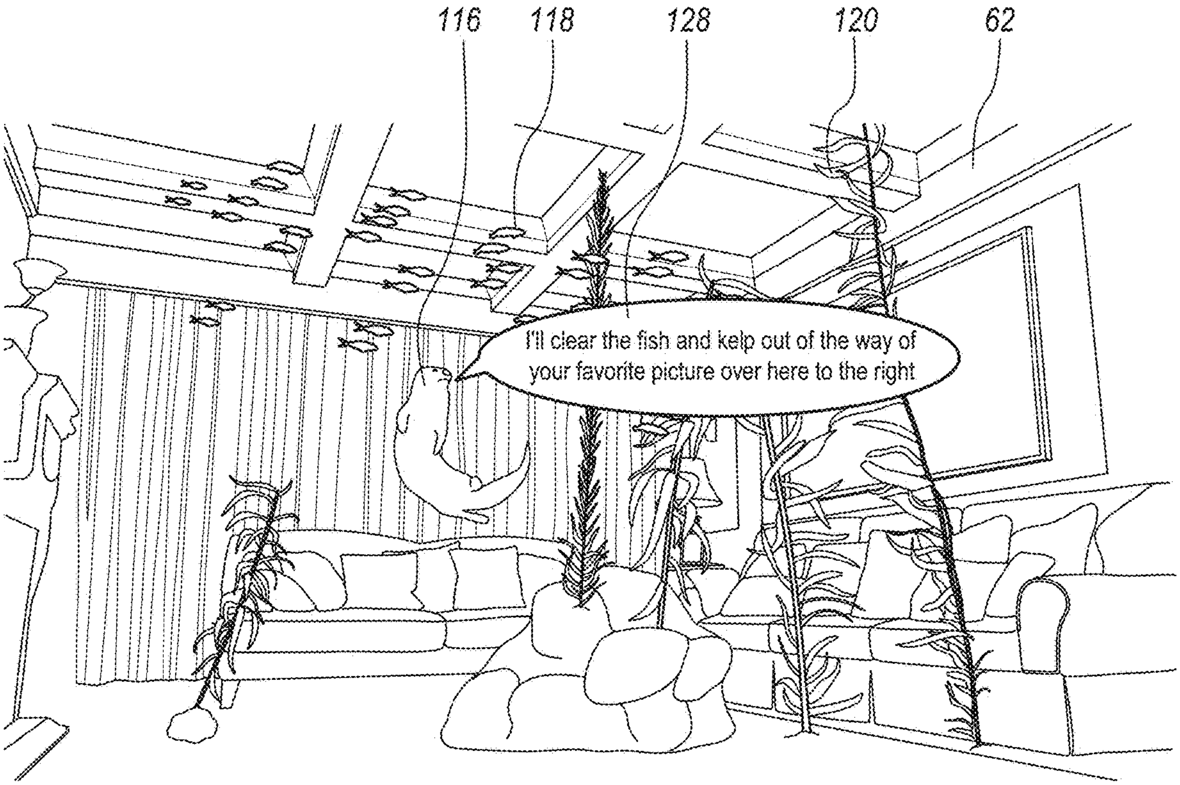

Referring to FIG. 9D, the system may be configured to use artificial intelligence and/or learning types of tools to analyze the eye gaze information pertinent to the user which may be captured by inward-facing cameras coupled to the head-wearable component 2 of the user's spatial computing system. Such analysis may yield system-based provisional conclusions that, for example, the user may be trying to gaze at something on the wall, such as a posted actual artwork, that currently is virtually obstructed by a kelp forest or other virtual feature—and that it may be a helpful thing for the personal-assistant-functioning otter character 116 to ask the user if he would like the right portion of the kelp forest moved a bit to allow better viewing of the actual wall, as suggested in the message bubble 128 shown in FIG. 9D.

The augmented reality viewer my include an artificial intelligence system on the storage device and executable with the processor to sense an action by the user using the at least one sensor, perform a routine involving the virtual object that is responsive to the action of the user, associate the routine with the action as an artificial intelligence cluster, determine a parameter that exists at a first time when the action is sensed, associate the parameter that exists at the first time with the artificial intelligence cluster, sense a parameter at a second time, determine whether the parameter at the second time is the same as the parameter at the first time, and, if the determination is made that the parameter at the second time is the same as the parameter at the first time then executing the routine.

The at least one sensor may include an eye tracking camera, wherein the action is a wave motion initiated by the user and the parameters are a gaze direction as determined by eye tracking of the user using the eye tracking camera. The action may be a wave movement initiated in a target zone and the nomadic object is moved out of the target zone.

The at least one sensor may include an eye tracking camera positioned to sense a gaze direction of the user, and the augmented reality viewer may further include a gaze direction movement routine on the storage device and executable by the processor to move the nomadic life object in response to the gaze direction that is sensed by the eye tracking camera.

There may be a plurality of nomadic life objects and the nomadic subroutine may be executable by the processor to move the plurality of nomadic life object relative to the real-world objects, and the augmented reality viewer may further include a personal assistant module on the storage device and executable with the processor to select a personal assistant nomadic life object among the plurality of nomadic life objects, and move at least one of the nomadic life objects other than the personal assistant nomadic life object with the personal assistant nomadic life object.

Figure 10A:
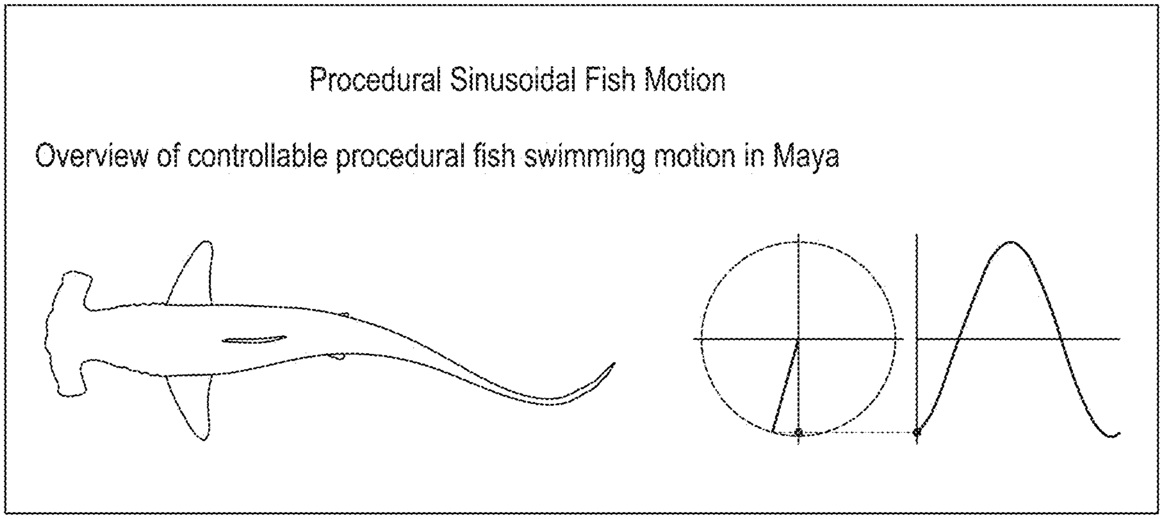
FIGS. 10A and 10B are views of mathematical models of cyclical behaviors of the various virtual characters.
Figure 10B:
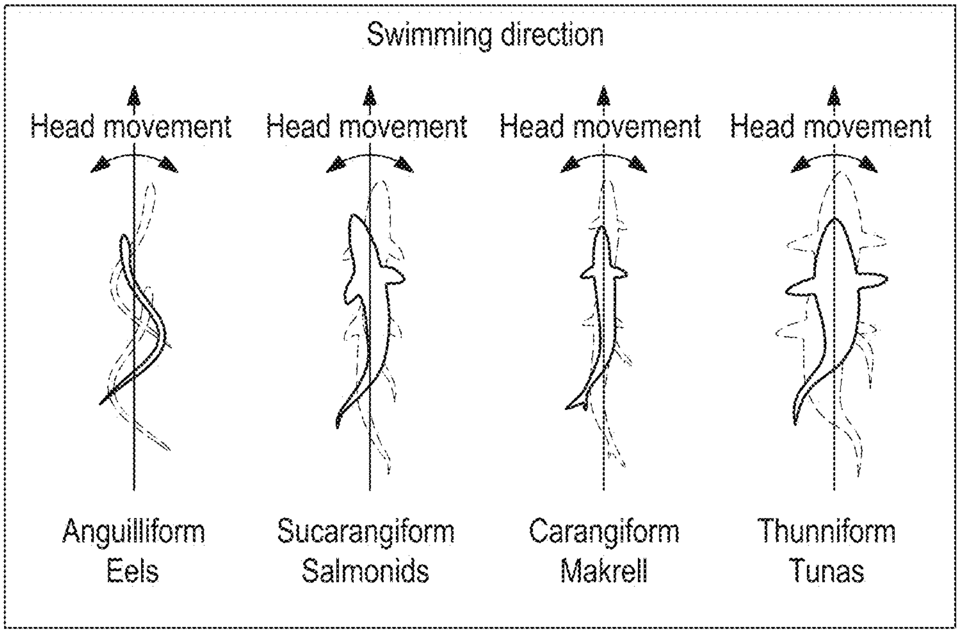

Referring to FIGS. 10A and 10B, in various embodiments, mathematical models may provide the basis for certain cyclical behaviors of the various virtual characters (such as fish of various types), and various types of fish may have various types of general locomotion patterns which may be utilized to produce motion which appears natural to the user. As noted above, in various embodiments, the fish may have several states to which they may be configured to return, such as fleeing as though they are scared, following as though they are interested, hungry, or curious, and these behaviors may be associated with factors such as velocity of a user's hand movement. For example, certain gestures or slow hand movements may be associated with feeding or friendliness/safety, such that one or more fish may be configured to follow or stay near the user's hand, whereas fast motions or certain gestures may be associated with potential danger or fear, in which case the one or more fish may be configured to flee the immediate area.

The nomadic life object may be a fish of a first type, and the augmented reality viewer may further include a movement module on the storage device and executable with the processor to articulate a body of the fish in a first back-and-forth manner. The movement module is executable with the processor to articulate a body of a fish of a second type in a second back-and-forth manner that is different from the first back-and-forth manner. The movement module may be executable with the processor to sense, with the at least one sensor, a slow hand movement of a hand of the user, and articulate the body of the fish in the first back-and-forth manner at a low speed in response to the slow speed of the hand movement, sense, with the at least one sensor, a fast hand movement of the hand of the user, and articulate the body of the fish in the first back-and-forth manner at a high speed in response to the fast speed of the hand movement. The movement module may be executable with the processor to move the first fish to stay close to the hand when the hand moves at the slow speed, and move the first fish to flee the hand when the hand moves at the fast speed.

Figure 11A:
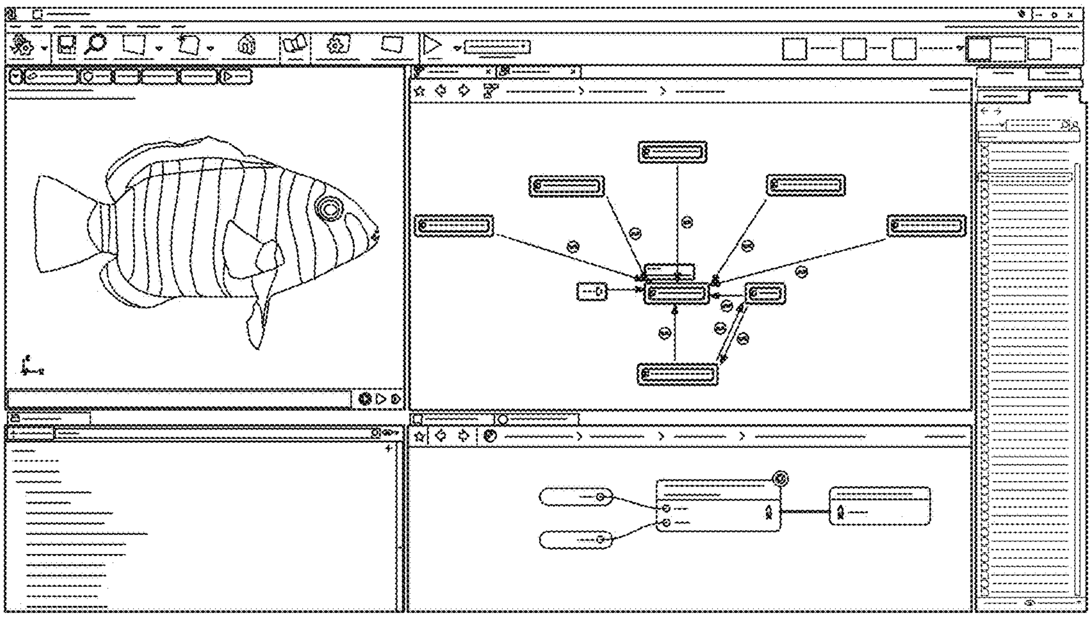
FIG. 11A is a screen shot of configurations that may be utilized to move the fish relative to the user.

Referring to FIG. 11A, various configurations may be utilized to move the fish relative to the user believably and efficiently from a spatial computing resources perspective. For example, a sine wave output may be utilized to modulate the position of a tail and body of a fish relative to each other. Rather than keyframing data for each body part, the system may be configured to change the speed generally of the character without precision math calculating velocities of every component thereof and secondary motion may be added for other components in various embodiments. Thus, the system may be configured such that grouped or bulk motion may be produced without having to hand-animate every part. FIG. 11A illustrates a flowchart for a series of animations such as "sharp left turn", then "sharp right turn", which may be fed into the basic locomotion engine. Transition code may assist with transitions between states, such as between normal straight calm swimming motion and a fleeing state. Interpolation, or animation blending, and type transitioning may be utilized to smooth transitions.

Figure 11B:
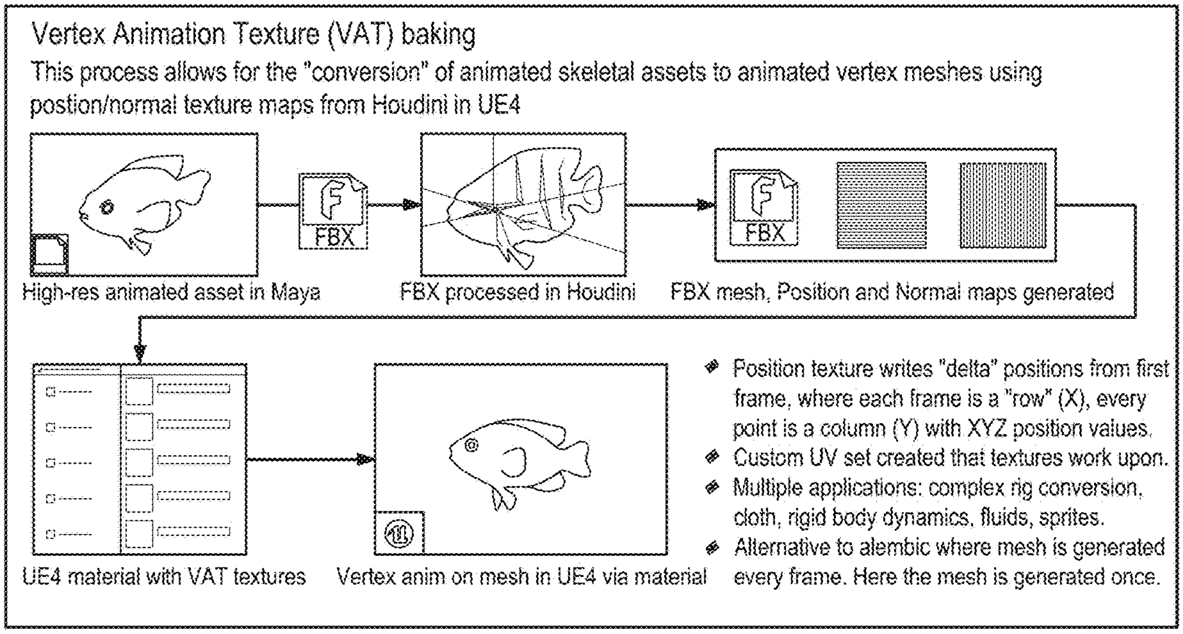
FIG. 11B is a flowchart of vertex animation to assist in converting animated skeletal assets to animated vertex meshes in a clownfish.
Figure 12A:
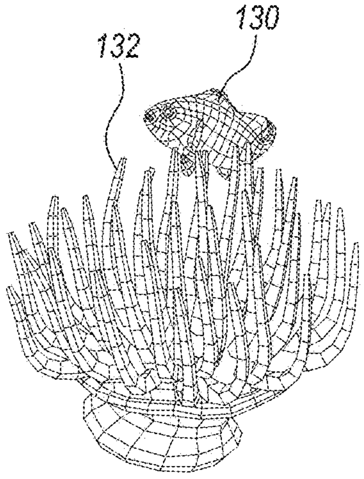
FIGS. 12A to 12D are depth views of vertex animation to assist in converting animated skeletal assets to animated vertex meshes in other virtual objects.
Figure 12B:
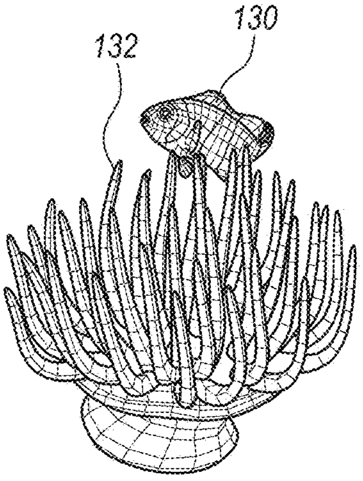
Figure 12C:
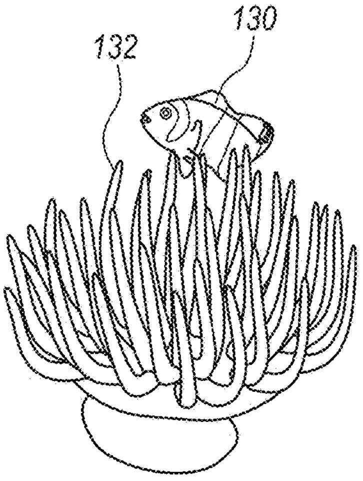
Figure 12D:
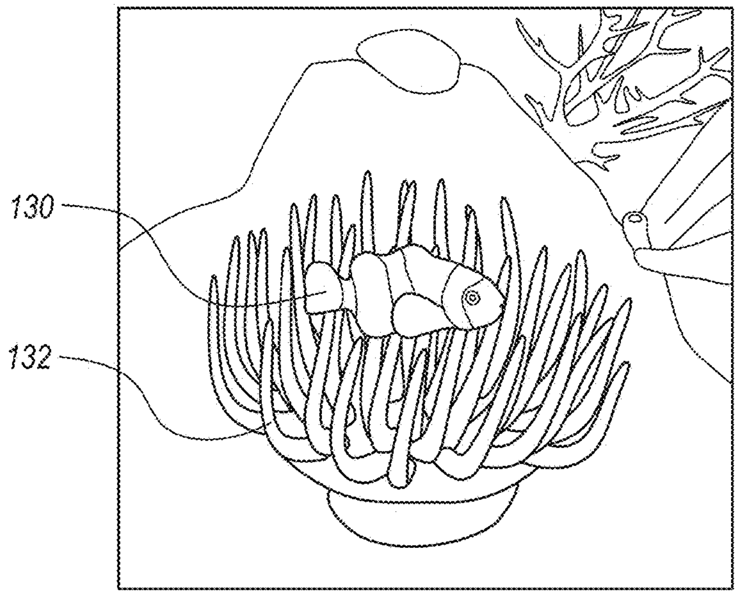

Referring to FIG. 11B, vertex animation may be utilized to assist in converting animated skeletal assets to animated vertex meshes using texture maps, such as those from the brand/authoring tool available under the tradename Houdini®, which may be utilized to process data that may be brought into an interactive development environment, such as the Unreal Engine® for incorporation into the experience to be presented to the user. Such techniques may be utilized to assist in making assets such as fish significantly more efficient to display for the user, as well as more efficient from a computing resources perspective. In other words, a basic three dimensional model may be associated with a "rig"; then the system may be configured such that the rig need not be used at runtime since associated vertices of the 3-dimensional model/mesh may be animated directly. For example, instead of manipulating a skeleton type frame underlying a fish model, the fish itself, or a mesh thereof, may be moved (i.e., manipulate the mesh vs the rig). Such efficiencies allow for reduced compute overhead, and may assist, for example, in rendering more fish simultaneously.

Referring to FIGS. 12A-12D, similar approaches may be utilized to not only efficiently animate fish such as the clownfish asset shown 130, but also to animate features such as anemones 132. FIGS. 12A-12D illustrate views of the clownfish 130 and anemone 132 in various levels of natural replication, from mesh elements, as in FIG. 12A, to full color animation elements, as in FIG. 12D. If each anemone tentacle had to be animated individually rather than as described above, the requisite computing resources would be significantly larger.

The augmented reality viewer may include a vertex animation routine on the storage device and executable with the processor to store a virtual object mesh representing the virtual object, associate a texture with the virtual object mesh, and manipulate the virtual object mesh to cause movement of the texture and the virtual object in a view of the user. The virtual object mesh may be manipulated to articulate the virtual object. The same virtual object mesh may be used multiple times to cause movement of the texture and the virtual object.

Figure 13:
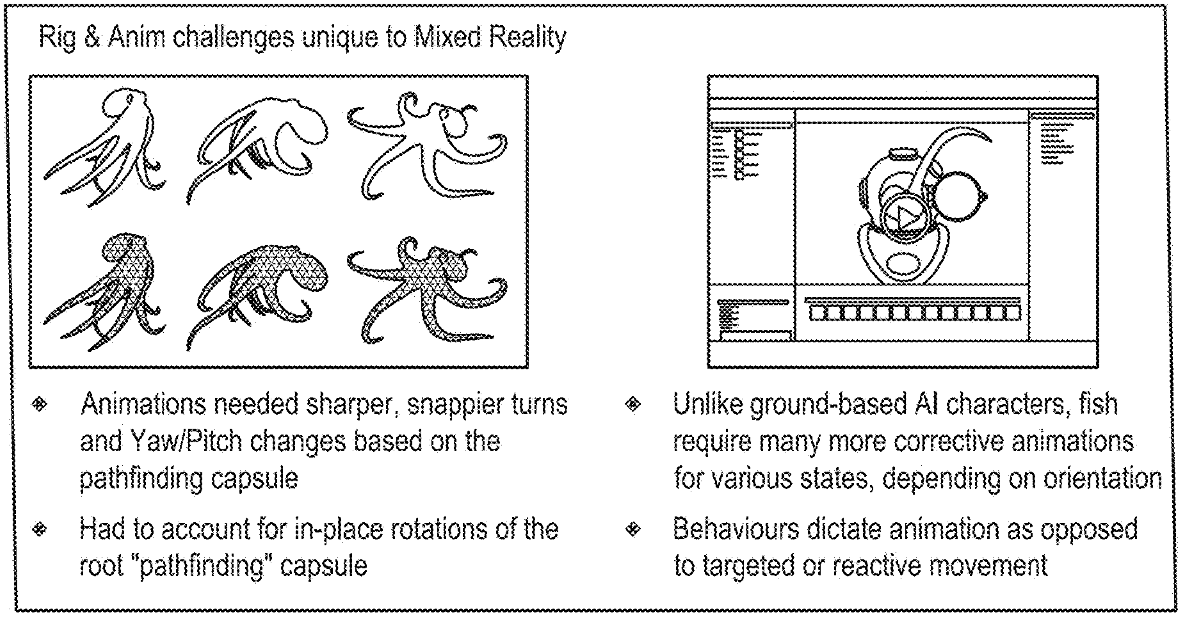
FIG. 13 is a slide to show unpredictability in unknown environments.

Referring to FIG. 13, in a mixed reality or spatial computing environment, there is a lot of unpredictability, as the system is configured to dynamically react relative to the environment around the user. It is not clear ahead of time what the room around the user will be like geometrically until the system scans the room. There are some unique challenges presented in terms of animating various features, mainly because a very wide range of believable behavior is generally preferred. For example, in a completely virtual reality system, each rock and each fish and each coral could be carefully placed in three dimensions to work well together. This is not the case with an unknown room that the user can see and experience around them in augmented reality. Further, as described above, the system is preferably configured such that various elements, such as fish, may interact with the user, such as via hand or eye motions of the user, and these may also be relatively unpredictable. If every fish did the same pirouette to the left and swam away at the same vector when a relatively high velocity hand of a user approached, the scene would not appear natural. Thus, the system preferably is configured to have many variations of dynamic behaviors for the various states, such as feeding or fleeing.

Figure 14:
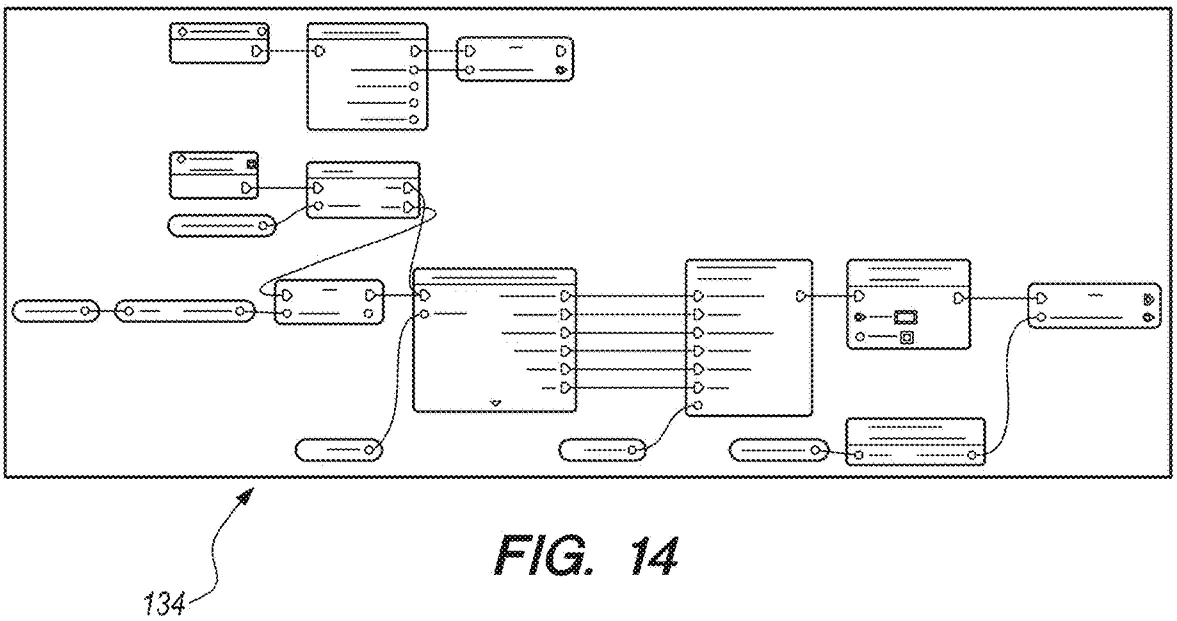
FIG. 14 is a screen shot a "code blueprint"
Figure 15:
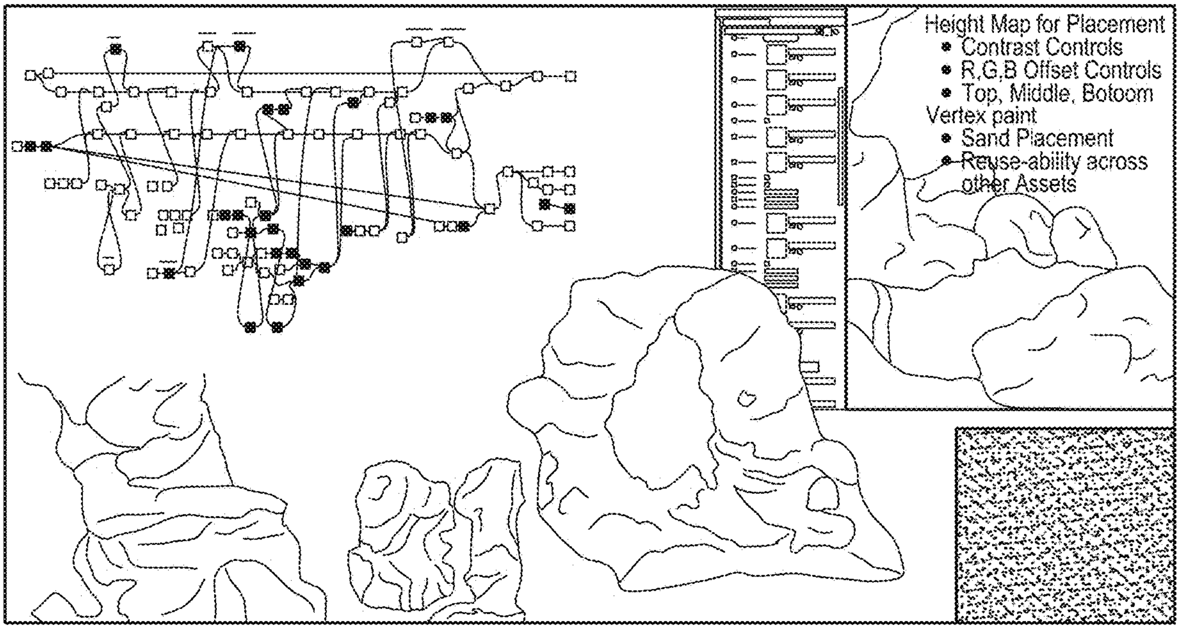
FIG. 15 is a screen shot that illustrates aspects of an interface for laying out and texturing various elements.

Referring to FIG. 14, a "code blueprint" 134 is shown, such as those which may be created using an environment such as that available under the tradename Unreal Engine®. Such a code blueprint represents relatively high level functional programming of various elements, and may be utilized, for example, to control how the system switches between various vista framing/porting configurations, as described above in reference to FIGS. 4, 6, 7, and 8A-8C. For example, the system may be configured to not only locate possible generally planar locations for possible vistas and frames/ports associated therewith, but also to maximize the size of such vistas and frames/ports and/or center them horizontally and/or vertically relative to the planar surface, etc. FIG. 15 illustrates aspects of an interface for laying out and texturing various elements, such as a coral, to be presented to the user. In various embodiments, coloring or painting may be conducted directly on the vertex of the mesh of the object, and height map controls may be utilized to provide texture and topology for an object, so that such configuring need not be conducted with polygons.

Figure 16:
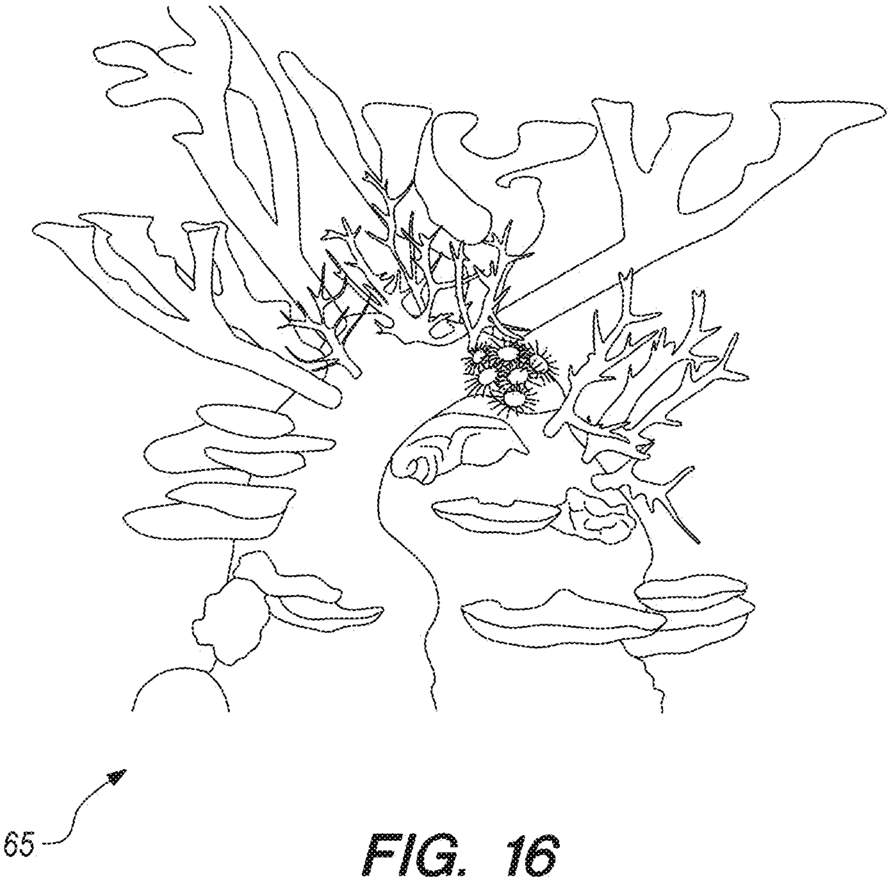
FIG. 16 is a depth view of a coral cluster comprising an assembly of smaller coral elements.

Referring to FIG. 16, a coral cluster 65 similar to those described above 64, 68, 74, 78, 82 is shown and may comprise an assembly of smaller coral elements which may be utilized together akin to building blocks, with configurable rules to assist in making such assembly natural (for example, in various configurations table-driven settings may be utilized to control variables such as number of coral elements which may extend from a given base rock element, acceptable vectoring of plants relative to light sources, etc.). Thus, the system presentation may be iterated using a control panel of sorts without modifying code for every tuning change.

Figure 17A:
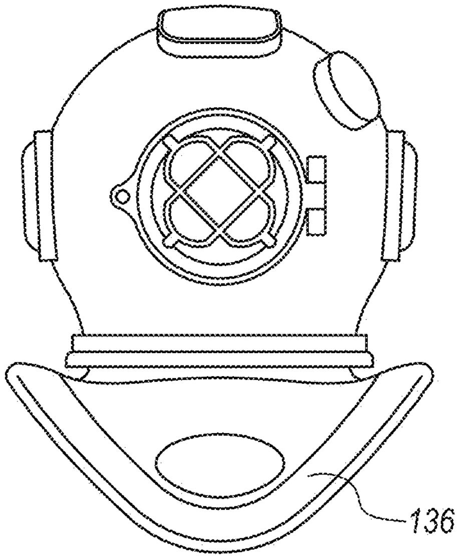
FIG. 17A is a depth view of a high-fidelity model of a diver helmet.
Figure 17B:
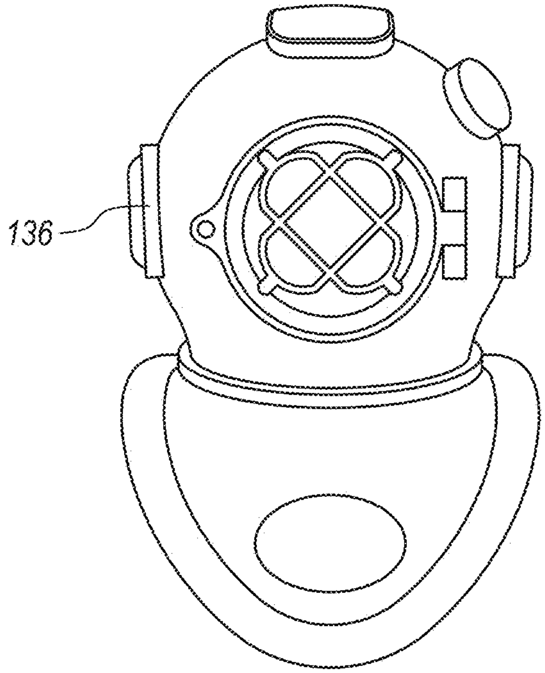
FIGS. 17B and 17C are depth views illustrating a much more efficiently reproducible output of the diver helmet.
Figure 17C:
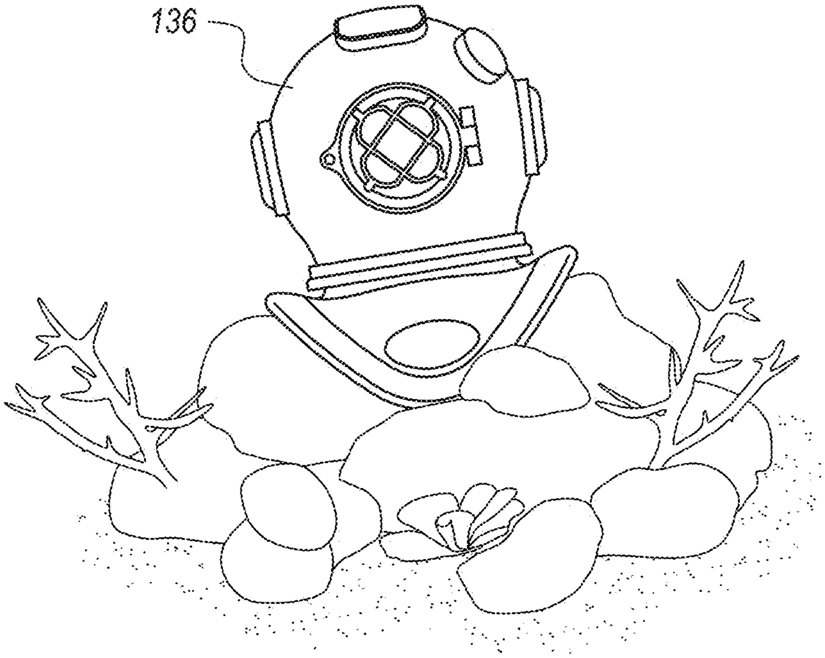
Figure 18:
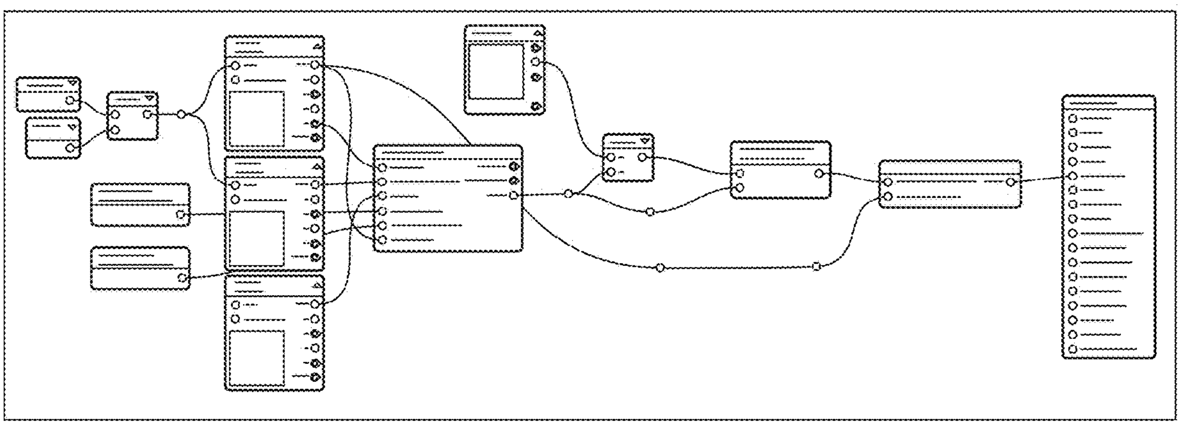
FIG. 18 is a screen of a shot core unlit shader network configuration.

Referring to FIGS. 17A-17C, with regard to lighting and shading, in various embodiments lighting may be faked (i.e., without emulating physics) in a given scene to bypass conventional development environment shading and shadowing, with shading accomplished, for example, by an unlit shading path (i.e., an "emissive channel" in Unreal® terminology, or "unlit channel" in Unity®; in both cases meaning generally to process a texture without calculating any lighting). The conventional overhead of the graphics pipeline may be bypassed to achieve greater visual quality within tight performance budgets, yielding important overall compute demand efficiencies. The system is configured to utilize unlit shading path techniques, bypassing a conventional lighting engine, and other effects such as fog, optics, and/or water effects may be added to assist in making the presentation to the user perceived as more natural. Various elements may be "instanced", to allow for fine tuning the overall presentation without having to provide compute resource for every individual element. FIG. 17A illustrates a high fidelity model of a diver helmet 136; FIGS. 17B and 17C illustrate a much more efficiently reproducible output of the diver helmet 136, still with relatively high fidelity. Referring to FIG. 18, one embodiment of a core unlit shader network configuration 138 is shown in functional "code blueprint" form for an environment such as the Unreal Engine®.

Referring to FIGS. 19 and 20, as noted above, such as in reference to FIGS. 2, 3, and 4, the system may be configured to utilize the geometry of the room or environment that surrounds the user. Content (such as vistas or corals) may be placed using randomized procedural configurations, and/or to provide a content assembly that fits naturally in the room, is aesthetically pleasing to the user, and is at least somewhat different each time that the system is utilized for such application. As noted above, the system may be configured, for example, to identify planar surfaces, empty surfaces, and empty volumes, which may be suitable for placement of various elements, either with assistance from the user or automatically, such as in accordance with predetermined general themes which may be selected by the user.

The augmented reality viewer may include a surface extraction routine on the storage device and executable with the processor to identify a surface among the real-world objects. The surface may be a two-dimensional surface of a wall or a ceiling.

The augmented reality viewer may include a vista placement routine on the storage device and executable with the processor to capture a space that includes the real-world objects, represent the space as a real-world mesh, collect vertical and horizontal planes from the real-world mesh, filter the planes by height from a floor, dimensions, orientation, and location relative to the real-world mesh, spawn a blueprint which includes a portal frame and all the content in the vista at the selection location, and cut a hole in an occlusion material of the real-world mesh material so the user can see through the portal into the vista.

Referring to FIG. 21, the system also may be configured to locate positions within the mesh of the room that may be suitable anchors for elements such as coral clusters; suitable anchors may, for example, be scored, and the highest scoring may be recommended for the user or automatically selected; after scoring and selection, elements such as coral or coral clusters may then be grown or "spawned" for the user to observe. Scores may be impacted, for example, not only by geometry, but also positioning and orientation relative to the user (for example, the system may be configured to score a potential anchor point higher if a coral may be placed upon it in an orientation that is relatively perpendicular to the floor of the room around the user, rather than at, say, a 45 degree angle from the floor of the room around the user).

The virtual object may thus be a coral cluster. The augmented reality viewer may include a coral cluster spawner on the storage device and executable with the processor to determine a volume, perform a line trace at random points within the volume from a maximum height of the volume to a floor of the volume, determine whether a valid location is identified by the line trace, if a valid location is identified then, in response to the identification, perform a box trace to test if a random cluster will fit without overlapping a world mesh while attempting different scales and rotations and generating a score for each placement, determine a select placement with a highest score among scores, and spawn the coral cluster to the placement with the highest score. The augmented reality viewer may thus include a vista placement routine on the storage device and executable with the processor to place a vista, wherein the volume is bound by the vista.

Referring to FIGS. 22A-24, one of the challenges with various system configurations described herein is in creating interesting, believable interactions between the user and augmented reality elements which may be overlaid upon or within the actual world in which the user is positioned. Preferably the various elements such as fish, which are animated and configured to interact with the user, may be configured to have natural, non-repetitive behaviors which make sense to a user relative to the time domain (i.e., they don't swim too fast, they don't switch from "fleeing" state to "discovery/curious" state too quickly or too often, etc.); further, the system, such as that depicted in FIG. 1, generally has limited computing resources. Referring to FIGS. 23A-23B, in various embodiments, one technique for gaining compute efficiency is to write certain code elements in C++ rather than with functional code blueprinting. Referring to FIG. 24, a three dimensional navigation and pathfinding plug-in product which may be utilized with an environment such as the Unreal Engine® may be utilized to assist in navigating and developing movement paths for various elements such as fish; such a plug-in allows for a development team to focus more on higher-order animation issues, such as fish feeding behavior, exploring behavior, and interactions with the user, such as with the hand motions of a user.

Referring to FIG. 25, standard tools may be utilized to visualize 140 the utilization of various computing threads versus time so that a development team may further optimize the system. FIG. 26 illustrates various aspects of learnings which may be applicable to certain development processes and teams.

One or more users may be able to share their virtual environments with one or more other users, such that a plurality of users experience the same virtual environment features from their own viewing perspectives, by virtue of multi-location "passable world" types of configurations, as described in the aforementioned incorporated applications. For example, if a user located in an office in New York has virtual aquarium features displayed around him in his office, and if another user from San Francisco is virtually brought into that New York office and virtual world, then the user from San Francisco preferably is able to see the virtual aquarium features from that San Francisco user's virtual position/orientation within the New York room.

Figure 27:
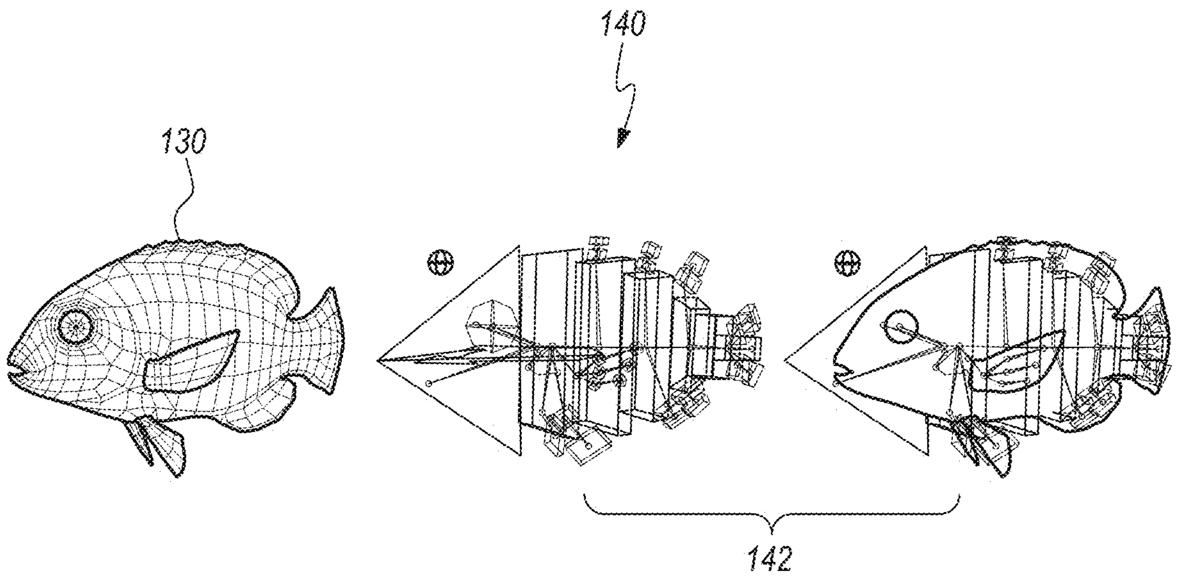
FIG. 27 is a sequential view of an animation pipeline.

Referring to FIG. 27, and also referring back to FIG. 11B, in various embodiments, with an augmented reality aquarium experience, a creative team may engage in rethinking about animations, techniques, and rigs to work with AI pathfinding, which can change states and navigate meshed spaces that may be occupied by one or more users. For example, an animation and/or rigging team may invest time for a standard fish 130 to develop a standard fish rig 140, and animation pipeline 142 with standardized animation and user interface ("UI") controls, auto-swim functionality, auto level-of-detail ("LOD") functionality, fish eye "look-at" tools, customizable tentacle and fin rigs, blend-spaces that trigger various behaviors, and/or vertex animation texture baking tools (i.e., for efficiently transferring details from one model to another). Such features may afford a designer great flexibility, and the ability to re-use animation and tune it to a creature's desired behaviors. In certain configurations we have found it useful to employ tools such as "auto-LOD" from Unreal Engine 4® to assist in reducing bone and poly counts dynamically as performance budgets are modified.

Figure 28:
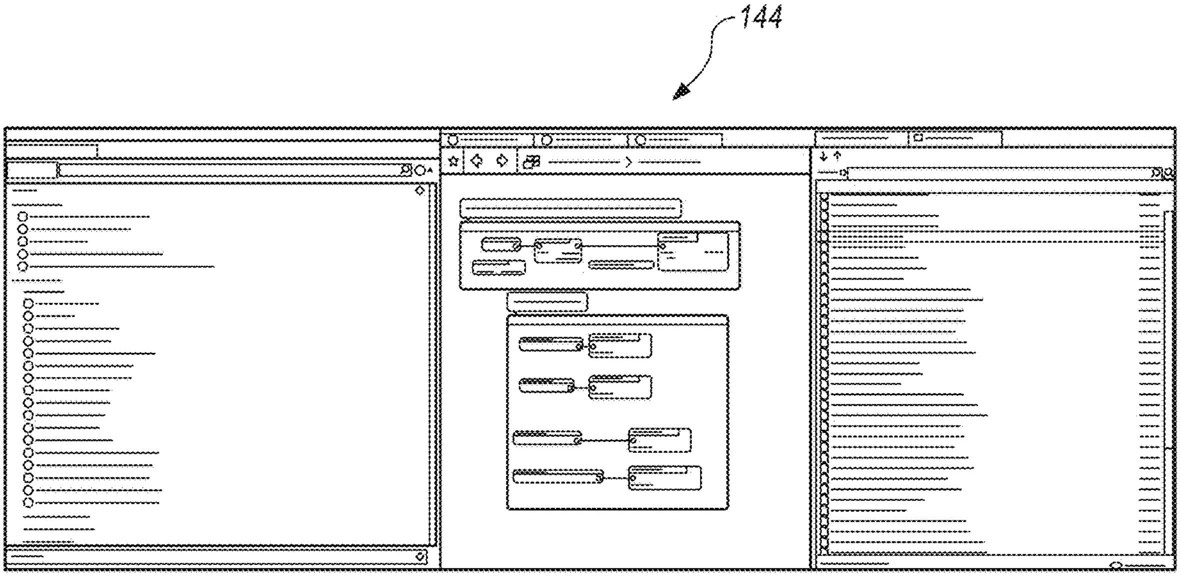
FIG. 28 is a screen shot of an artificial intelligence ("AI") pathfinding solution.

Referring to FIG. 28, and referring back to FIG. 11A, one challenge for developers has related to building and testing animation sets to work with an artificial intelligence ("AI") pathfinding solution. A fish element, for example, may have a set of "blend spaces" with a specific set of animations which may be triggered by the AI system, based upon various logic triggers and specific states, such as swim speed, wander, seek, flee, feed, etc. Blend spaces functionality may be configured to let the developer specify inputs, the animations, and how the inputs are used to blend between animations. As shown in the developer panel 144 representation in FIG. 28, various locomotion states are shown to the left, while the middle display has "audio anim notifies" and "overall anim notify" triggers for behaviors such as feed, turn, etc.

Figure 29:
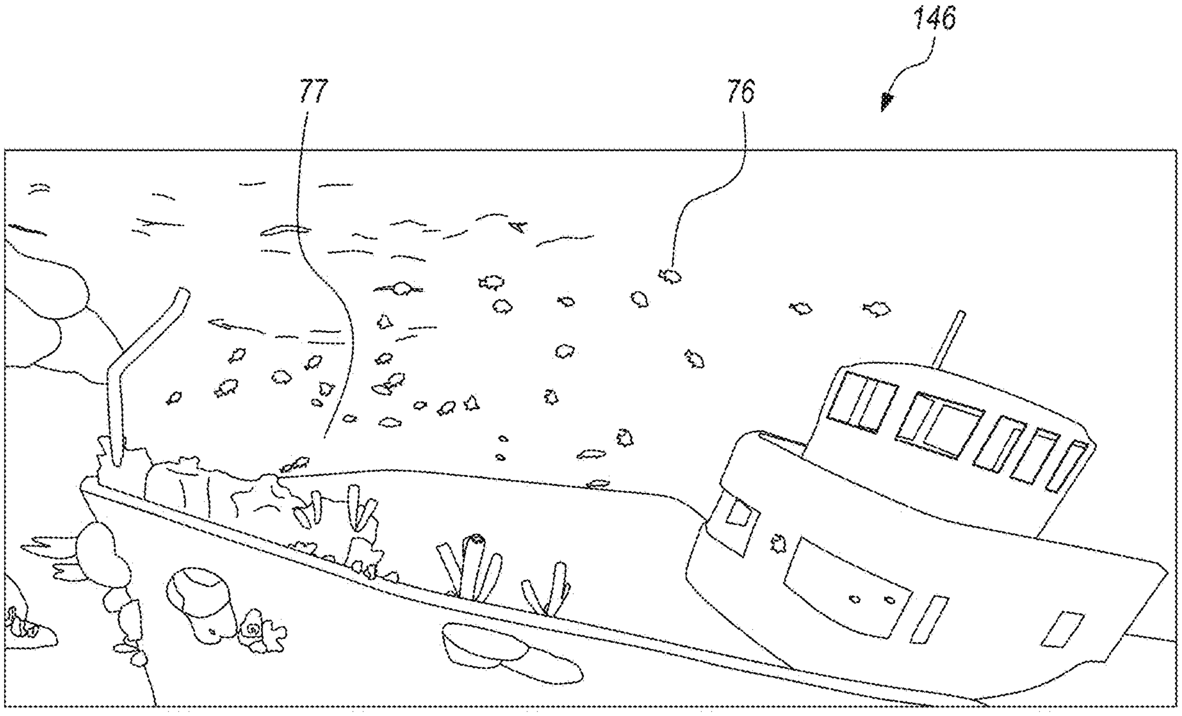
FIG. 29 is a depth view showing baking of animation data into textures.

Referring to FIG. 29, we have relied upon rigs and hand-keyed animations, but we also have discovered some valuable solutions for certain environment-based creature configurations that facilitate baking animation data into textures using a pipeline that leveraged the aforementioned Houdini® game tools, Maya®, and Unreal Engine 4®. With such tools, we can develop an end result providing desired performance leeway, particularly in scenarios wherein a balance of central processing unit (CPU) and graphics processing unit (GPU) (including texture streaming) load is desired, such as when using Vulkan 3.1® mobile. FIG. 29 illustrates a displayed shipwreck scene 146 wherein schools of fish elements 76, 77 in the midground and background are displayed using the aforementioned baking technique. Due to the sheer amount of content that a developer may want to author in a given experience, it may not be practical to have a scenario such as birds flocking in real-time. For large groups of virtual fish, for example, we have arrived at a solution to reduce baked texture sizes. For each member fish in a large group of fish, one may export-out their swim cycle from Maya® to an FBX file; each of these caches may then be taken into Houdini®, wherein individual vertex animated textures (or "VATs") may be created that are then plugged into the Houdini softbody frame blending vertext shader tools for deformation. An FX artist may generate a simulation in Houdini and attach each individual particle to a joint which may be utilized to drive each vertex animated fish along through the virtual water. To develop fish and creature swimming content, rig and animation controls may be standardized across a group of, or all of, the fish. Auto-swim functionality may be developed (such as procedural sinusoidal swim functionality). Traditional LOD rig systems or auto-LOD functionality may be utilized. Fish-eye-look-at tools may be developed to assist in driving fish gaze. Additional specialized environment creatures (such as eels, crabs, octopi, sea horses, turtles, rays, sharks) may be developed. Blendspaces and in-place rotation offsets may be used in conjunction with AI to trigger behaviors such as speed or various states. For example, one may show a sample animated rig in Maya with someone controlling it in Maya and/or one may set up needed animations and blend spaces for a technical team to integrate with AI pathfinding. A vertex-animated fish pipeline functionality may be developed to assist in providing flexibility and power given a particular graphics and computing budget scenario, such as one associated with a mobile platform.

Referring to FIGS. 30A-30H, and also referring back to FIGS. 5A, 5B, 5D, 5E, and 16, various coral cluster configurations 83, 152, 154, 156, 158 and components thereof 148, 150 are illustrated. In various embodiments, it was a priority to give users an opportunity to experience a dynamically placed and procedurally driven undersea reef experience. Thus, our challenge was to build a variable-driven coral/rock spawning and placement system using blueprints that integrate with the real world. In one embodiment we opted for a computing-performance-friendly "hybrid" approach where we loaded and placed pre-built rock formations and sand bases, then used our coral spawning and placement system configuration to "spawn" coral and seaweed thereon. In one embodiment, before doing so an art team established a cohesive set of coral rock formations, such as those illustrated in FIGS. 30C and 30D 148, 150 that would serve as the foundation for "kit-bashing" different layouts.

Figure 30A:
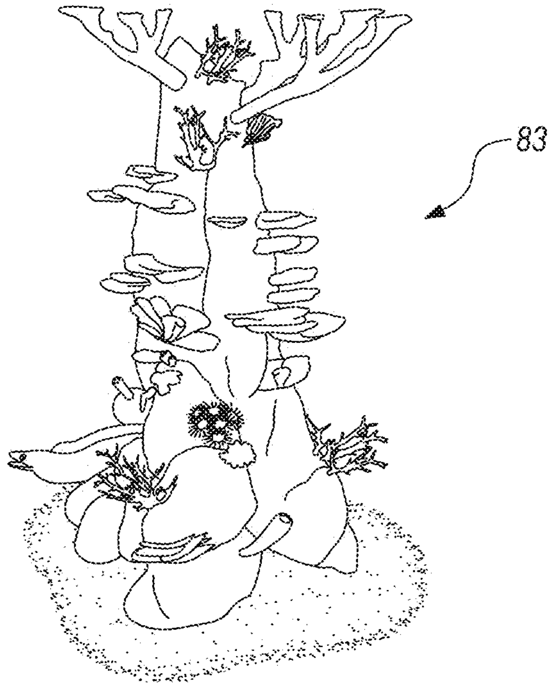
FIGS. 30A to 30H are depth views of various coral cluster configurations.
Figure 30B:
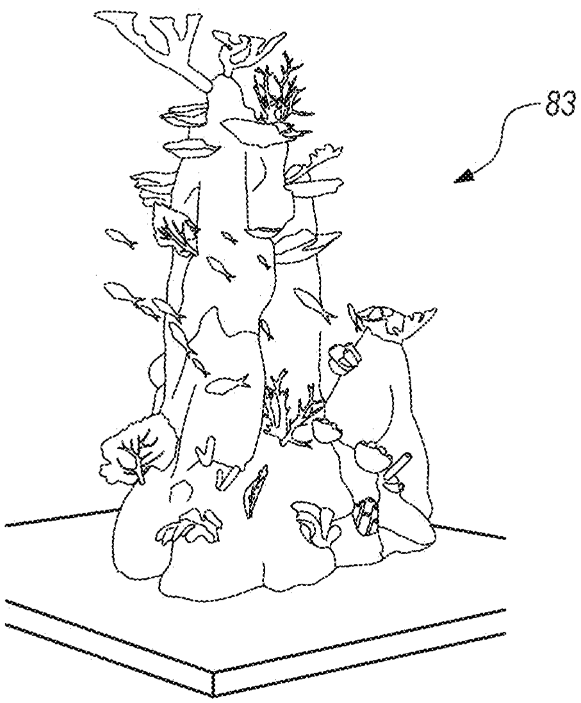
Figure 30C:
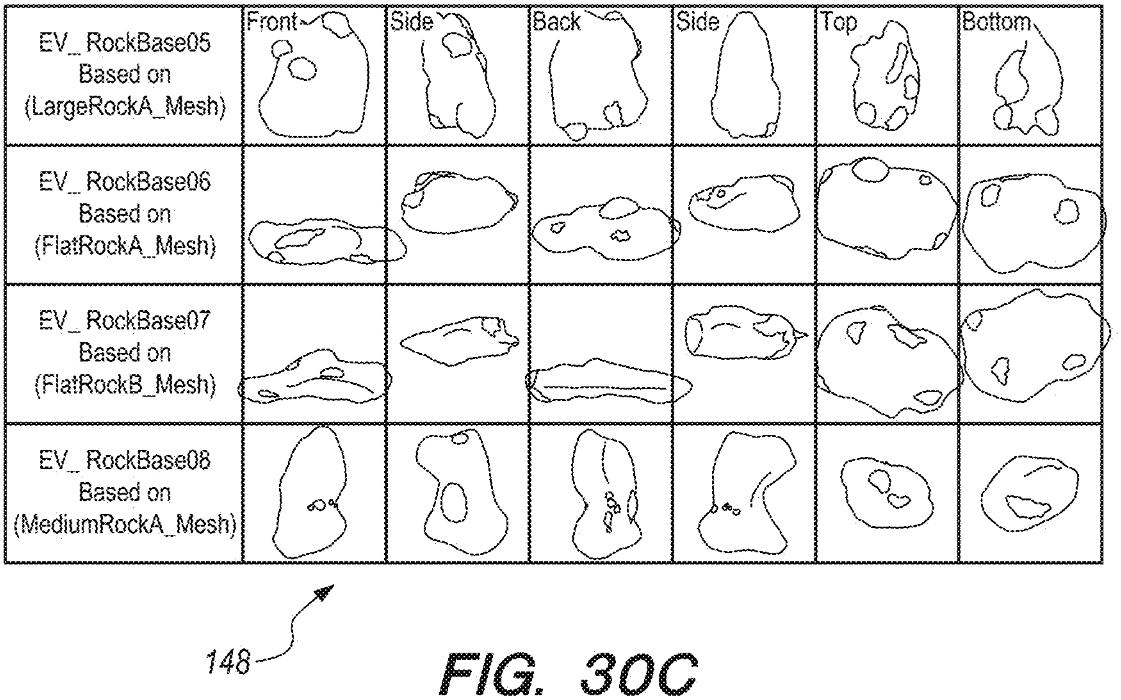
Figure 30D:
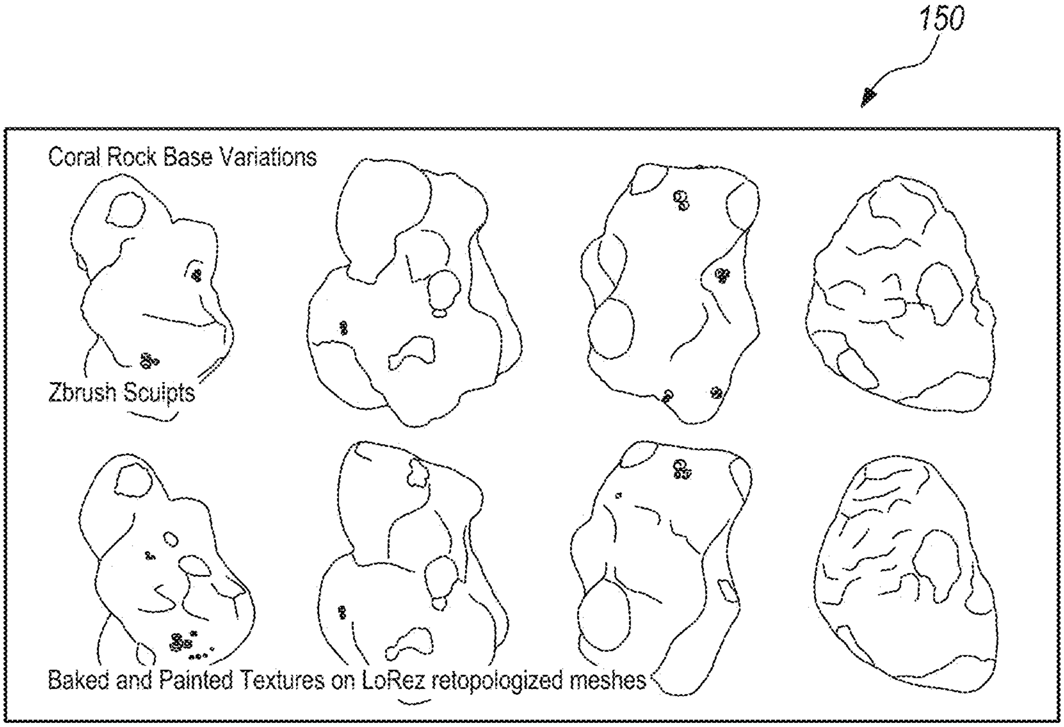
Figure 30E:
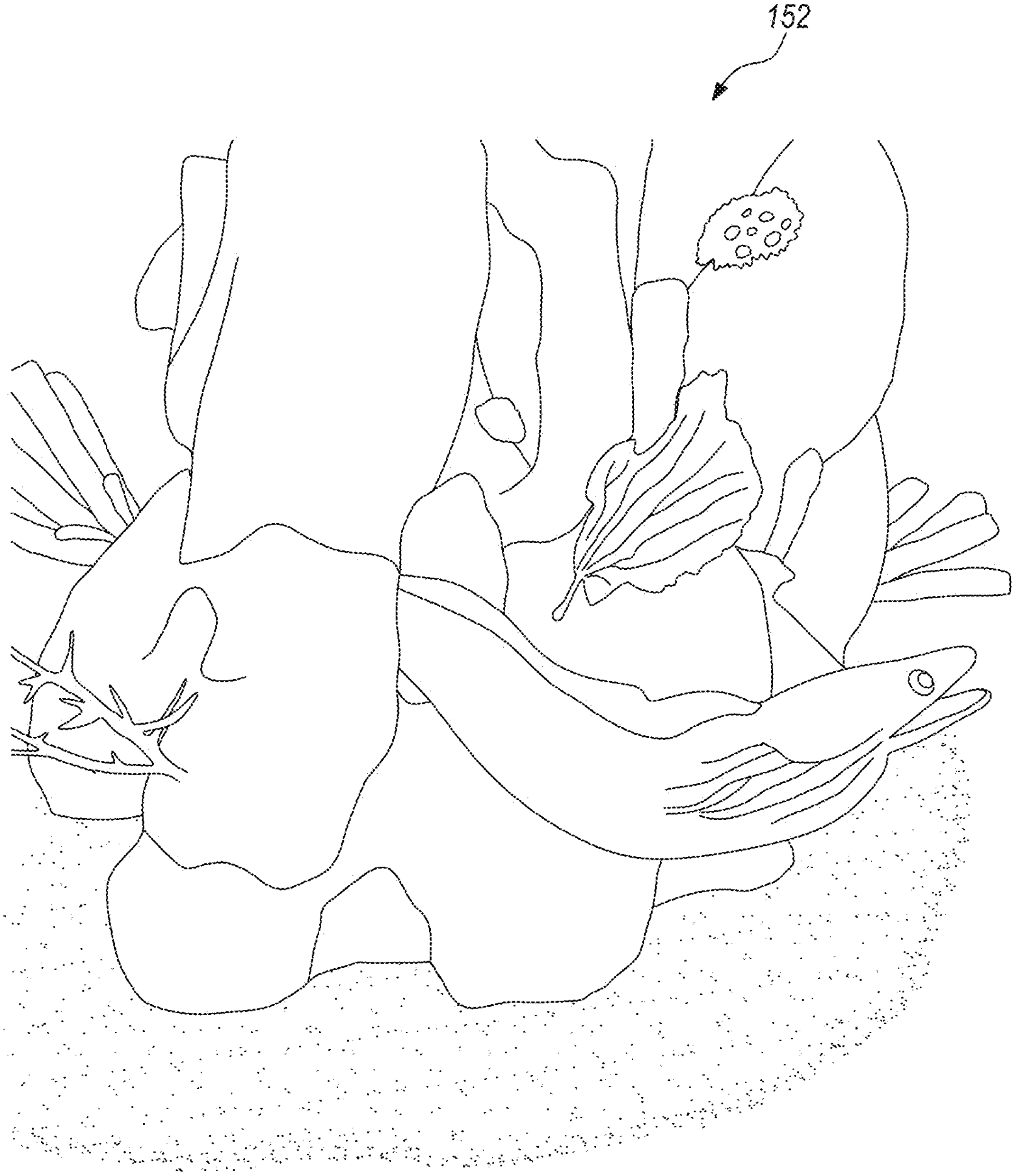
Figure 30F:
Figure 30G:
Figure 30H:
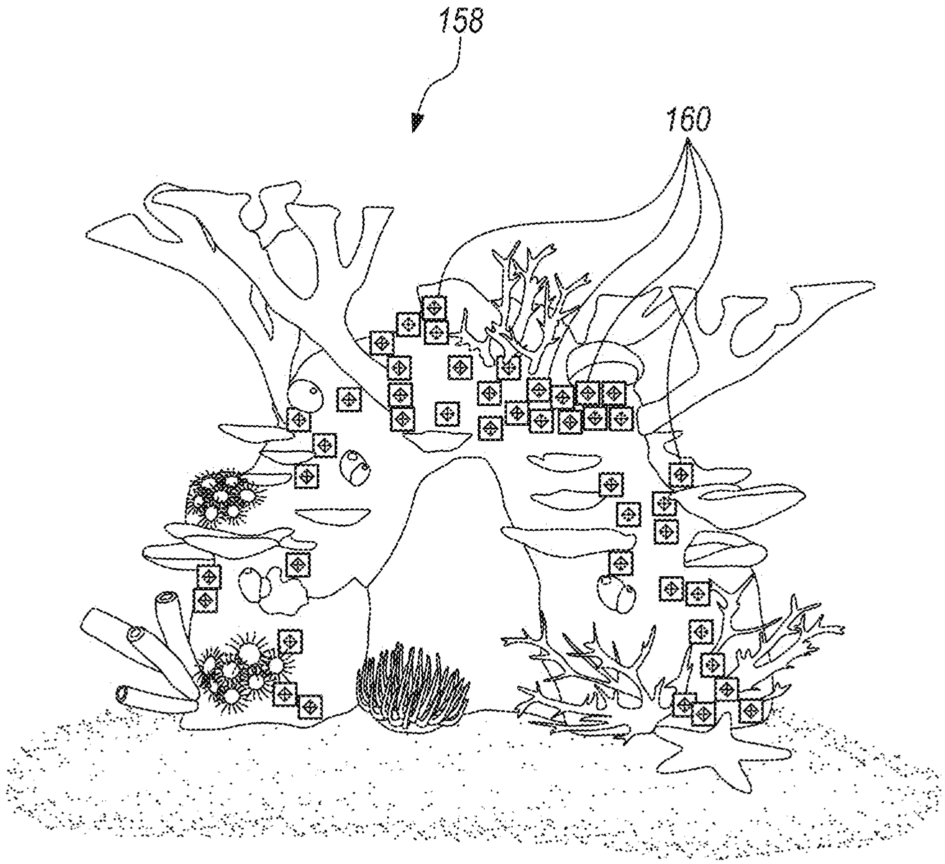

A system for dynamically spawning and placing corals was developed using blueprints. Although blueprints were initially considered more for early prototyping and making gameplay proof of concepts, our technical art team garnered important functionality from them. Referring to FIG. 30H, various vertices 160 are illustrated as they are validated for simulated potential coral growth. In various embodiments it may be desirable, for example, to have coral clusters that behave randomly each time a user returns to the experience.

Figure 31A:
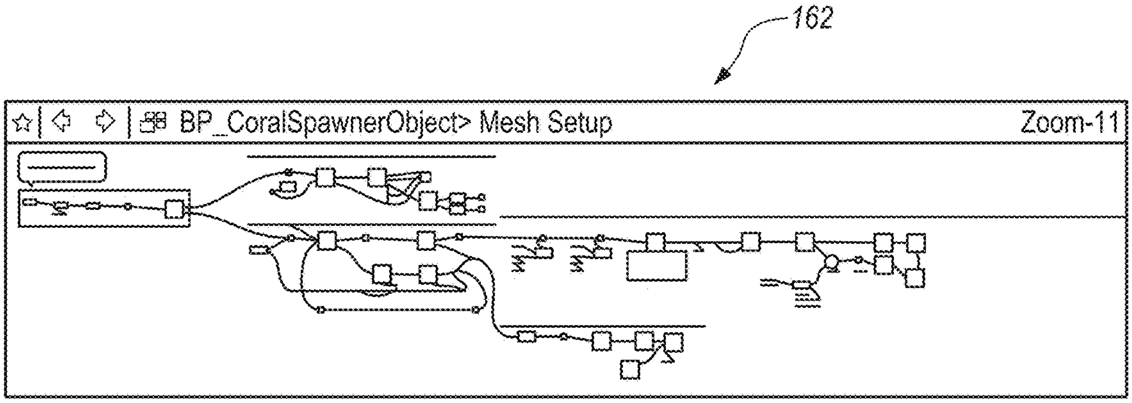
FIGS. 31A and 31B are depth views of a coral spawner object system.
Figure 31B:
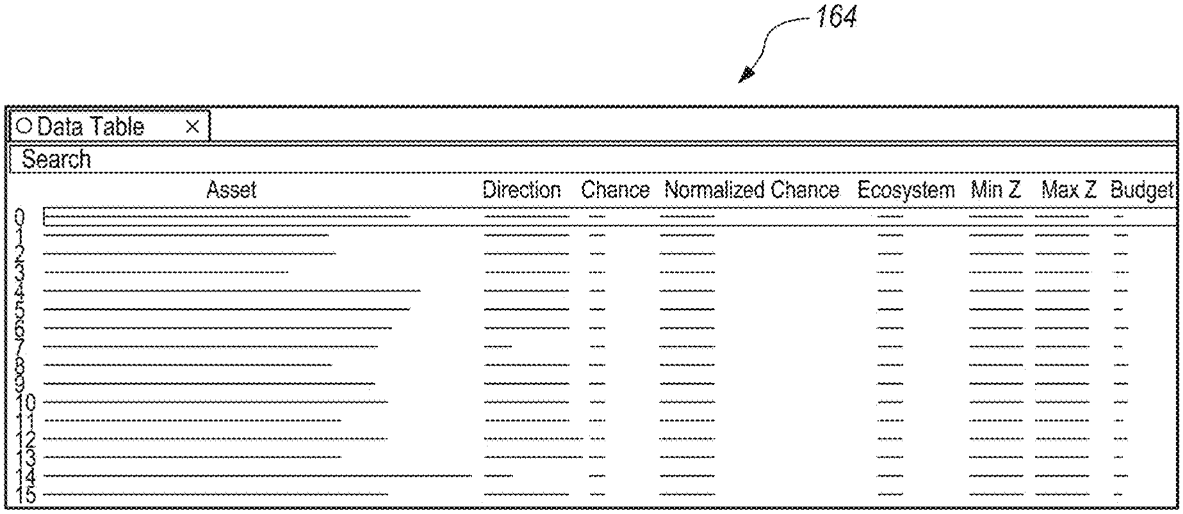

Referring to FIGS. 31A and 31B, images of embodiments of a coral spawner object system 162 and coral growth control table 164 are illustrated. A system embodiment may employ some notable features, such as: a data table approach to set individual population and species max counts, spawn type, height-based percentages, and other classification variables; a vertex crawling and raycast algorithm to check for placement viability, growth, and caching of valid points to file; a run-time coral static mesh loop that first calculates the shadow pass and then creates instanced static meshes of all corals; and a collision-based exclusion configuration to allowed developers to simply place box colliders where they don't want certain species to grow. To help integrate and ground the coral clusters in the user's space, the system may comprise a set of smaller "supporting" rock and sand elements with dynamically moving seaweed on them. The spawner manager (on the C++ core game side) then may be configured to place those supporting elements around the main coral clusters based on available floor planes that the system detects and the space constraints in each user's room. This also helps ensure a unique layout for every play space. In various embodiments, although each of a plurality of core vista environments may be pre-built, the swappable frames and dynamic AI and FX driven creatures may be utilized to make these pre-built vistas feel completely unique. Each layout may be dynamic and dependent upon the meshed room size; for example, FIG. 30F illustrates a procedurally spawned coral cluster 154 surrounded by smaller rock pieces and seaweed elements. The subject system may be configured to use a run-time coral static mesh loop that first calculates the shadow pass using actor tags, then immediately creates instanced static meshes of all corals to reduce draw calls and overhead; growth may be data table driven, and may include vertex-based growth, raycast search and caching of valid points—as well as height-based and collision-based inclusion/exclusion of species. In various embodiments, we have built and employed reusable and procedurally spawnable rocks and coral reef elements that may be rotated and snapped in random configurations; we have grounded and integrated the content by using a subtle falloff on sand and adding randomly placed supporting rocks with seaweed around the clusters; and we have used Maya®, Zbrush®, Substance Designer®, and Painter® tools to create unique and tileable procedural and hand crafted assets.

The augmented reality viewer may include a coral spawner system on the storage device and executable with the processor to store at least a first coral element of a first type on the storage device, and construct the coral cluster from a plurality of coral elements including the first coral element.

The coral spawner system may be executable with the processor to construct the coral cluster from a plurality of first coral elements.

The coral spawner system may be executable with the processor to store at least a second coral element of a second type on the storage device, wherein the plurality of coral elements includes the second coral element.

The coral spawner system may be executable with the processor to determine a coral cluster setting, wherein the processor constructs the coral cluster according to the setting. The setting may be available space that is detected, and a number of the coral elements is selected based on the available space. The coral spawner system may be executable with the processor to simulate ambient light, wherein the setting is the ambient light. A number of coral elements may be selected based on the ambient light. Orientations of the coral elements may be selected based on the ambient light. The coral spawner system may include a data table on the storage device with a plurality of coral cluster settings, wherein the coral spawner system constructs the coral cluster according to the plurality of coral cluster settings. The coral cluster settings may include at least one of population; species max counts; spawn type; and height-based percentages. The coral spawner system may include a vertex crawling and raycast algorithm to check for placement viability, growth, and caching of valid points to file. The coral spawner system may include a run-time coral static mesh loop that first calculates a shadow pass and then creates instanced static meshes of all coral clusters. The coral spawner system may include collision-based exclusion configuration to place box colliders where certain species should not grow.

FIG. 32 shows instructions that reside on the a storage device as described above, including a set of data of virtual objects 200, a display module 202, a data stream generator 204, a light generator 206, a position adjustment module 208, a nomadic subroutine 210, a wave movement routine 212, a retrieval agent 214, a transmission agent 216, an artificial intelligence system 218, a gaze direction movement routine 220, a personal assistant module 222, a movement module 224, a surface extraction routine 226, a depth creation module 228, a vista placement routine 230, a vertex animation routine 232, and a coral cluster spawner 234.

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit, or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. An augmented reality viewer comprising:

at least one sensor positioned to sense a location of at least one of a plurality of real-world objects;

a storage device;

a set of data on the storage device including a virtual object;

a processor connected to the storage device;

a display module on the storage device and executable by the processor to determine a desired display of the virtual object relative to the location of at least one of the real-world objects;

a data stream generator on the storage device and executable by the processor to generate a data stream based on the data and the desired display;

a light generator connected to the processor to receive the data stream and generate light based on the data stream;

a display device positioned to receive the light that is generated and to display the light to a user, wherein the light creates a rendering of the virtual object visible to the user and rendered in accordance with the desired display; and a vertex animation routine on the storage device and executable with the processor to:

store a virtual object mesh representing the virtual object;

associate a texture with the virtual object mesh; and manipulate the virtual object mesh to cause movement of the texture and the virtual object in a view of the user.

2. The augmented reality viewer of claim 1, wherein the nomadic life object is a fish of a first type, further comprising:

a movement module on the storage device and executable with the processor to articulate a body of the fish in a first back-and-forth manner.

3. The augmented reality viewer of claim 1, wherein the virtual object mesh is manipulated to articulate the virtual object.

4. The augmented reality viewer of claim 1, wherein the same virtual object mesh is used multiple times to cause movement of the texture and the virtual object.

5. The augmented reality viewer of claim 1, wherein the display device displays the light that is generated to a user while the views at least one of the real-world objects.

6. The augmented reality viewer of claim 5, wherein the display device is a see-through display device that allows light from the at least one real-world objects to reach an eye of the user.

7. The augmented reality viewer of claim 1, further comprising:

a head-worn structure shaped to be worn on a head of the user, wherein the display device is mounted to the head-worn structure and the at least one sensor is of a kind that is suitable to sense movement of the display device due to movement of a head of the user; and a position adjustment module, executable by the processor, to adjust a location of the virtual object so that, within a view of the user, the virtual object remains stationary relative to the at least one real-world object.

8. An augmented reality visualization method comprising:

sensing, with at least one sensor, a location of at least one of a plurality of real-world objects;

storing, on a storage device, data including a virtual object;

determining, with a processor, a desired display of the virtual object relative to the location of at least one of the real-world objects;

generating, by the processor, a data stream based on the data and the desired display;

generating, with a light generator, light based on the data stream;

displaying, with a display device, the light that is generated to a user, wherein the light creates a rendering of the virtual object visible to the user and rendered in accordance with the desired display;

storing, with the processor, a virtual object mesh representing the virtual object;

associating, with the processor, a texture with the virtual object mesh; and manipulating, with the processor, the virtual object mesh to cause movement of the texture and the virtual object in a view of the user.

9. The method of claim 8, wherein the nomadic life object is a fish of a first type, further comprising:

articulating, with the processor, a body of the fish in a first back-and-forth manner.

10. The method of claim 8, wherein the virtual object mesh is manipulated to articulate the virtual object.

11. The method of claim 8, wherein the same virtual object mesh is used multiple times to cause movement of the texture and the virtual object.

12. The method of claim 8, wherein the display device displays the light that is generated to a user while the views at least one of the real-world objects.

13. The method of claim 12, wherein the display device is a see-through display device that allows light from the at least one real-world objects to reach an eye of the user.

14. The method of claim 8, further comprising:

sensing, with the at least one sensor, movement of the display device due to movement of a head of the user; and adjusting a location of the virtual object so that, within a view of the user, the virtual object remains stationary relative to the at least one real-world object.

* * * * *